(12) United States Patent
Keski-Luopa et al.

(10) Patent No.: US 11,044,844 B2
(45) Date of Patent: Jun. 29, 2021

(54) MAINTENANCE AND TRANSPORTATION METHOD, SYSTEM, AND APPARATUS

(71) Applicants: Mauno Keski-Luopa, Lahti (FI); Mika Keski-Luopa, Orimattila (FI); Jukka Keski-Luopa, Espoo (FI)

(72) Inventors: Mauno Keski-Luopa, Lahti (FI); Mika Keski-Luopa, Orimattila (FI); Jukka Keski-Luopa, Espoo (FI)

(*) Notice: Subject to any disclaimer, the term of this patent is extended or adjusted under 35 U.S.C. 154(b) by 572 days.

(21) Appl. No.: 15/853,789

(22) Filed: Dec. 23, 2017

(65) Prior Publication Data
US 2018/0255705 A1    Sep. 13, 2018

Related U.S. Application Data

(63) Continuation-in-part of application No. 13/834,390, filed on Mar. 15, 2013, now Pat. No. 9,848,532.
(Continued)

(51) Int. Cl.
*A01D 34/00* (2006.01)
*A01D 69/02* (2006.01)
(Continued)

(52) U.S. Cl.
CPC .......... *A01D 34/008* (2013.01); *A01D 69/02* (2013.01); *A01D 69/06* (2013.01); *A01D 2101/00* (2013.01)

(58) Field of Classification Search
CPC ... A01D 34/008; A01D 69/02; A01D 2101/00
See application file for complete search history.

(56) References Cited

U.S. PATENT DOCUMENTS

| | | | | |
|---|---|---|---|---|
| 2,295,645 | A | * | 9/1942 | Flynn ..................... E01C 19/27 180/20 |
| 3,566,761 | A | * | 3/1971 | Domenighetti ......... E01C 19/27 280/444 |

(Continued)

FOREIGN PATENT DOCUMENTS

| WO | 9749528 A1 | 12/1997 |
|---|---|---|
| WO | 2007118924 A1 | 10/2007 |

(Continued)

OTHER PUBLICATIONS

International Preliminary Report on Patentability; Ser. No. PCT/FI2018/050248; dated Oct. 8, 2019 (Oct. 8, 2019).
(Continued)

*Primary Examiner* — Brian L Swenson
(74) *Attorney, Agent, or Firm* — Carlos R. Villamar; The Villamar Firm PLLC

(57) ABSTRACT

A method, system and apparatus for a modular multipurpose machine or vehicle, including a modular scalable frame with battery incorporated into on the scalable frame; a modular electric drive system; and modular attachments or components for configuring the machine or vehicle for a plurality of maintenance or transportation functions. The modular electric drive system includes a power train with respective drive units for each of the front and rear wheels, each drive unit includes a planetary gear, and servo motor for each of the front and rear wheels. The power train includes steerable or non-steerable wheel power units, housing the respective drive units, and including respective servo controllers for each of the front and rear wheels. The wheel power units are configured for single, double or triple wheel configurations.

9 Claims, 47 Drawing Sheets

Related U.S. Application Data

(60) Provisional application No. 62/481,882, filed on Apr. 5, 2017, provisional application No. 61/660,054, filed on Jun. 15, 2012.

(51) Int. Cl.
  *A01D 69/06* (2006.01)
  *A01D 101/00* (2006.01)

(56) References Cited

U.S. PATENT DOCUMENTS

| | | | | |
|---|---|---|---|---|
| 4,754,815 A * | 7/1988 | Brouwer | ............... | A01B 45/04 111/100 |
| 4,791,996 A * | 12/1988 | van der Lely | ....... | A01B 51/026 172/116 |
| 5,494,375 A * | 2/1996 | Yates | ............... | E01C 19/27 172/518 |
| 6,328,123 B1 * | 12/2001 | Niemann | ............... | B60K 7/0007 180/65.51 |
| 6,425,452 B1 * | 7/2002 | Steiner | ............... | B60K 17/10 180/233 |
| 6,611,738 B2 * | 8/2003 | Ruffner | ............... | B60L 53/14 701/23 |
| 8,029,399 B2 * | 10/2011 | Thompson | ............ | B62D 11/14 180/6.44 |
| 8,322,729 B2 * | 12/2012 | Michel | ............... | B60G 7/006 280/5.52 |
| 9,241,442 B2 | 1/2016 | Diazdelcastillo | | |
| 2003/0029146 A1 * | 2/2003 | Quigley | ............ | B01D 46/0005 55/497 |
| 2005/0039428 A1 * | 2/2005 | McMurtry | ............ | A01B 69/008 56/1 |
| 2005/0091953 A1 * | 5/2005 | Turner et al. | ............. | 56/10.2 R |
| 2006/0237242 A1 | 10/2006 | Burke | | |
| 2007/0198159 A1 * | 8/2007 | Durkos et al. | ............ | 701/50 |
| 2007/0294991 A1 * | 12/2007 | Medina et al. | ............ | 56/11.9 |
| 2008/0294288 A1 * | 11/2008 | Yamauchi | ............ | G05D 1/0044 700/258 |
| 2009/0065273 A1 * | 3/2009 | Wyatt | ............... | B60W 30/1886 180/65.8 |
| 2009/0211216 A1 | 8/2009 | Keski-Luopa | | |
| 2009/0228166 A1 * | 9/2009 | Durkos | ............... | G05D 1/0219 701/26 |
| 2010/0116572 A1 * | 5/2010 | Schmitt | ............... | B62D 15/00 180/65.51 |
| 2010/0175357 A1 | 7/2010 | Keski-Luopa | | |
| 2010/0186360 A1 | 7/2010 | Keski-Luopa | | |
| 2011/0040409 A1 * | 2/2011 | Biber | ............... | G05D 1/0231 700/259 |
| 2011/0017530 A1 | 7/2011 | Keski-Luopa | | |
| 2011/0166705 A1 * | 7/2011 | Anderson et al. | ............. | 700/253 |

FOREIGN PATENT DOCUMENTS

| | | |
|---|---|---|
| WO | 2007118925 A1 | 10/2007 |
| WO | 2007118926 A1 | 10/2007 |
| WO | 2007118927 A1 | 10/2007 |
| WO | 2009007505 A1 | 1/2009 |
| WO | 2009007506 A1 | 1/2009 |
| WO | 2009007509 A1 | 1/2009 |
| WO | 2009068752 A1 | 6/2009 |

OTHER PUBLICATIONS

International Search Report and Written Opinion; Ser. No. PCT/FI2018/050248; dated Aug. 2, 2018 (Aug. 2, 2018).
Google Inventor Name (Keski-Luopa) Search Aug. 22, 2017.
WIPO Inventor Name (Keski-Luopa) Search Aug. 22, 2017.

* cited by examiner

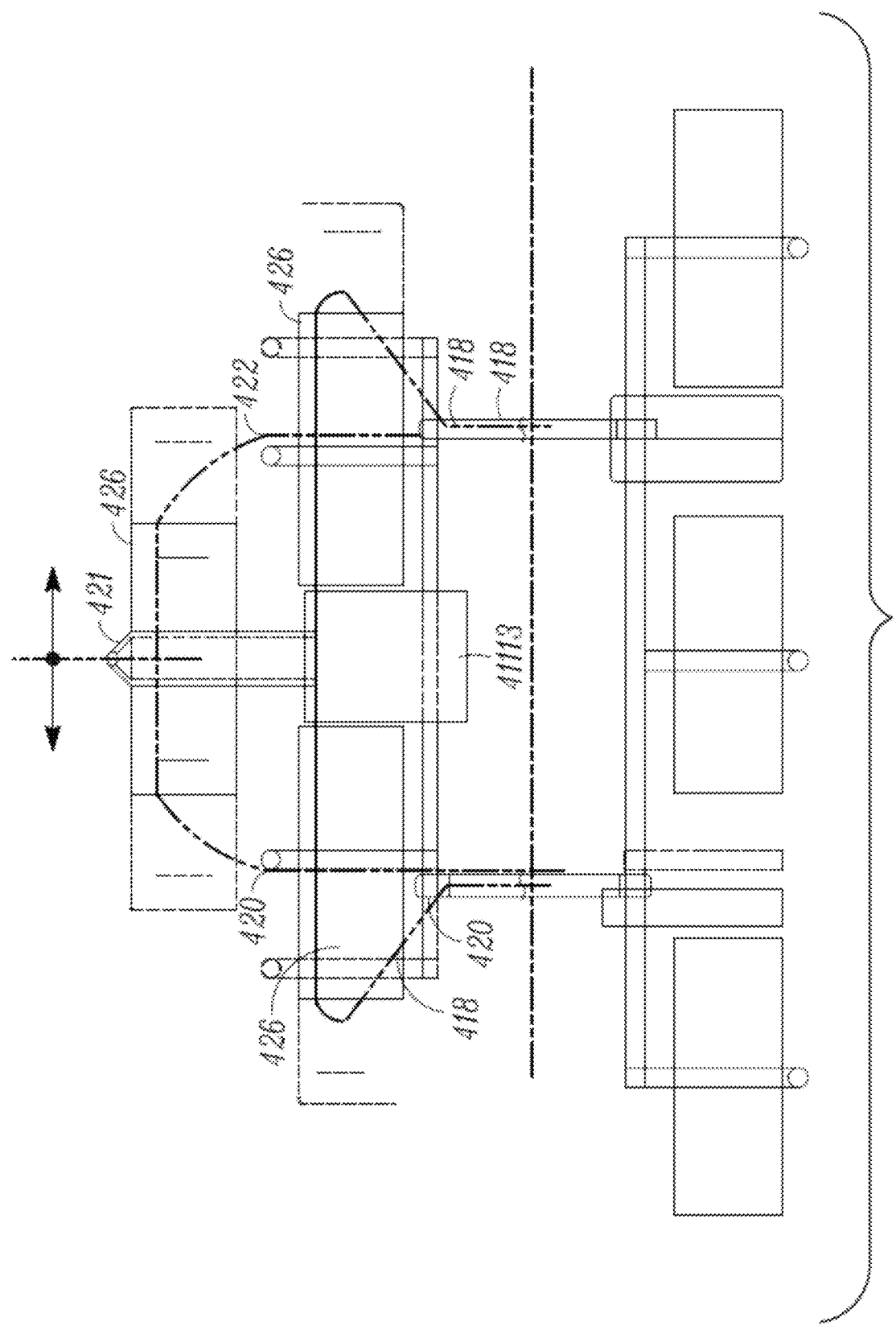

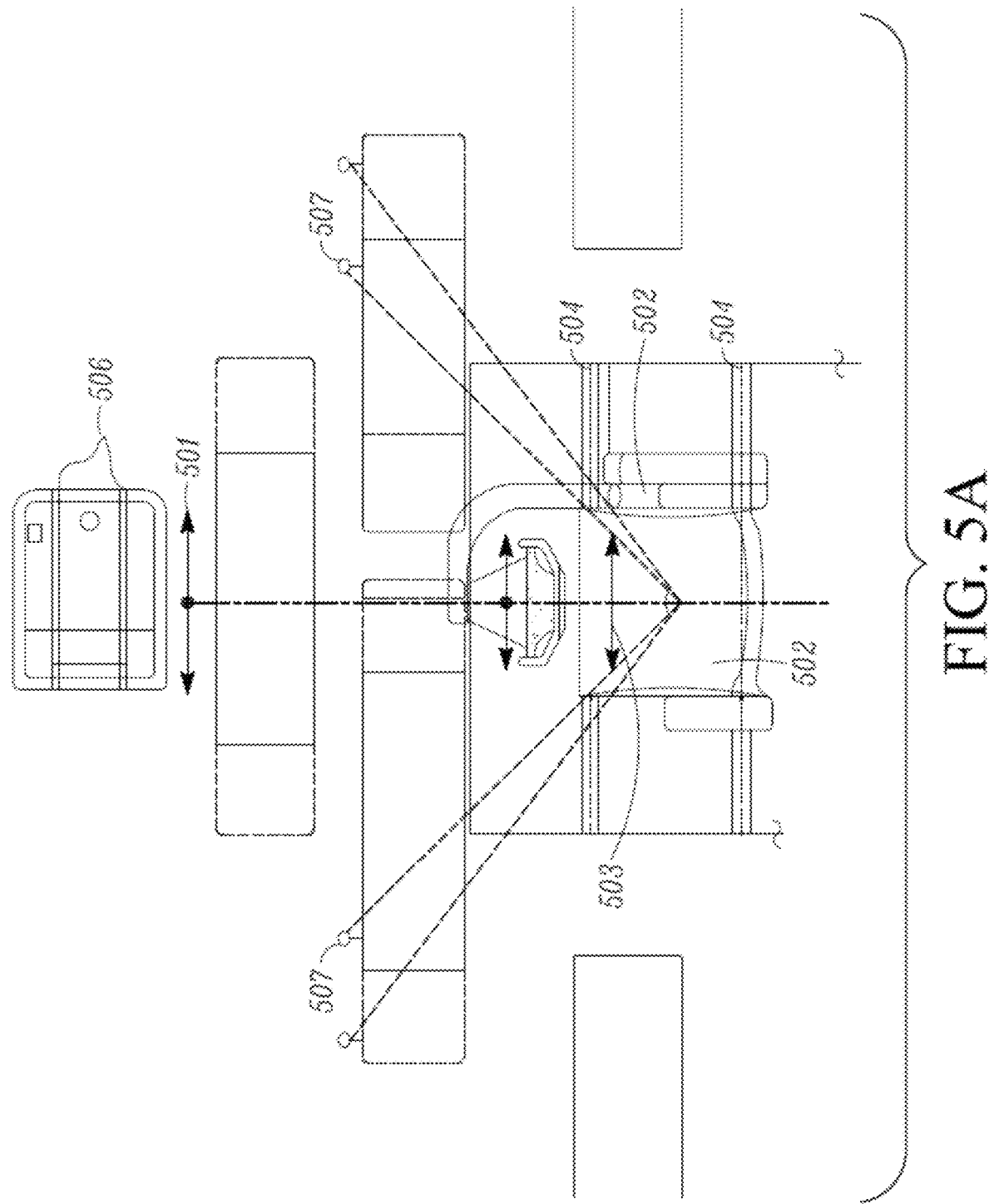

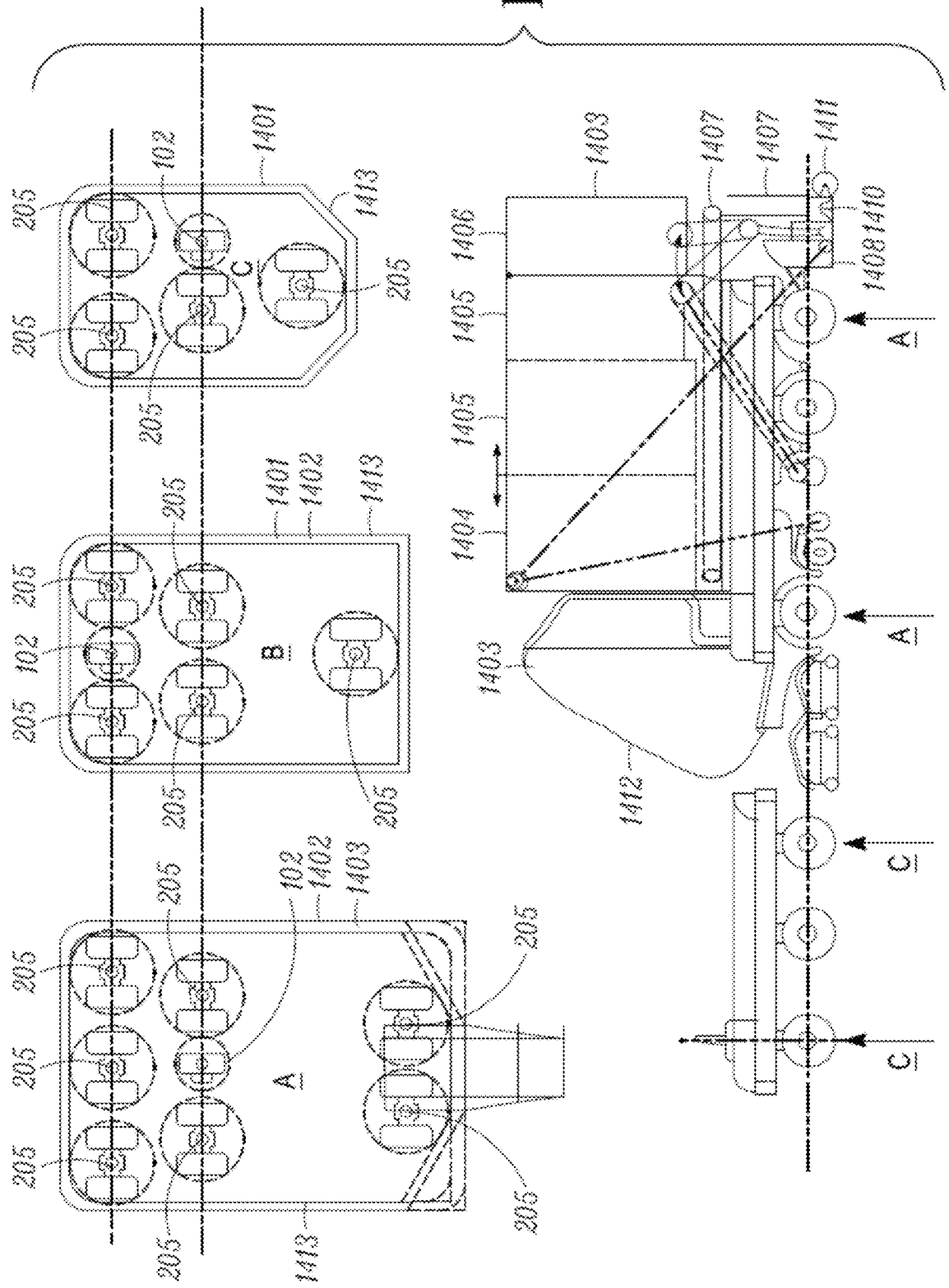

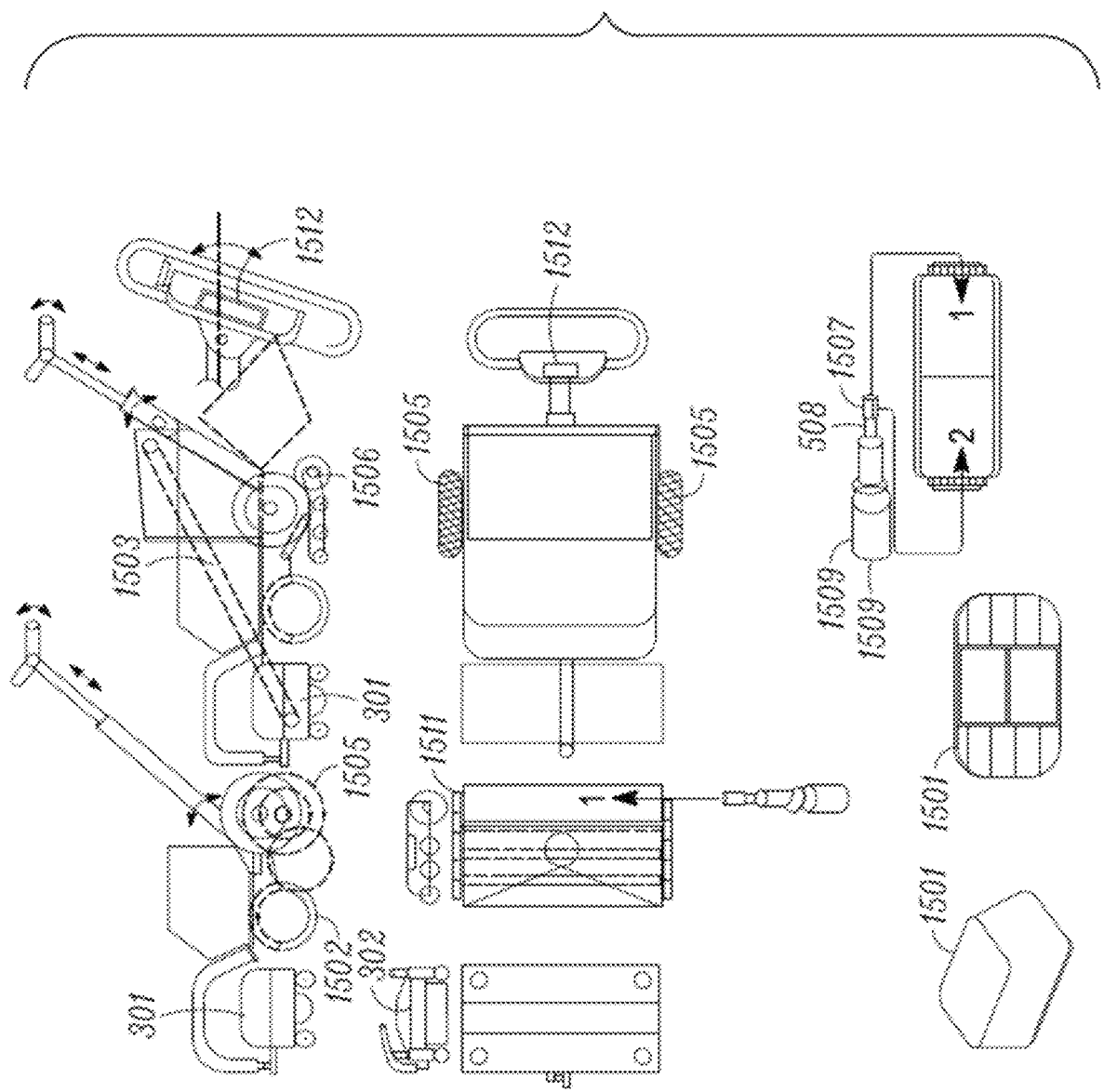

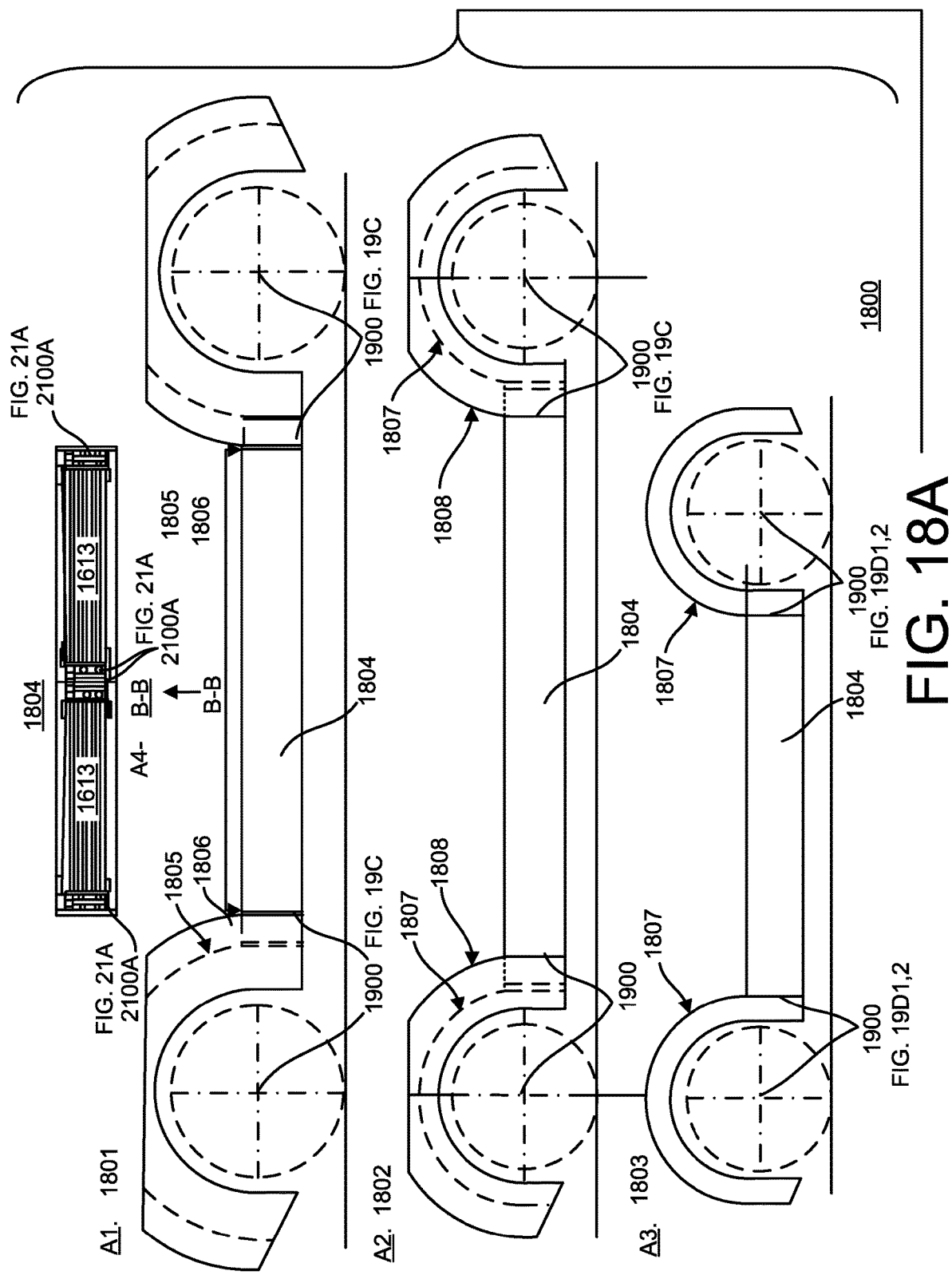

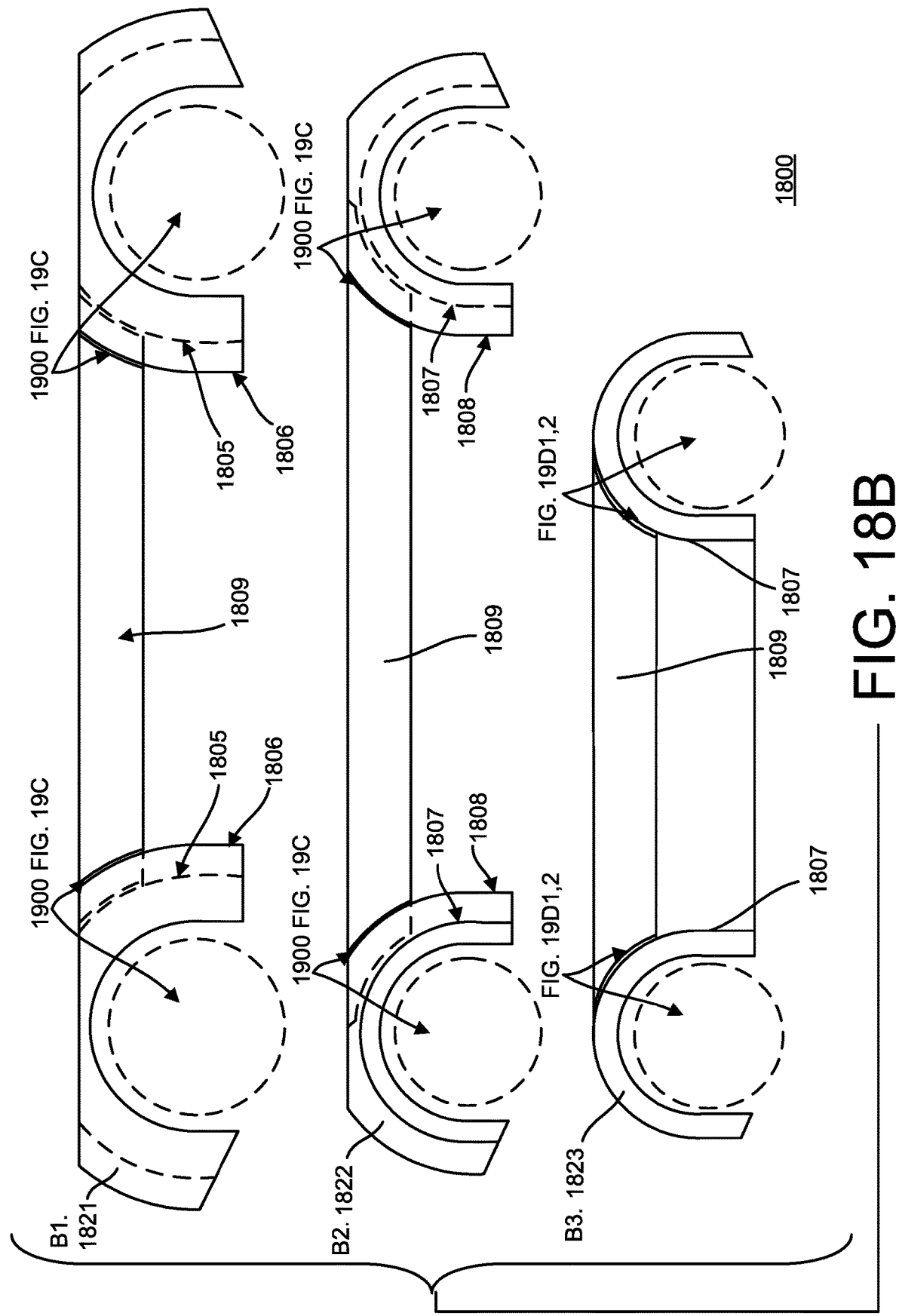

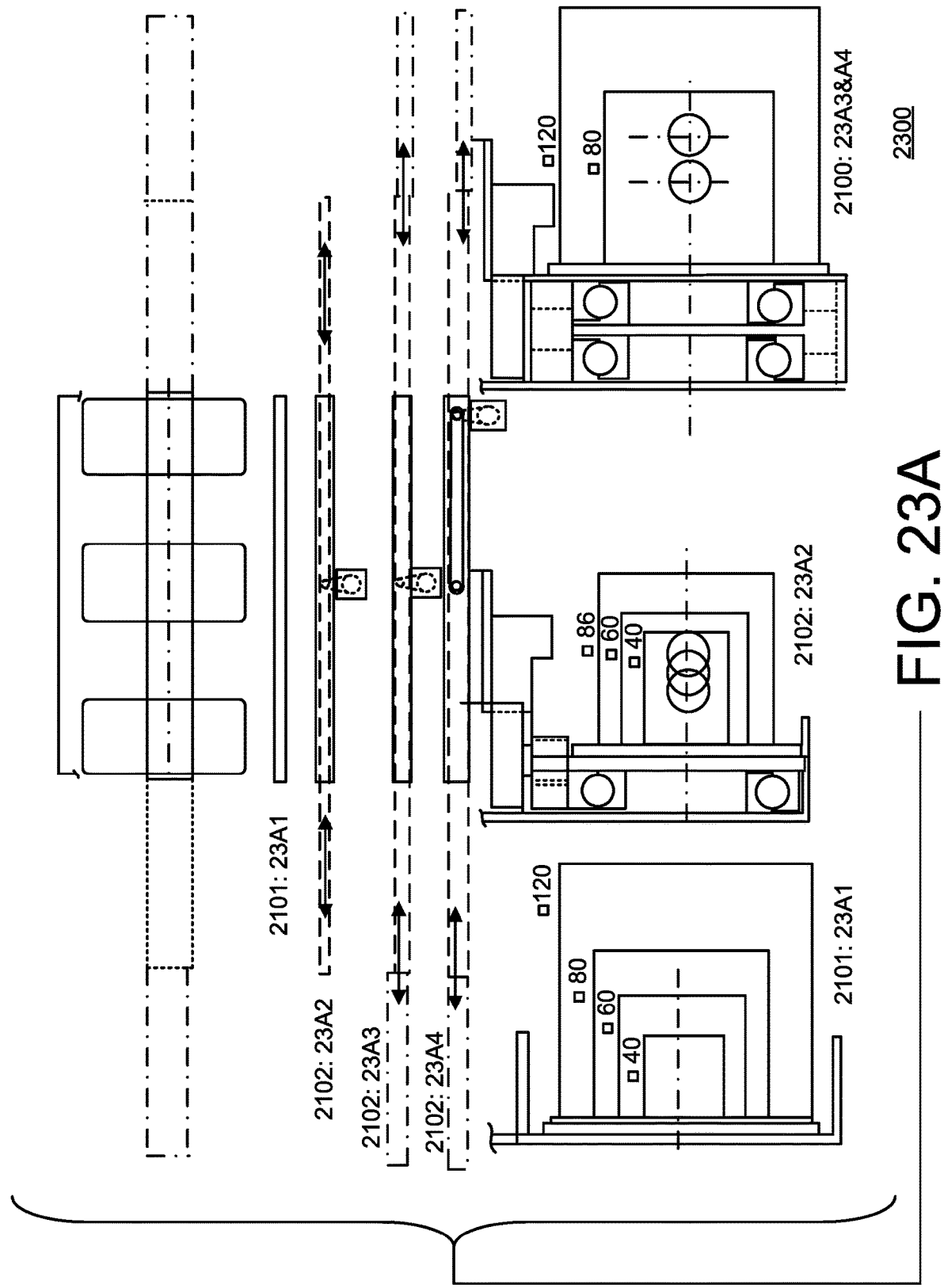

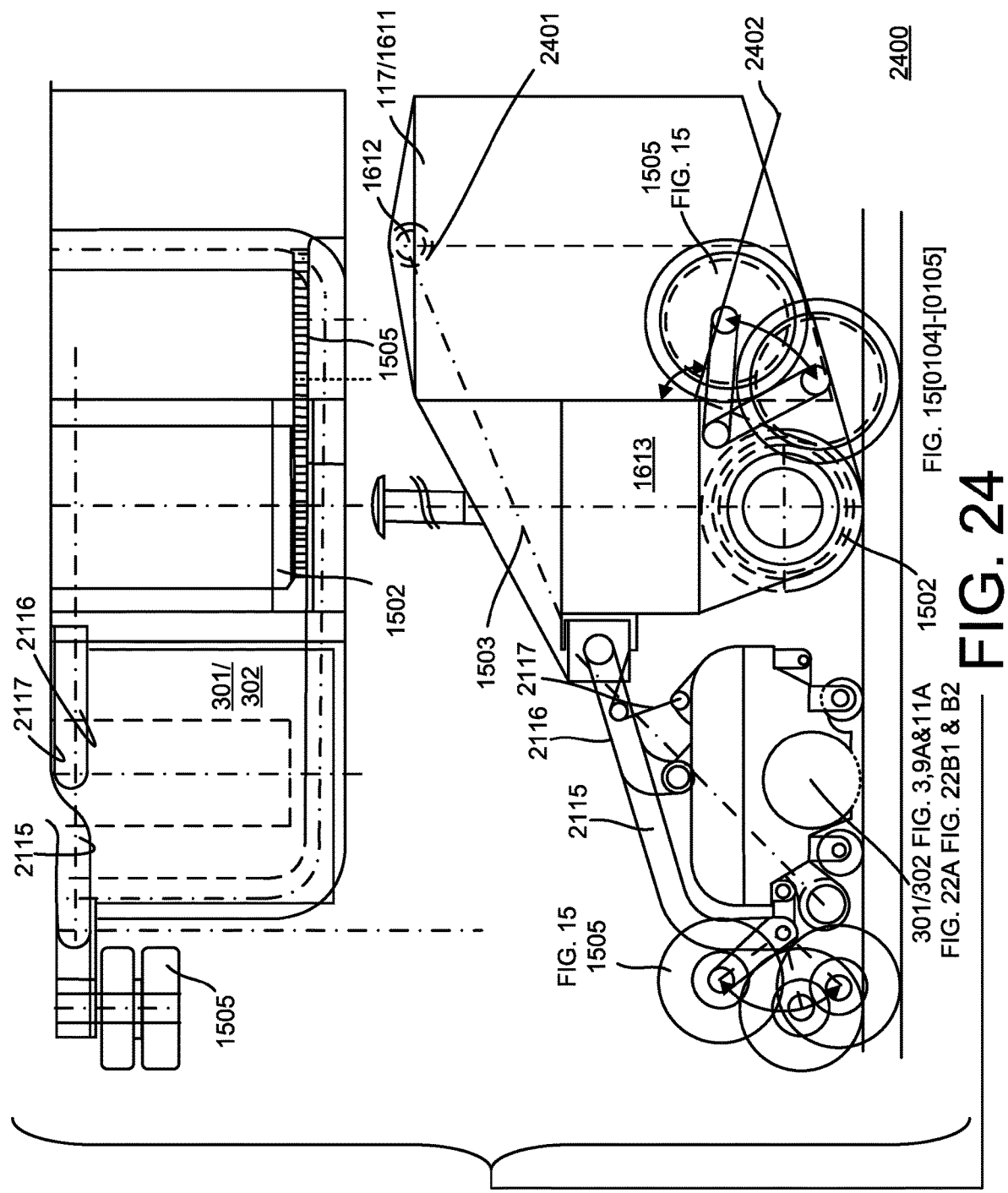

MAINTENANCE AND TRANSPORTATION METHOD, SYSTEM, AND APPARATUS

CROSS REFERENCE TO RELATED DOCUMENTS

The present invention claims priority to U.S. Provisional Patent Application Ser. No. 62/481,882 of Mauno KESKI-LUOPA et al., entitled "MAINTENANCE AND TRANSPORTATION METHOD, SYSTEM, AND APPARATUS," filed on Apr. 5, 2017, now pending, and is a continuation in part (CIP) of U.S. patent application Ser. No. 13/834,390 of Mauno KESKI-LUOPA et al., entitled "MODULAR LAWN MAINTENANCE MACHINE AND METHOD," filed on Mar. 15, 2013, now allowed, which claims priority to U.S. Provisional Patent Application Ser. No. 61/660,054 of Mauno KESKI-LUOPA et al., entitled "LAWN MAINTENANCE METHOD, SYSTEM AND APPARATUS," filed on Jun. 15, 2012, the entire disclosures of all of which are hereby incorporated by reference herein.

BACKGROUND OF THE INVENTION

Field of the Invention

The present disclosure generally relates to maintenance and transportation systems and methods, and more particularly to methods, systems, machines, equipment, automation, services, and the like, relating to landscaping, golf course maintenance, turf care, maintenance, transportation, and the like, for cities, communities, and the like.

Discussion of the Background

In recent decades, there have been great leaps of technology in machine and equipment design, and with respect to building such technology with increased use of electronic, electrical devices, information and communications technology (ICT), new types of power sources, automation, autonomous vehicle systems, and the like. However, such technology has not been extensively used in landscaping, golf course maintenance, turf care, maintenance, transportation, and the like, for cities, communities, and the like, nor has a service provider concept and business related thereto been extensively developed.

Therefore, there is a need for further development of such technology with respect to methods, systems, machines, equipment, automation, services, and the like, relating to landscaping, golf course maintenance, turf care, maintenance, transportation, and the like, for cities, communities, and the like.

SUMMARY OF THE INVENTION

The above and other problems with respect to lawn maintenance systems and methods are addressed by the illustrative embodiments of the present disclosure which provide a line of eco-friendly, cleantech and sustainable, electric and electronic, scalable, modular-designed, and the like, machines, vehicles, platforms, and the like, for lawn and other maintenance, transportation, agriculture, and the like, for cities and communities, and the like. Such machines can include single, three to fifteen wheel or more machines, and the like, all-wheel drive (AWD), fully electronic and electrical machines, vehicles, and the like, platforms with two to four front non-steerable and one to three rear wheel steerable machines, one to three front wheel steerable and two to four non-steerable rear wheel vehicles, and the like, three to fifteen, and above, machines with all-wheels steerable, four to eight wheel and above, vehicles being all-wheel drive and steerable, and the like, with steerable wheels having +/−90 and up to 360 degrees electric-electronic steering, and the like.

Accordingly, in illustrative aspects, there are provided a method, system and apparatus for a modular multipurpose machine or vehicle, including a modular scalable frame with battery incorporated into on the scalable frame; a modular electric drive system; and modular attachments or components for configuring the machine or vehicle for a plurality of maintenance or transportation functions. The modular electric drive system includes a power train with respective drive units for each of the front and rear wheels, each drive unit includes a planetary gear, and servo motor for each of the front and rear wheels. The power train includes steerable or non-steerable wheel power units, housing the respective drive units, and including respective servo controllers for each of the front and rear wheels. The wheel power units are configured for single, double or triple wheel configurations.

The machine or vehicle of claim 1, further including a positioning system; a computer controller coupled to the modular electric drive system, the modular attachments, and the positioning system; and a server coupled to the computer controller and which provides for unmanned, location based operation of the machine or vehicle, and the modular attachments.

The positioning system is one of a global positioning system, a Galileo positioning system, and a Glonass positioning system and which provides automatic steering.

The modular electric drive system includes the power train with interchangeable tires, and with the wheels, the planetary gears, the servo motors, the servo controllers, and the drives also being interchangeable across a plurality of multipurpose machine or vehicle platforms.

Still other aspects, features, and advantages of the present invention are clear from the following detailed description, by illustrating several illustrative embodiments and implementations, including the best mode contemplated for carrying out the present invention. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The embodiments of the present disclosure are illustrated by way of example, and not by way of limitation, in the figures of the accompanying drawings and in which like reference numerals refer to similar elements and in which:

FIGS. 4B-4C show a system for side-shifting of implements using the interchangeable implement lifting and lowering system;

FIG. 5A shows an implement and seat and steering column side-shifting system;

FIG. 14 shows further configurations for multi-wheel and multi-purpose machines;

FIG. 15 shows a walk behind single mower machine for multi-purpose operations and wireless communications using implements and designs of FIGS. 1-14;

FIG. 16A shows examples of modular-designed frames, from various views, including a seven wheel, all-wheel drive (AWD) machine built with interchangeable implements at front, under, behind, and above, with battery and electronics, and a five wheel, AWD platform tractor, as delivery vehicle, and the like;

FIG. 18A shows scalable, modular-design, easy-access, low bed vehicle and platform frames with built-in battery pack and electronics on four to eight all-wheel drive and all-wheel steering machines with 360 degree steering and all-wheel, air-fluid suspension for transport of people, goods or materials, being operator driven or configured for automatic, autonomous or robotic modes;

FIG. 18B shows scalable, modular-design transport vehicle and platform frame with built-in battery pack and electronics, and four to eight all-wheel drive and all-wheel steering machines with 360 degree steering and all-wheel, air-fluid suspension for transport of people, goods or materials, being operator driven or configured for automatic, autonomous or robotic modes;

FIG. 19A shows a side view of an automatic, autonomous or robotic mode electric bus with seats for four, eight or sixteen passengers built on the frames of FIG. 18A, in an operator driven mode with an operator cabin, with sliding doors on both sides, and with an optional, up/down-liftable rear door for loading and transport of long materials and/or transport of people using wheel chairs and/or rollators, lying down in bed, and the like;

FIG. 23A shows alternative implements and attachments mounting on machines and vehicles, including fixed mounting, side shifting and quick implements and attachments interchange, including telescoping side shifting, telescope moving and extending above an original width, automatic and autonomous, and unmanned interchange of implements;

FIG. 24 shows a further configuration of the walk behind, single mower of FIG. 15 configured with automatic and/or autonomous operation with positional tracking of FIG. 1B, fixed mounting of FIG. 23A, clipping collection of FIG. 10A, a crusher-shredder and remains spreader of the system FIG. 24, and with the implement lifting and down forcing system of FIGS. 21A-21B.

DETAILED DESCRIPTION OF THE PREFERRED EMBODIMENTS

Figure 1A:
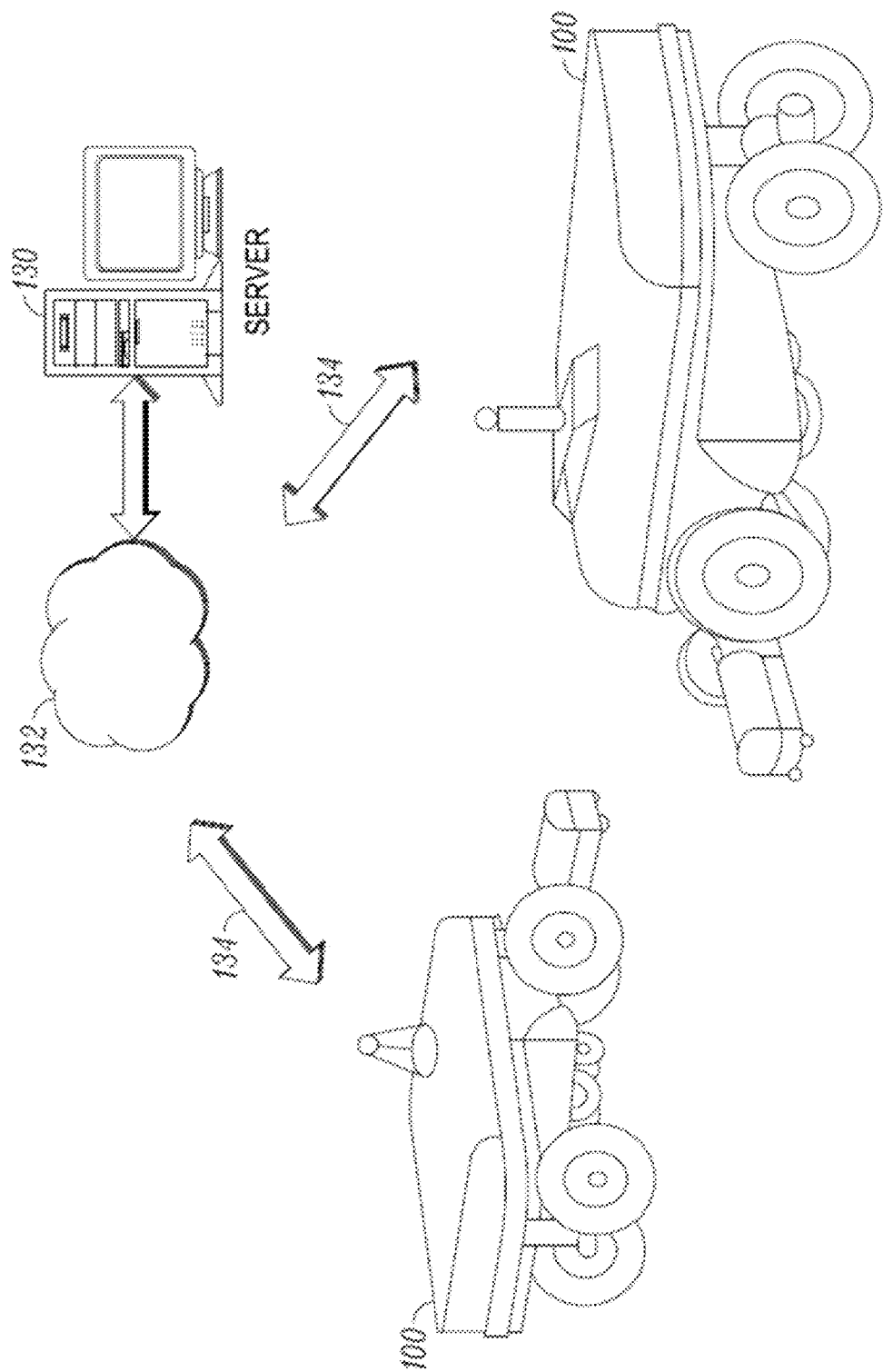
FIG. 1A shows machines and vehicles to improve landscape, golf course and turf care maintenance and operations and other outdoor work, per an embodiment of the present invention.

Generally, the present disclosure is directed to a new innovative, eco-friendly, sustainable, emission free, line of fully electric and silent, multi-purpose machines, equipment, services, and the like, for landscape, golf course maintenance, turf care, and the like. Such machines are mainly outdoor working machines and vehicles, with manned or unmanned autonomous operation, and built with remote wireless diagnoses, services, and the like, including a service provider system to perform a full range of service, and provide a work package coupled with leasing options to provide a service agreement with a one invoice per month package.

The present disclosure includes recognition that technology in machine and equipment design, and with respect to building such technology with increased use of electronic, electrical devices, information and communications technology (ICT), new types of power sources, automation, autonomous vehicle systems, and the like, has not being extensively used in golf course and turf care machines, and the like, nor has a service provider concept and business related thereto been extensively developed. The present disclosure further includes recognition that sustainability, eco-friendly designs, cleantech, environment and energy savings, and the like, are issues and requirements to be addressed for future developments.

In this respect, manufacturing of golf course mowing and related equipment is monopolized worldwide by handful of large, multi-billion dollar corporations, which merely watch and follow each other, without making technology leaps, and innovations, to limit risks. Accordingly, there are no newcomers in such markets, whereby golf industry customers, especially in Europe, are expressing that there are no new innovations available, and that machines are basically built using decade old technology.

For example, golf course and other turf care machines, and the like, are mainly designed and built under the principle of employing one type of machine for each job, where each machine is built using different components, which requires an extensive selection of components, resulting in high costs for stocking, production and services, large amounts of required storage space for manufacturing, as well as at the premises of the customer. In addition, component standardization has been neglected in such design and manufacturing.

Further, as each job employs a different machine, there are employed a large number of different types machines, working and driving around the working areas and therebetween. By contrast, the present disclosure is directed to employing multi-job machines, built with multiple implements, for performing such jobs in one go, resulting in efficient work, lowered investment costs, and less trampling of the turf, less cultivation being needed, and the like.

Moreover, conventional turf care machines, and the like, are mainly built with combustion engines and extensively hydraulics, resulting in high emissions and energy consumption, as well as service and repair costs. In addition, such machines are prone to high energy costs, and energy leakage. Accordingly, the work performed by such machines cannot be considered as eco-friendly cleantech golf course maintenance, and turf care.

Still further, golf course operators want to have their courses open and free for game play and without maintenance machines interrupting the game play and causing combustion engine noise, and the like. By contrast, the present disclosure is directed to employing machines that can be programmed to work early in the morning or during the night, advantageously, increasing revenues from the more rounds golf that can be played. In addition, golf courses and turf care areas are normally nearby houses and/or resorts, hotels, and the like, so that combustion engine based machines with high noise levels cannot work at night, because they would disturb people living and sleeping nearby. In addition, in quite a number of countries in Europe, landscaping, golf course maintenance, turf care, and the like, combustion engine based machines are prohibited during weekends due to the high noise levels caused by such machines.

Accordingly, the competition between golf courses, and the ever increasing costs, will force golf courses to improve their efficiency, and increase the number of paid rounds and turnover. By contrast, the present disclosure is directed to employing automation, and autonomous silent, emission free, machines that address the above and other discovered problems with conventional machines, advantageously, attracting high paying customers, and providing noise and machine free greens, cleantech golf courses, and the like.

In addition, there is a need for a high green speed, which is an important parameter for rating golf courses. This can be achieved by cutting greens very short or by employing leveling rollers. However, cutting the greens very short stresses the grass, and the use of leveling rollers is an additional job to be performed, resulting in increased costs.

Further, there are number of jobs, seeds, fertilizers, chemicals, top-dressing, and the like, that are used in golf courses beyond merely mowing. Each such job requires a specific machine and operator, and such jobs result in trampling of the turf and the application of materials in an inaccurate manner. By contrast, the present disclosure is directed to employing multipurpose machines that perform such jobs in an accurate manner, by employing electronics, electrical devices, programming, ICT systems, automation, and the like, resulting in accurate navigation, and efficient and precise golf course maintenance, turf care, and the like. In addition, such electronics, electric devices, programming, ICT systems, automation, and the like, has not been extensively used in golf course and turf care machines, nor has a service provider concept and business been extensively developed.

In addition, the present disclosure expands the utility of machines and vehicles to year-round operation by employ quick interchange of attachments and implements to meet the needs of different industries and seasonal applications. The present disclosure also provides scalable machines, vehicles and platform delivery innovations into the context of machine building, manufacturing, services, and the like. Advantageously, this results in high utility rate of materials, components, and the like, including speed-up, and faster renewal of machines and equipment, including energy efficient, multi-purpose, and multi-job, one pass machines with pollution free operation, and sustainable, cleantech electric systems.

Modular design, assembly, and innovations are provided into delivery and services to expand to new markets and applications, and reduce time to market entrance, from order to delivery, and to minimize stocking levels for components and parts from assembly to after service. Accordingly, a wide range of machines, equipment, and vehicles can employ shared, unified, and common components, to reduce costs in design, manufacturing, services, and the like.

The present disclosure includes machines, vehicles, and the like, that are multi-purpose, and provide multi-job operation in one pass, and the like, with quick interchange of attachments, and implements at the front, rear, above, under, and sides of the machines and vehicles, including battery packs placed inside the frames of machines and vehicles, and with unified, light weight, and sustainable box construction.

The present disclosure provides machines and vehicles for energy efficient and pollution free outdoor maintenance, and urban transport, and with battery to wheels energy efficiency rate of around 90%, by virtue of circulation economy, where all and/or most of the process data is collected during work, and mostly online re-processed to provide improvements and to minimize the use of chemicals. Renewable, sustainable, and new energy technologies, such solar, wind, and the like, are employed to reach energy efficient, zero-fine particle emission, and pollution free operation.

Accordingly, the present disclosure recognizes that there are different ranges of machines, implements and attachments, for example, to provide lawn and golf upkeep, and the like, and maintenance services for cities and communities, that are configured for single types of operations, and built with different components and assemblies, and designed for single purpose, and for performing one job at the time. The utility rate of such machines, equipment and systems is very low, includes mainly day time, and noisy operation. Such machines may be employed only a few weeks per annum, often reaching only a 10% utility rate from the annual 8760 hours available. The present disclosure increases such conventional utility rates by providing multipurposes and multi-job, one pass machines and vehicles, and the like, as well as operations and services designed to operate year-round, 365/24/7.

Thus, present disclosure recognizes that there is a need for further development of such technology with respect to methods, systems, machines, equipment, automation, services, including design of unified machines, vehicles and working methods, and the like, relating to landscaping, golf course upkeep, turf care, agriculture jobs, and maintenance for cities and communities, as well as transportation vehicles, services, and the like.

Objectives of the present disclosure include increasing the utility rate of machines, vehicles and equipment, and the like, saving energy by employing sustainable and cleantech operations, and the like, reaching energy efficient, zero-pollution operation, and the like, and building machines, equipment and vehicles with around 90% shared uniform and/or unified components, and the like.

Accordingly, the present disclosure provides a line of eco-friendly, cleantech and sustainable, electric and electronic, scalable, modular-designed, and the like, machines, vehicles, platforms, and the like, for lawn and other maintenance, transportation, agriculture, and the like, for cities and communities, and the like. Such machines can include single, three to fifteen wheel or more machines, and the like, all-wheel drive (AWD), fully electronic and electrical machines, vehicles, and the like, platforms with two to four front non-steerable and one to three rear wheel steerable machines, one to three front wheel steerable and two to four non-steerable rear wheel vehicles, and the like, three to fifteen, and above, machines with all-wheels steerable, four to eight wheel and above, vehicles being all-wheel drive and steerable, and the like, with steerable wheels having +/−90 and up to 360 degrees electric-electronic steering, and the like.

The present disclosure further includes up/down, scalable frames that are designed and built, and unified together with lithium-ion battery packs, electric and electronic systems and software, advantageously, resulting to innovative quick interchange of battery packs, implements and attachments, with an aim of easy and fast modifications and platform deliveries to meet new application requirements, and the like. Digitized 3D-designed drawings are employed and make it possible, for example, to carry out 3D manufacturing, and to send the drawings wired or wirelessly with just a few clicks, directly to computer numerical control (CNC) systems, and the like, to digitalized manufacturing systems, and the like, for production at a manufacturing company, and the like, and to subcontractors worldwide, and the like.

Advantageously, innovative scalable modular design of frames and components, sub-assemblies and ready to install assemblies, attachments, implements and platform deliveries can be carried out in the shortest possible time, and at competitive costs, and the like. Innovative, updated, scalable, all-wheel drive (AWD) units can be employed to provide equal wheel pressure, constant wheel contact with the ground, and the like. Electronic traction control can be provided by employing electric servo motors with servo driver/controllers, planetary gear drives, and the like, resulting in high wheel torque, acceleration, and ability to climb hilly, wet ground and turf without slipping or leaving tread marks, and the like.

Innovative, scalable, all-wheel steering, electric and electronic multi-wheel design, available as all-directional/omni-directional steering and driving, and the like, are employed to allow entry to hard-to-reach areas, reduce street side parking space, and the like, including configuration as unmanned, automatic, autonomous, and the like, machines, vehicles, and platforms. Innovative, scalable, all-wheel suspension, including mechanical coil spring suspension, air-fluid suspension, and the like, are provided, and built with electronic software control, and adjustable to fit various drive conditions, and the like.

Innovative, scalable, all-wheel disc brakes on machines and vehicles are provided, advantageously, resulting in increase of wheel load capacity on servo motor driven wheels, and the like, and that can be configured to meet traffic laws so to travel over public roads, and the like, to increase utility to wide range of applications, and the like, and to scale up to heavier jobs and transport operations, as needed. Innovative and scalable design for the operator can include seat locations, safety guards, and various models of cabins, and the like, based on unified construction, materials, production, and the like.

Innovative, quick interchange, implements and attachments, built with 3D-design, pre-programmable digitalized software, and the like, and installable on the front, rear, above, under, and sides of the machines and vehicles, are provided and can be built with quick battery pack interchange, for multi-purpose, one pass jobs, and the like. Advantageously, such machines can provide business applications and industries with a single machine that can do anything from lawn care, outdoor upkeep, maintenance and transport, and the like, for cities and communities, and reaching 365/24/7 operation, for a full rate of machine utilization with an objective to reach 50 to 100% availability of the 8760 annual hours, whereas current competitive systems may reach a mere 10% rate.

Figure 8:
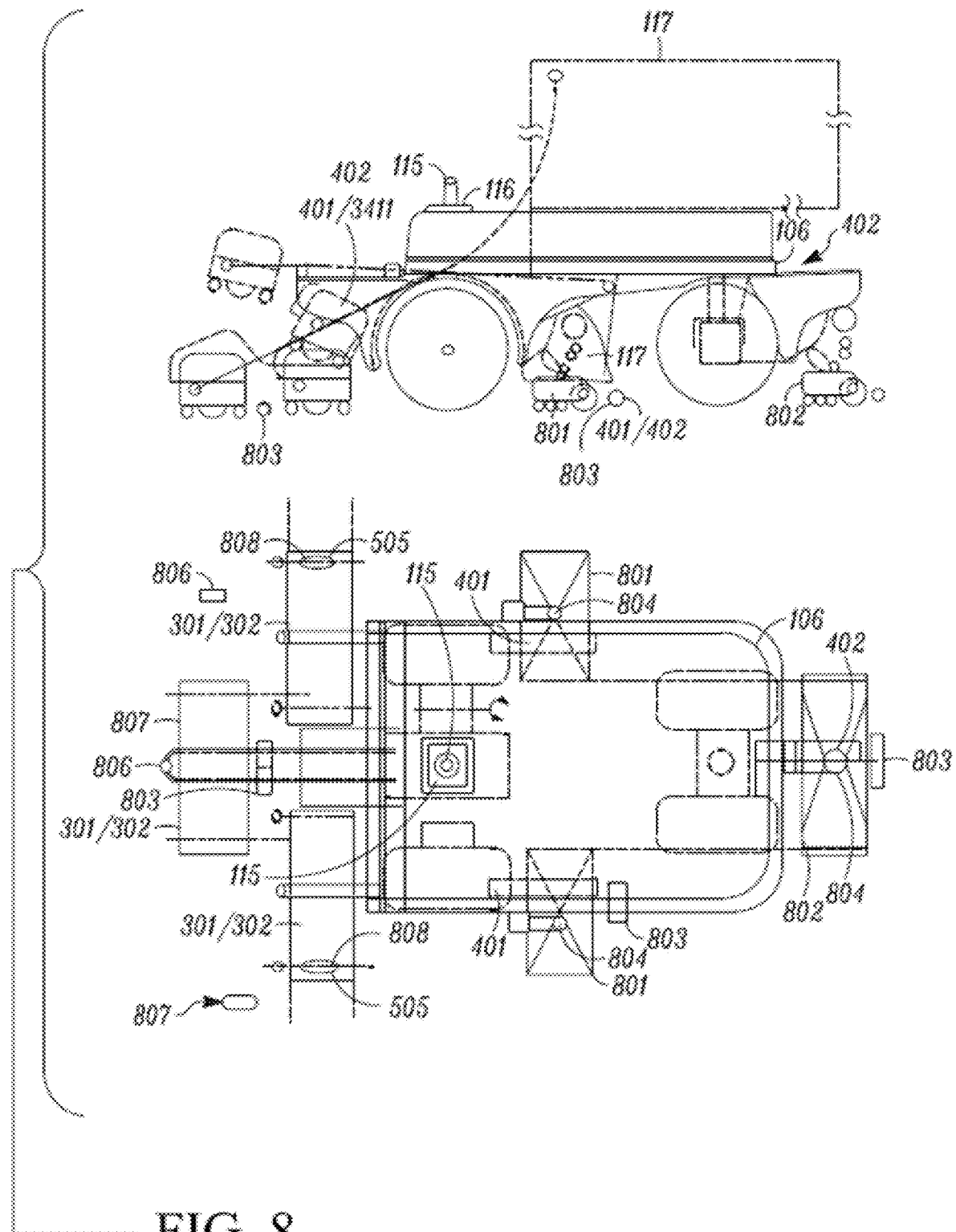
FIG. 8 shows capabilities for multi-purpose work with one pass operation.
Figure 10A:
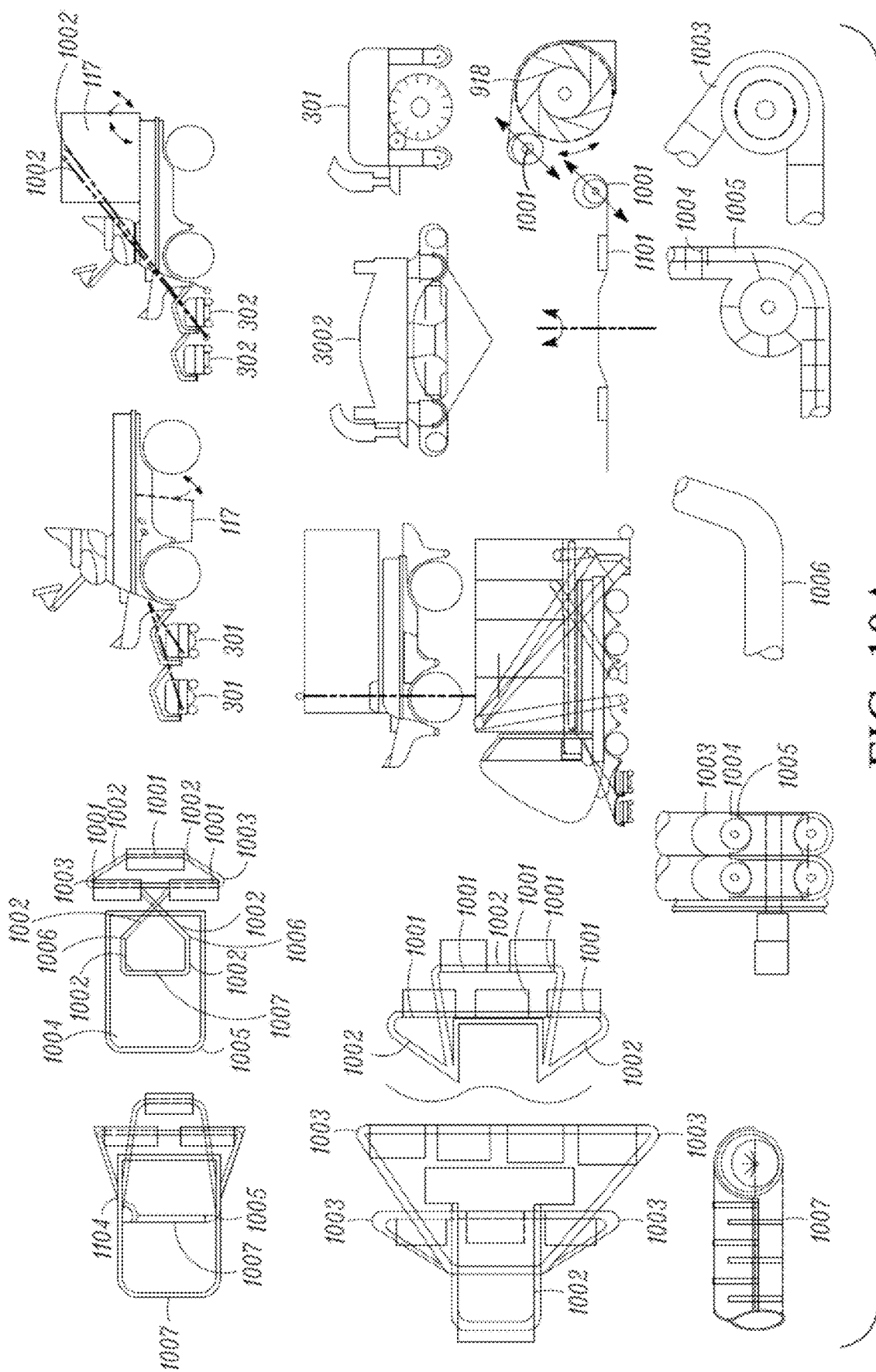
FIGS. 10A-10B show an automated clipping collection and dispersion system, which result in silent mowing of greens, fore-greens, collars and Tees with the machine of FIGS. 9A-9B configured for one pass operation.
Figure 13A:
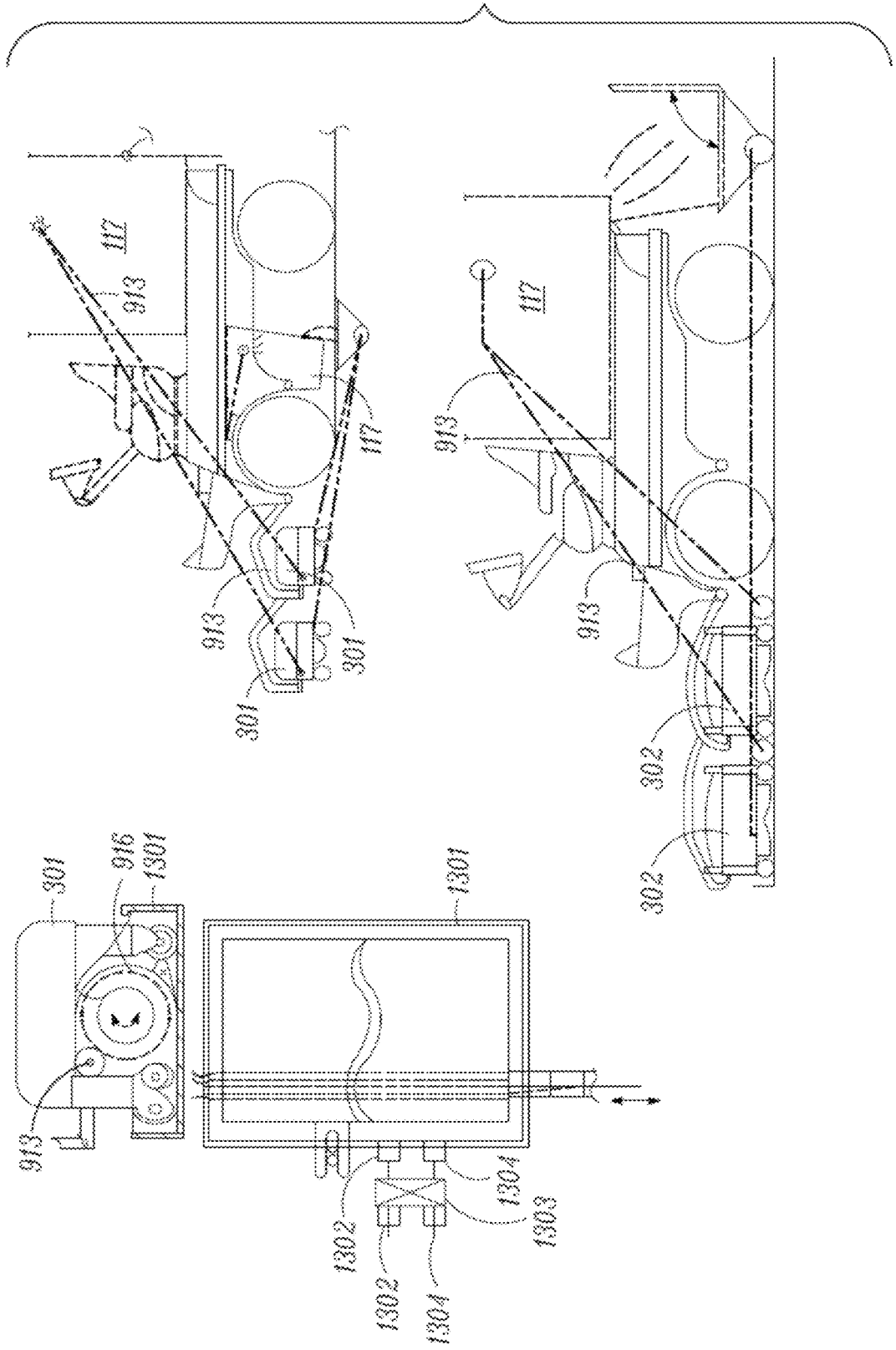
FIGS. 13A-13B show an automatic and programmable mowing unit washing and drying operation.
Figure 13B:
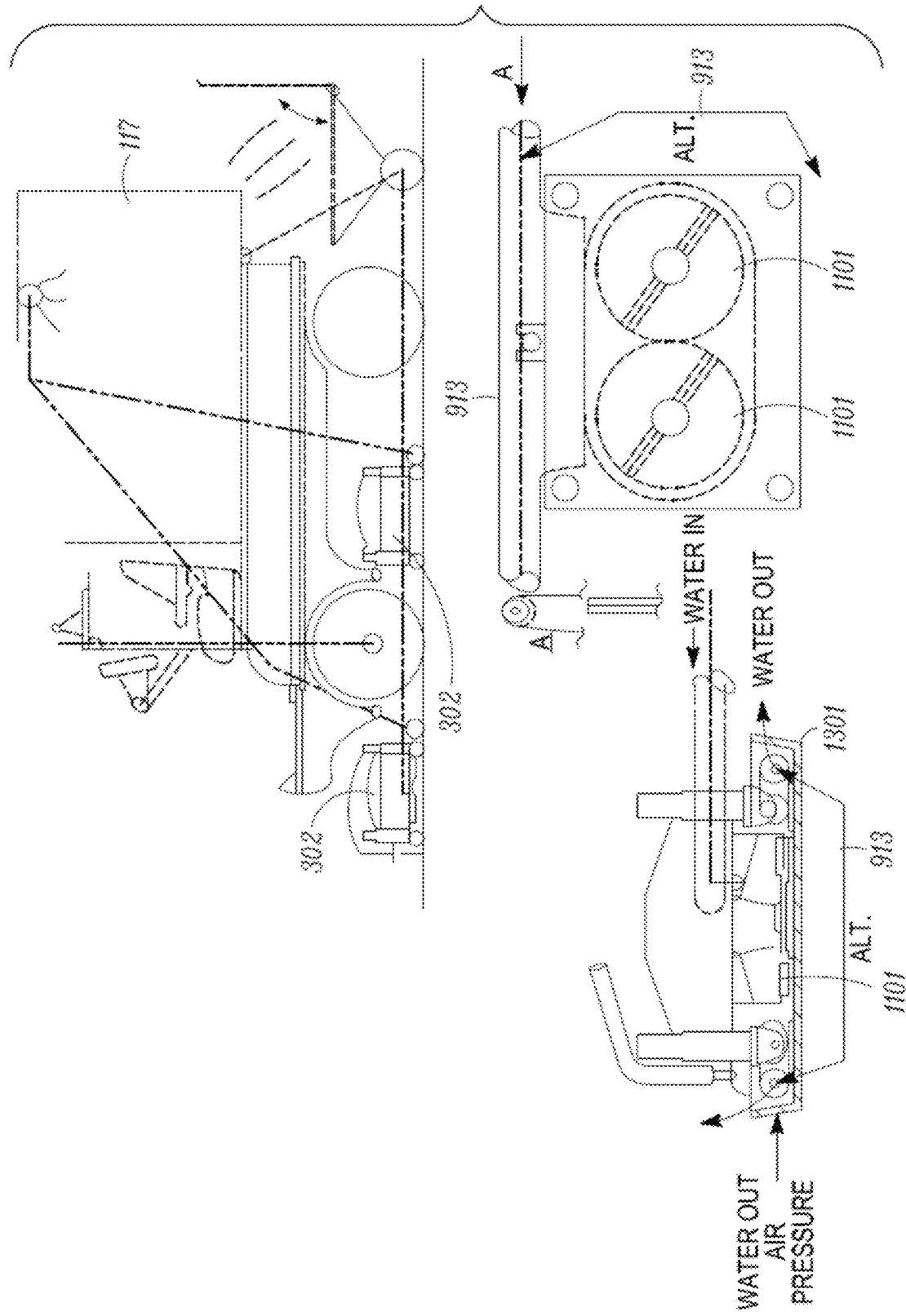

Innovative closed clippings, leaf collection systems, as described with respect to FIGS. 8 and 10A, maintain implements, machines, and vehicles tidy and clean, whereas FIG. 13B includes an automatic washing system with water re-cycling, and air drying inside the system, to clean the systems inside, to reduce messy manual jobs, and to increase utility life time of machines, equipment and implements. Such closed clippings, and collection system, includes crushing, shredding, systems, and the like, to process and re-circulated collected materials to be provided as fertilizer by dispersing and/or collection, and for sustainable energy production, and the like.

An innovative, unified implement mounting system is configured to pick up an extensive range of attachments and implements, and to perform implement side shifting to meet application requirements. Such extended implement side shift to the outside of the machine can be configured to provide automatic, unmanned, autonomous machines and vehicles that perform the interchange of implements for next jobs, and including unmanned battery pack interchange, and the like.

The electric and electronic system built with servo motors and servo drivers/controls in all the suit table important functions, result in multi-fold operating lifetime, easy and automatic Industrial Internet (IoT) data collection, analyzed without separate sensors, and wireless transfer to worldwide service provider system, to improve operations, to increase equipment lifetime, to reach 100% utility of investments, to exploit "One-Invoice-Monthly" services with accurate and almost nil costs of administration. The innovations including all-wheel drive built with servo motors, servo drivers/controls and planetary gears, swiveling wheel system, equal all-wheel pressure on ground, all-wheel electronic traction control, accurate tracking, and the like, are advantageous elements for implementing 365/24/7, year-round, automatic and autonomous maintenance and urban transportation for smart cities and communities, for example, using lidars, radars, cameras, sensors, and the like, and to safeguard travel on public streets and roads. By contrast, the current machines and vehicles under developments have difficulties in traveling in wintertime, when snow covers the roadway markings and signs, and wheels are slipping.

The innovative automatic and autonomous machines and vehicles and robotized multi-task systems can also be used for multi-job cultivation at agricultural and farming facilities, and the like. The innovative, scalable, modular design machines, vehicles, and platforms built with electric servo motors and controllers/drivers, and the like, together with wireless worldwide remote diagnoses, and an Industrial Internet Service Provider System, obviate a need for separate sensors to be continuously checked, and the like. Such machines can be equipped, outfitted and modified with implements designed for new industries and applications, advantageously, so as to play an important role in the fight against global warming, and so as to speed up the beginning and expansion of an era of a sustainable, eco-friendly world, and the like.

Referring now to the drawings, wherein like referring numerical designate identical or corresponding parts throughout the several views, and more particularly to FIG. 1A, thereof there is illustrated an example of a golf course maintenance machine, per an illustrative embodiment. In FIG. 1A, one or more machines 100 can be coupled via wireless communications links 134 and communications network 132 to a server 130 of a service provider for performing remote diagnosis and any other suitable functions, and the like, as further described.

Figure 1B:
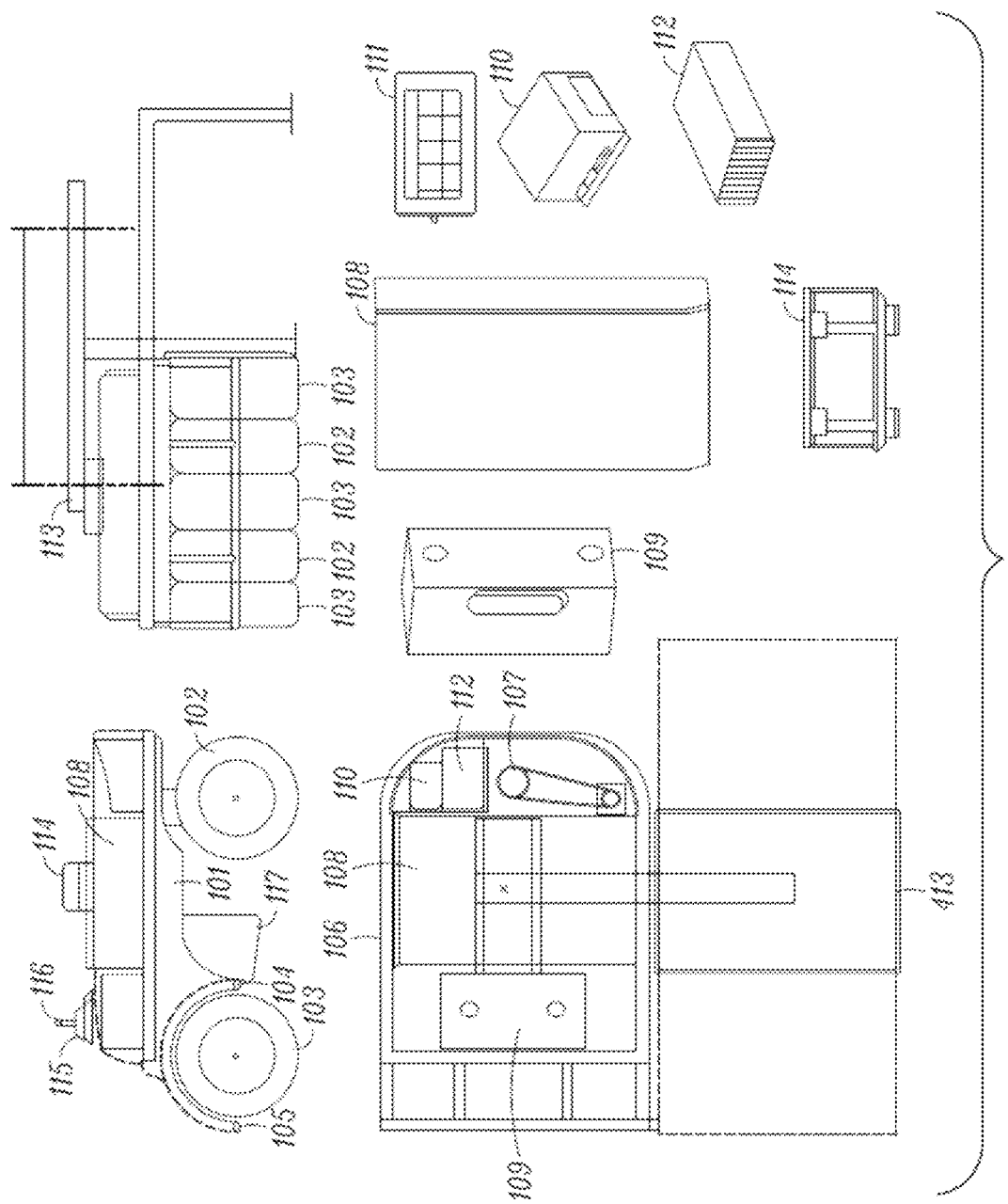
FIG. 1B shows examples of frame, electronics, electric battery powered with manual or automated quick exchange battery pack, autonomous or operator driven machines built with wireless remote diagnose operating control for the improvement of after-sales-service to increase machine utilization rate and for collection of operational data for service provider purposes.

FIG. 1B shows an illustrative embodiment of the electric, electronic, automation, and service provider based, autonomous working machine system 100 of FIG. 1A. In FIG. 1B, the machine system 100 can include a machine frame 101, a steerable rear wheel system 102 described with respect to FIGS. 1B and 2, front wheel system 103 described with respect to FIGS. 1B and 2, implement mountings 104 and 105 described with respect to FIGS. 1B, 4, 7 and 8, implement mounting hollow rectangular tube 106 described with respect to FIGS. 1B and 8, and steering system and column 107 described with respect to FIGS. 5 and 6.

Figure 9A:
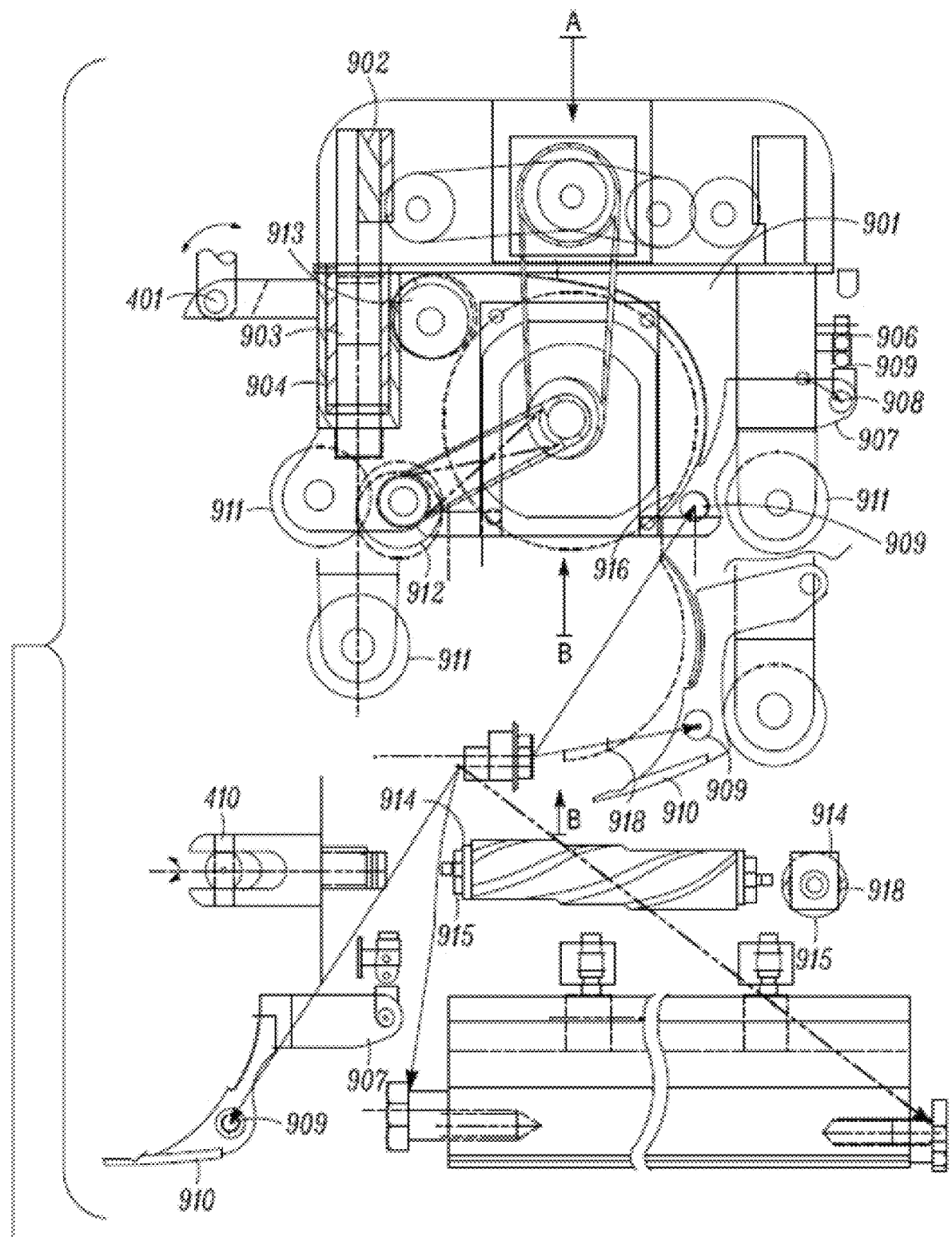
FIGS. 9A-9B show a reel type mowing unit with programmable cutting heights and reel speeds and clippings collection.
Figure 9B:
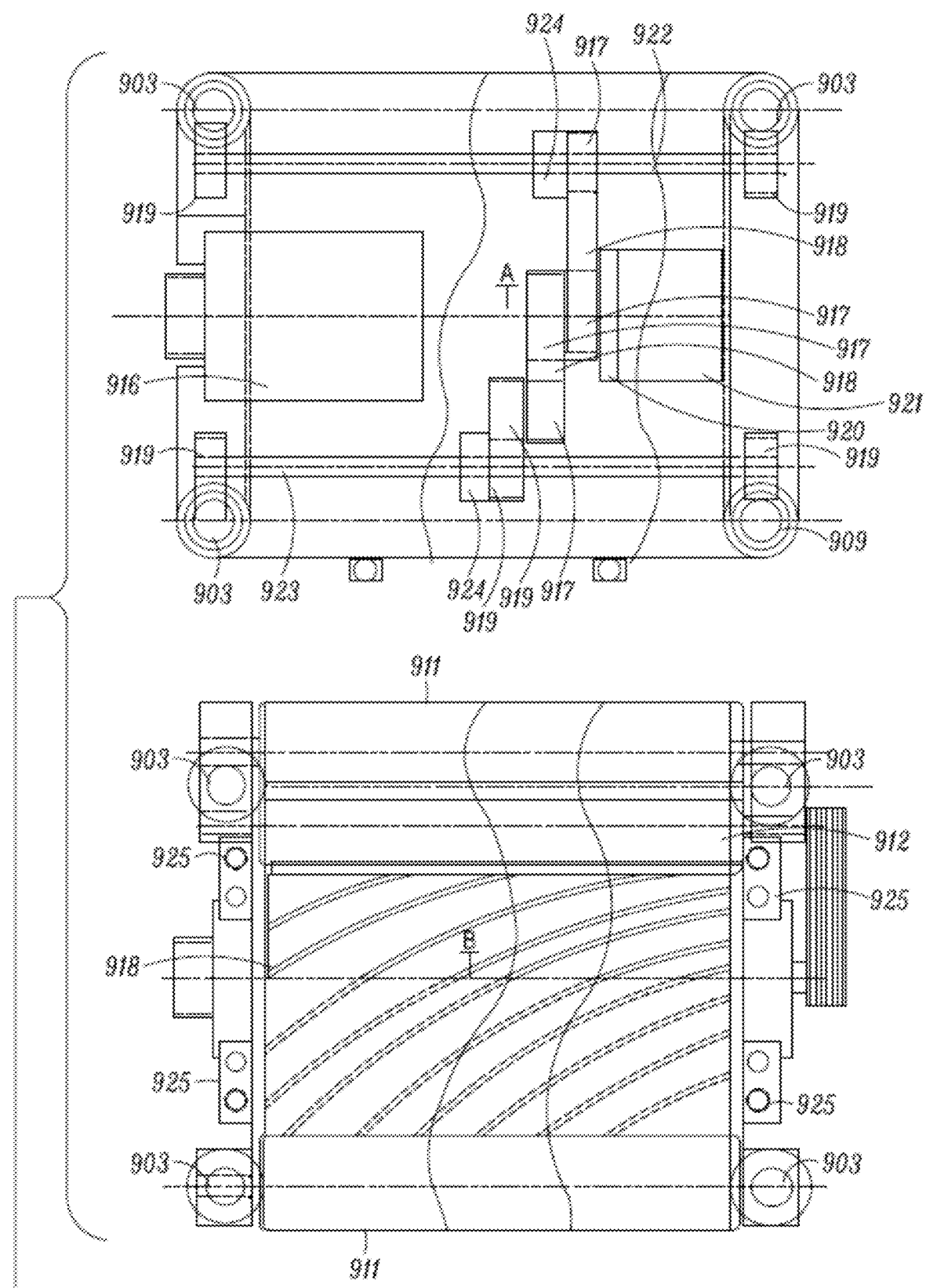
Figure 10B:
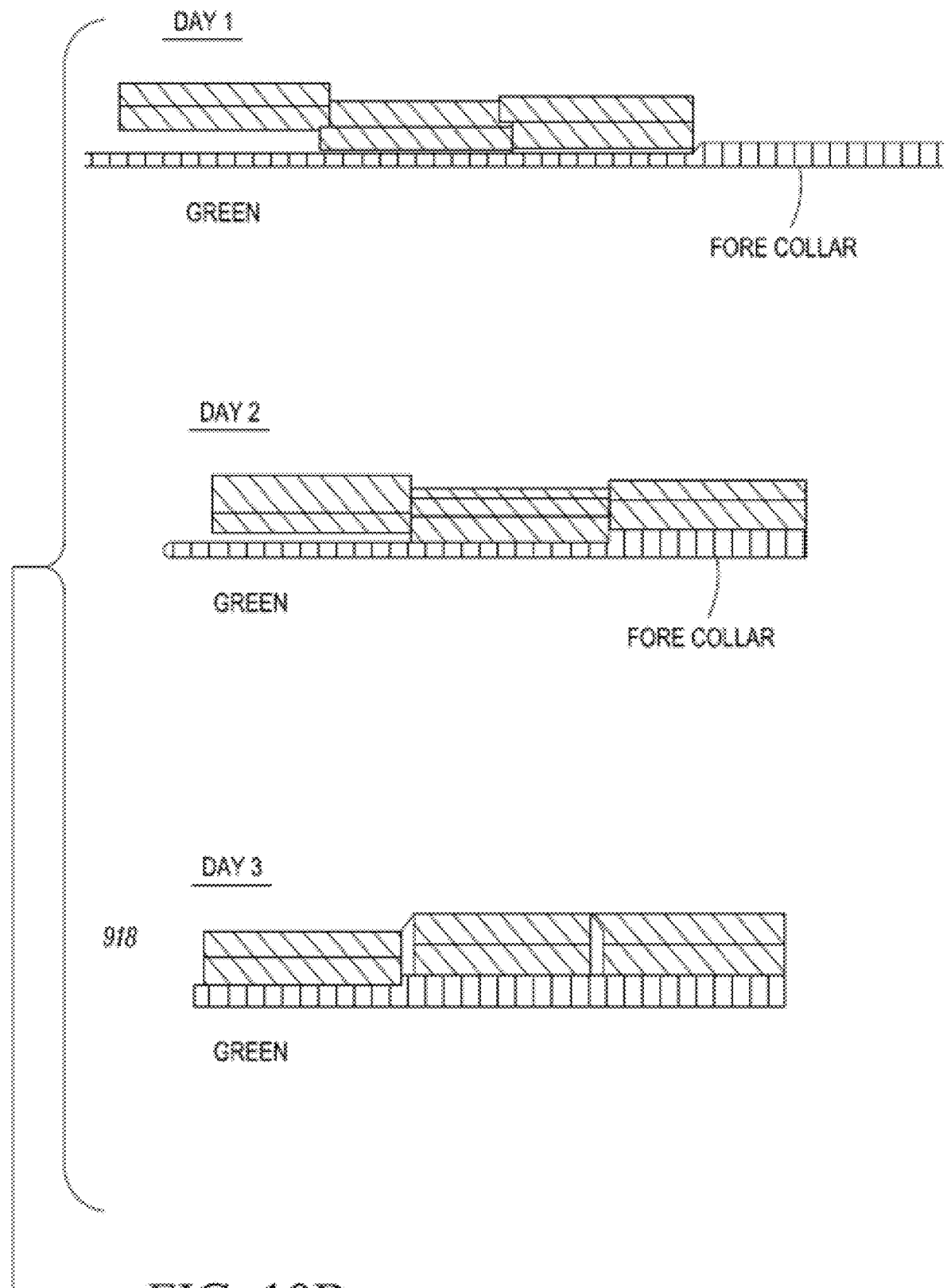

The machine system 100 can further include quick exchange battery pack 108, electronics box 109 including central computer, internal and external communication systems, data collection with remote wireless diagnoses and service provider systems and programs, autonomous working machine electronics and programs, Battery Management System (BMS) 110 for controlling the battery pack system, touch screen user interface 111 for operating system (not shown) and wireless communication system (e.g., GSM, 3G or 4G, smart phone, etc.), charger 112, manual/automatic battery pack quick exchange system 113, battery pack lifting unit 114, receiver/antenna 115 (e.g., VRS GPS/GLONASS/GALILEA, etc.) and receiver/antenna systems 116 (e.g., VRS GPS/GLONASS/GALILEA, etc.) for autonomous machine operation and data collection for the central computer or server 130 and suitable computer programs thereof (not shown), clippings collection box 117 of an automatic clippings collection and dispersion system described with respect to FIGS. 10A-10B, and programmable cutting height selection and rotation speed programming systems described with respect to FIGS. 9A-9B. In further illustrative embodiments, the batteries of the machine 100 can be charged using suitable solar panels (not shown) located on the machine 100 and/or at a charging station.

The touch screen user interface 111 can include cellular phone, smart phone, and the like, functionality (e.g., Nokia, Windows, Android, Apple based, etc.). Advantageously, when starting the machine 100 for the first time, operators can uniquely identify themselves, for example, via a user login and/or bio-metric system having suitable readers (e.g., finger print, iris, facial, etc.) of the user interface 111, whereby suitable machine operating and safety instructions can be displayed on the user interface screen to the operator.

In this way, the operator can confirm reading and understanding of the instructions in order to put the machine 100 in an operating mode. On subsequent operation of the machine 100, the operators can digitally sign in via the user interface 111 by identifying themselves via login and/or the bio-metric system. Advantageously, such functionality can be used to reduce of accidents, and prevent miss-use, theft, and the like, of the machine 100. In addition, such functionality can be used for operator efficiency rating, bonus payments, identifying accident prone operators, and the like.

The electric and electronic battery system with quick exchange battery pack provides for lower machine weight, and reduces aeration, ground trampling, and the like, due to the reduced wheel loads, and can use of braking energy to charge the battery pack. Advantageously, this can increase operation time between battery charging and reduce energy costs for increased sustainability.

Figure 2:
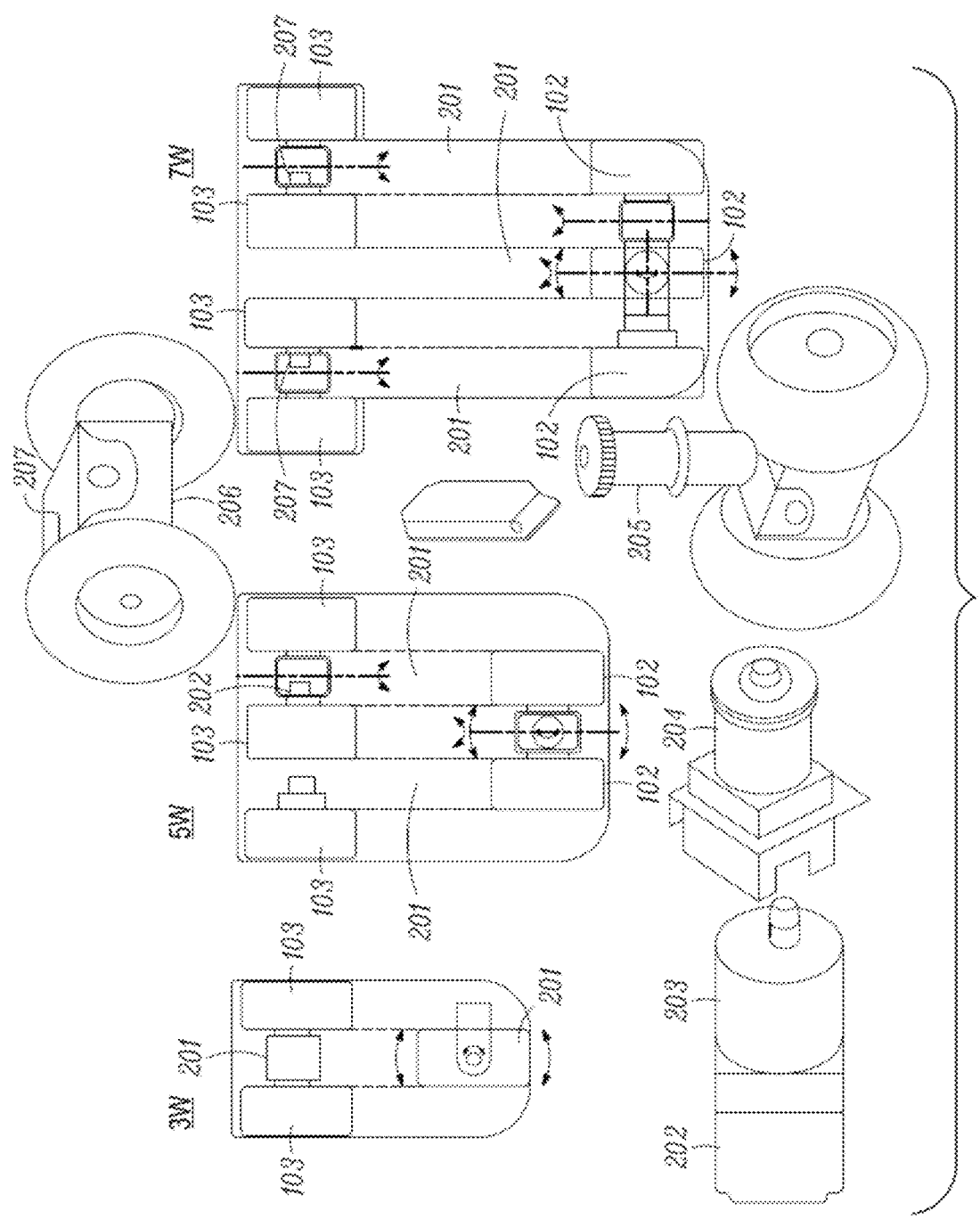
FIG. 2 shows interchangeable drive and steering on 3-, 5- and 7-wheel vehicles and machines.

In FIG. 2, various wheel patterns 3, 5 and 7 are shown for the frame 101. Wheels 103 in the front are followed by wheels 102 in the rear for tracking the free space 201 left by the front wheels 103. Advantageously, this provides leveling of the ground without leaving individual tire tracks, and with the load being evenly distributed and with a larger area of wheel prints on the ground due to the higher number of wheels, as compared to conventional machines.

In FIG. 2, the interchangeable drive power packs are described with servo motor 202, planetary gear 203 built into interchangeable drive unit 204 and placed inside interchangeable double wheel steerable power pack 205 and interchangeable double wheel non-steerable power pack 206. In this way, the wheels follow the ground by the swiveling of the double wheel bodies 205 and 206 via interchangeable servo controller 207, which can control various sizes of servo motors employed. Accordingly, interchangeable units can be used, for example, on 9, 11 to 15 wheel machines, as further described with respect to FIG. 14. Interchangeable power packs 205 and 206 can include interchangeable wheel rims, wherein the tires can employ a smooth surface or any suitable pattern according to the job. For automated quick return steering, the center wheels in front can raise up by raising unit 207, whereby the machine 100 can turn around a center point between the outer front wheels, without causing wheel marks on the ground, and for speeding up the work process.

Figure 3:
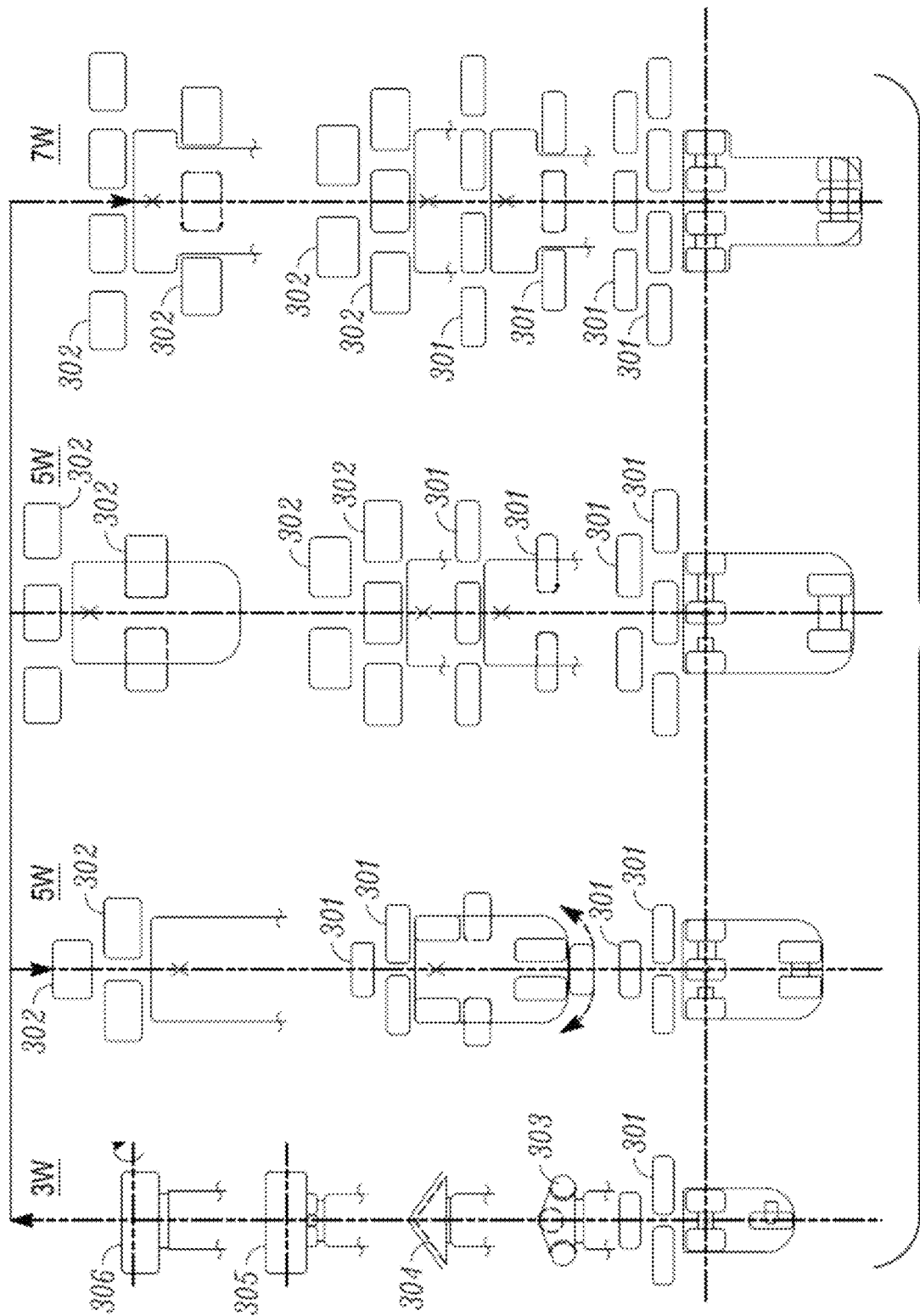
FIG. 3 shows different mounting of reel and rotary mowing units or other implements on type 1, 2 and 3 machines.

In FIG. 3, different mowing units, including reel 301 and rotary 302 mowing units and/or illustrative implements (e.g., designed for different frames and wheel patterns from 3 to 7 wheel machines), such as fixed deck rotary mowing 303, snowplow 304, snow blower 305, brushing 306 units are shown on the various frame sizes and numbers of wheels (e.g., 3, 5 or 7 wheel), and which allow for operator visibility (e.g., as shown marked with an "x") to the outer edge of the outer mowing units. Reel mowing mechanism 301 is further described with respect to FIGS. 9A-9B, and alternatively rotary mowing decks/units 302 are further described with respect to FIGS. 11A-11B. Reel 301 and especially rotary 302 mowing units and other implements can be built with an automatic clippings collection and dispersing system with respect to FIGS. 10A-10B, and can be modified in other applications. The machines with the 5 wheel configuration can have a 4 or 5 wheel drive with different battery pack sizes, according to the job being performed.

The machines of FIG. 3 can also be built with the configurations, where the outer mowing units are placed outside and in line with front wheels on 5 wheel and 5 mowing unit and 7 wheel and 7 mowing unit machines. Whereby one 5 wheel and 5 reel mowing machine can perform the mowing of greens, semi-greens/collars, Tees, fairways, and the like.

The 5 wheel machines of FIG. 3 can be built with longer wheel base, for example, as 7 wheel machines, and with an added capacity battery pack system. Instead of the bigger capacity battery packs, the automatic or manual quick exchange battery pack systems can be used to extend operating times. Advantageously, additional implements can be added, according to examples further described with respect to FIG. 8. In addition, the machines 100 shown on FIG. 3 can be built using well over 90% and up to 95% interchangeable components, resulting in reduced manufacturing costs, outsourcing, training, after sale servicing, logistics, and the like.

Figure 4A:
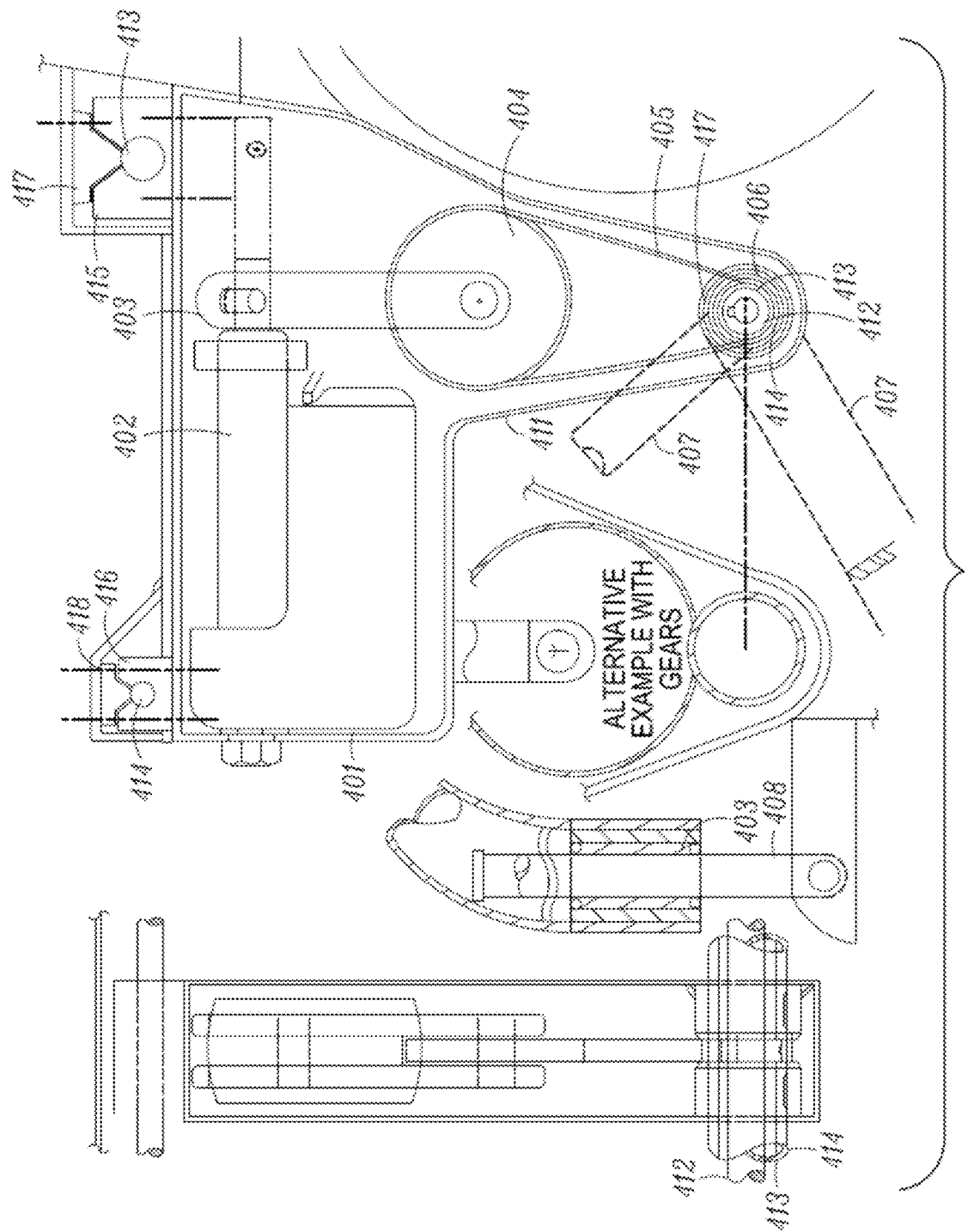
FIG. 4A shows an interchangeable implement lifting and lowering system with quick exchange of implements.

FIG. 4A shows an interchangeable implement lifting/lowering system 401 with a built-in feature of subjecting implement down force and with innovative quick implement exchange and side-shifting. The system 401 includes linear motor 402, moving lever 403 that is pushed and pulled by linear motor 402, and which turns pulley 404. The system 401 further includes timing belt 405 turning pulley 406, whereby implement mounting arm 407 can move up or down to lift or lower implements fixed on swivel joint shaft 408, which moves up and down inside linear slide bearing 409 for automatic implement ground tracing and lifting and lowering, as further described with respect to FIGS. 7A-7B. The lifting/lowering system 401 is mounted on frame 411. Tempered and ground shaft 412 is mounted on the machine frame 411 at both ends with mounting units. Linear slide bearing or ball bushing or bearing bushing 413 allows the outer round tube 414 to turn around shaft 412 on lifting and lowering action. The square hollow tube (not shown) is fixed on tube 414 and rotates with tube 412. The fork (not shown) is fixed on mounting arm 407 and locking device 417 and allows implement mounting arm 407 to be changed quickly, resulting in quick changing of implements. Alternatively tube 414 is built with welded locking key 417, as shown on FIG. 4B, and implement mounting arms 407 can be locked in a desired position. Supports 427 mounted on machine frames 101 shown in FIG. 1A are built with a % slide bearing that allows shafts 414 to slide during side shifting, advantageously, providing additional support and rigidity to the system.

Figure 4B:
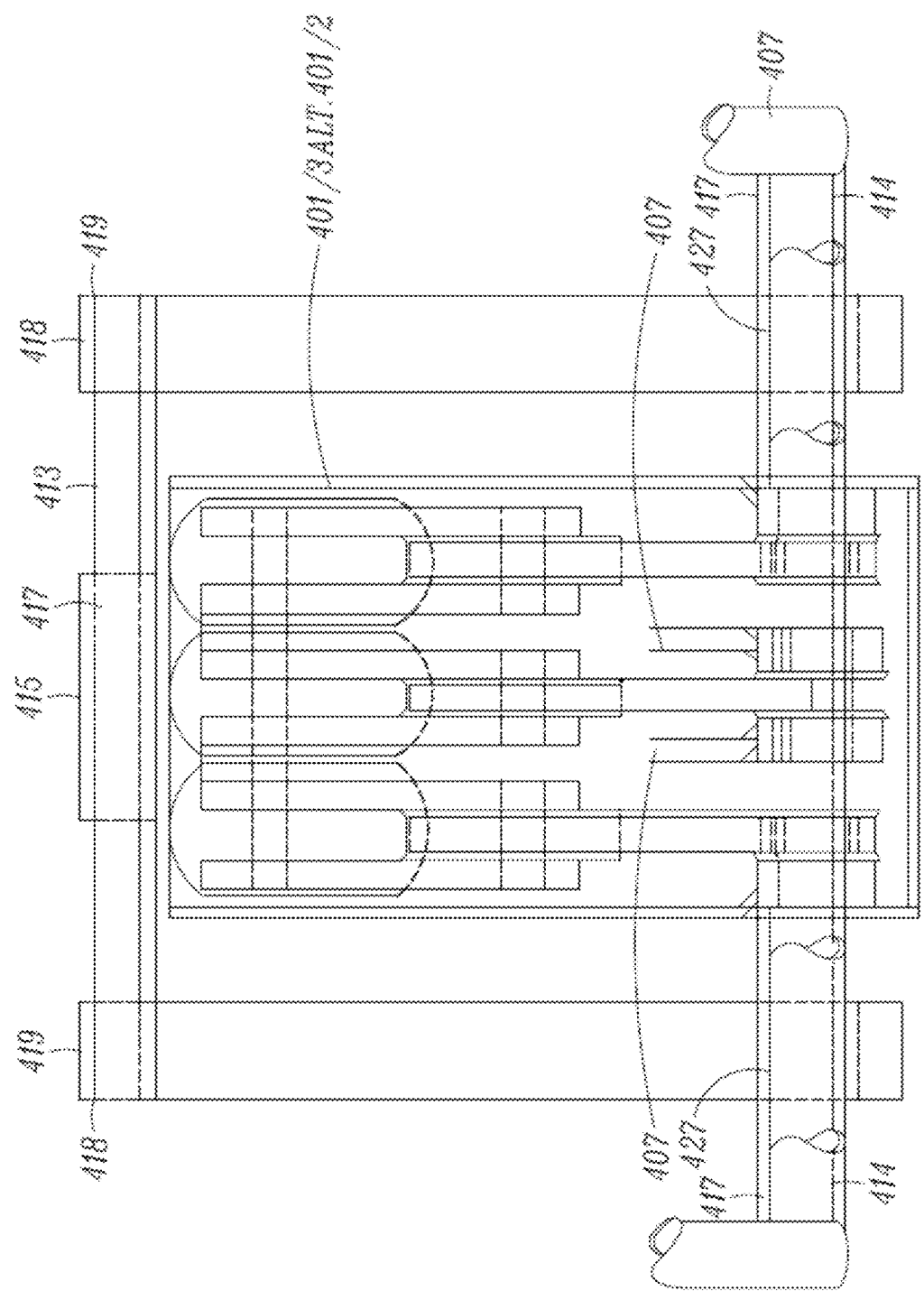

FIG. 4B shows 3 units 401 built into a 3 unit system 401/3 or alternatively a 2 unit system 401/2 (not shown) to perform 3 or alternatively 2 implement raising and lowering operations with down forcing and/or manual and/or motorized (not shown) side-shifting. The innovative side-shifting uses shafts 413 and 414 and linear slide bearings units 415 and 416 to allow the bolted assembly 411 to slide on shafts 413 and 414 at the top thereof via shaft fixing units 418 and 419 shown in FIGS. 4B and 4C, and shaft support 417 and 418 fixed on the machine frame thereabove. Accordingly, the assembly 411 can slide sideways, whereby implements can be moved sideways, according to job requirements, either manually or using a linear motor or other suitable motor system, and the like, by an operator and/or in an automated mode on autonomous machines.

FIG. 4C shows an example of a system, wherein the 3 piece assembly 411/3 of FIG. 4B is mounted on shafts 412 and 414, and forming the implement side-shifting system. The implement mounting arms 407 on FIG. 4A are replaced with implement mounted arms 420, 421 and 422, wherein various implements 426 can be side-shifted manually and/or in a motorized manner, and the like.

FIG. 5A shows side-shifting subsystem 501 as seen from seat 502 of the operator. In FIG. 5A, the seat and steering column can be adjusted, as indicated by dashed lines, so to provide a proper fit for the operator. Element 503 shows side-shifting of the seat 502 to assist operation by employing front railings 504 and rear railing 505 under the seat 502 in a manual or motorized manner. A chain, rope, indicator 507, and the like, hang down and can act as an operator assistor, wherein outside areas thereof implement a working area for the operator and raise the quality of work in progress.

Figure 5B:
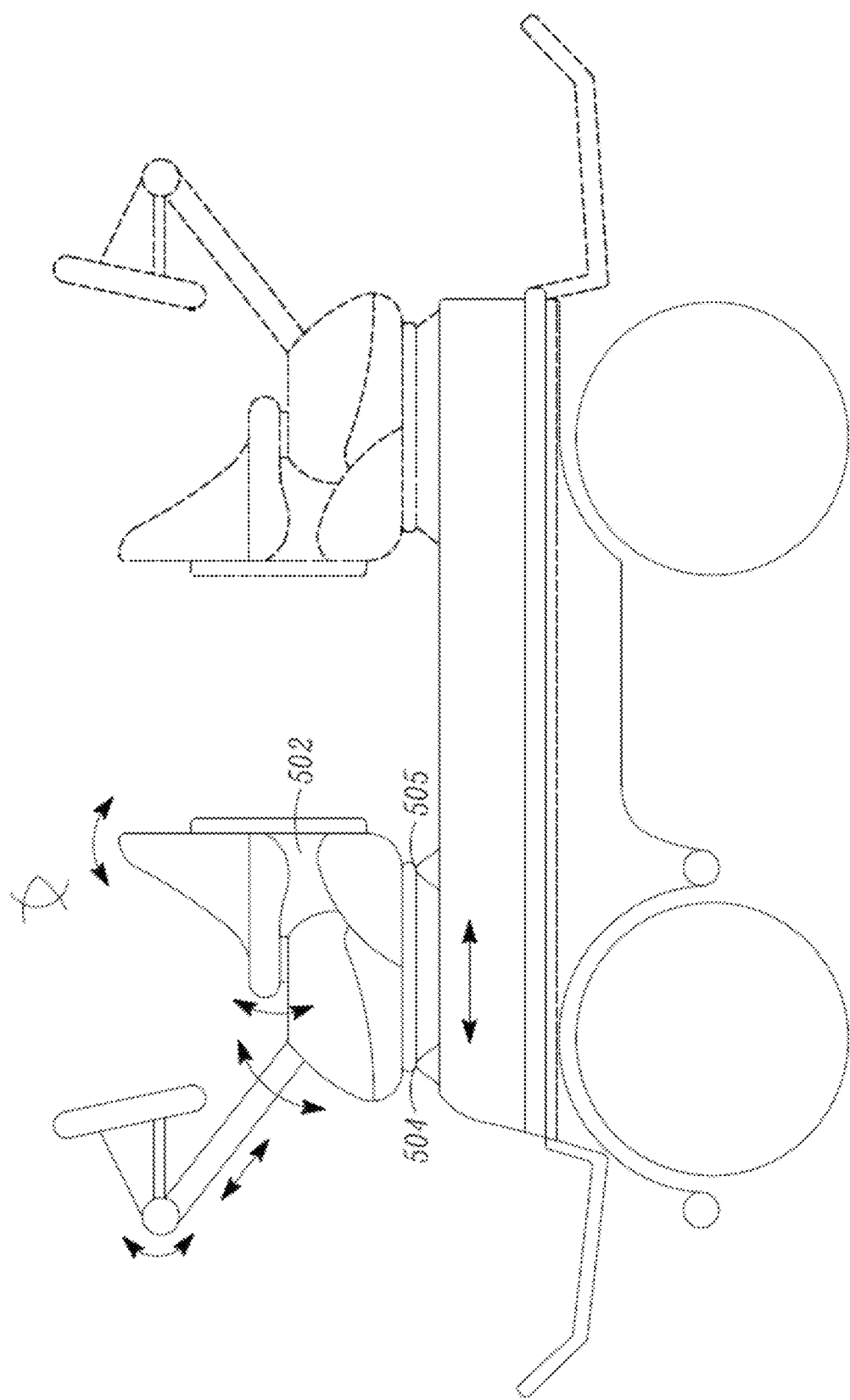
FIG. 5B shows alternative mounting of seat and steering column for implement pushing or pulling operations including tractor functions.

FIG. 5B shows that the seat and steering column 502 can be placed in a forward driving mode for pushing the employed implements forward or in a rearward driving mode for applications employing the machine 100 as a tractor and/or for pulling various types of implements. Rectangular hollow tubes 506 are employed for fixing the seat and steering column 502 to the frame of the machine 100 towards a suitable direction based on a given application and/or job. Advantageously, the seat and steering column 502 can be easily replaced with suitable electronics, programs, antenna/receiver systems (e.g., VRS GPS/GLO-NASS/GALILEA, etc.), and the like, as described herein, so as to transform an operator driven system into autonomous, unmanned system at later date.

Figure 6:
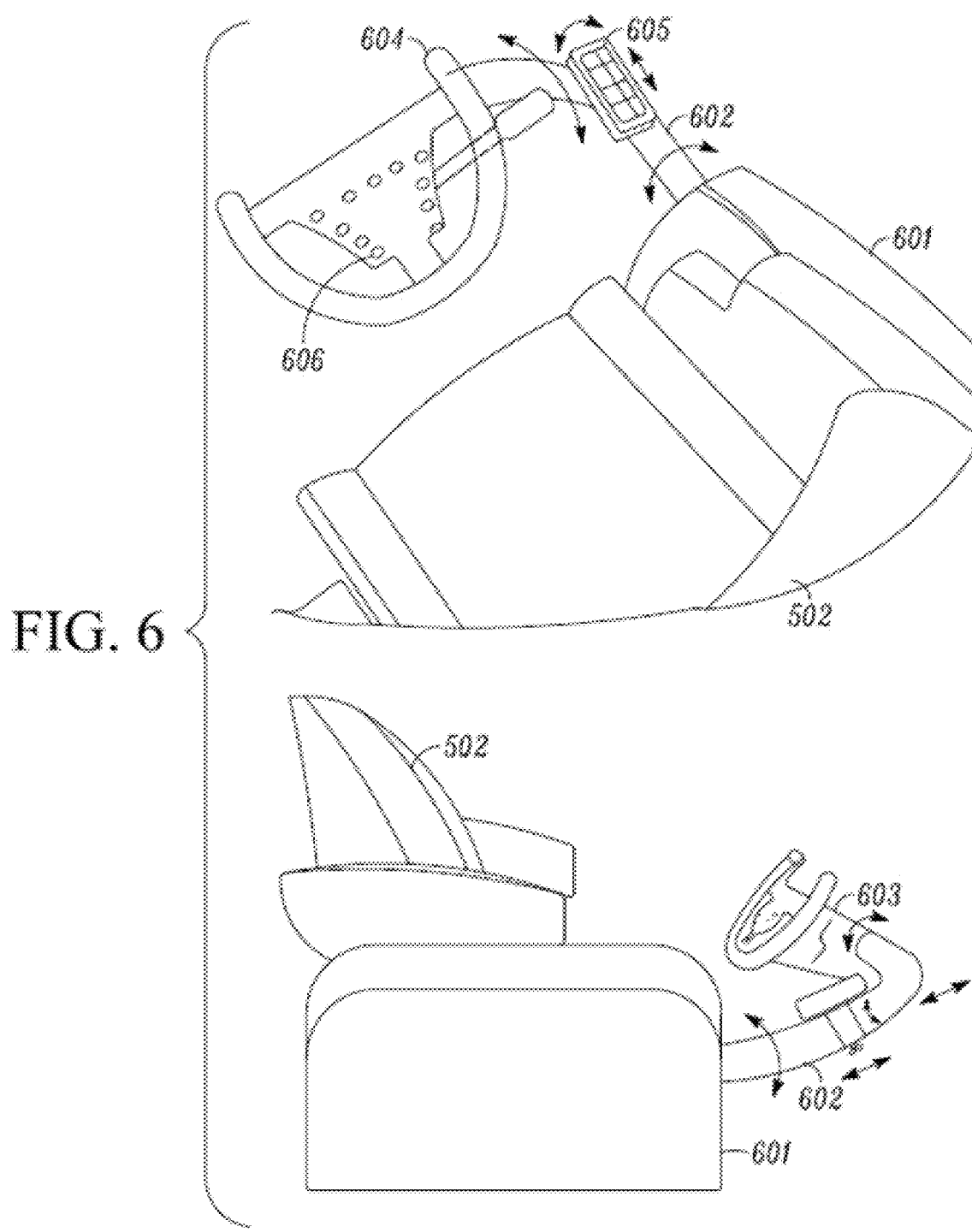
FIG. 6 shows seat and steering column design with wireless communications.

FIG. 6 shows the seat 502 with a steering column assembly 601, wherein examples of various steering column adjustments are shown. The steering column mounting 601 includes position adjustments and electronics and a tubular steering column support tube 602 for installing employed electrical wirings, and the like. Further shown are steering column box 603, and steering wheel 604 with touch screen 605 and/or smart phone interface for machine and implement operation and wireless communication. Areas 606 inside the center of the steering 604 can be used for placing various control buttons, selection buttons, and the like.

Figure 7A:
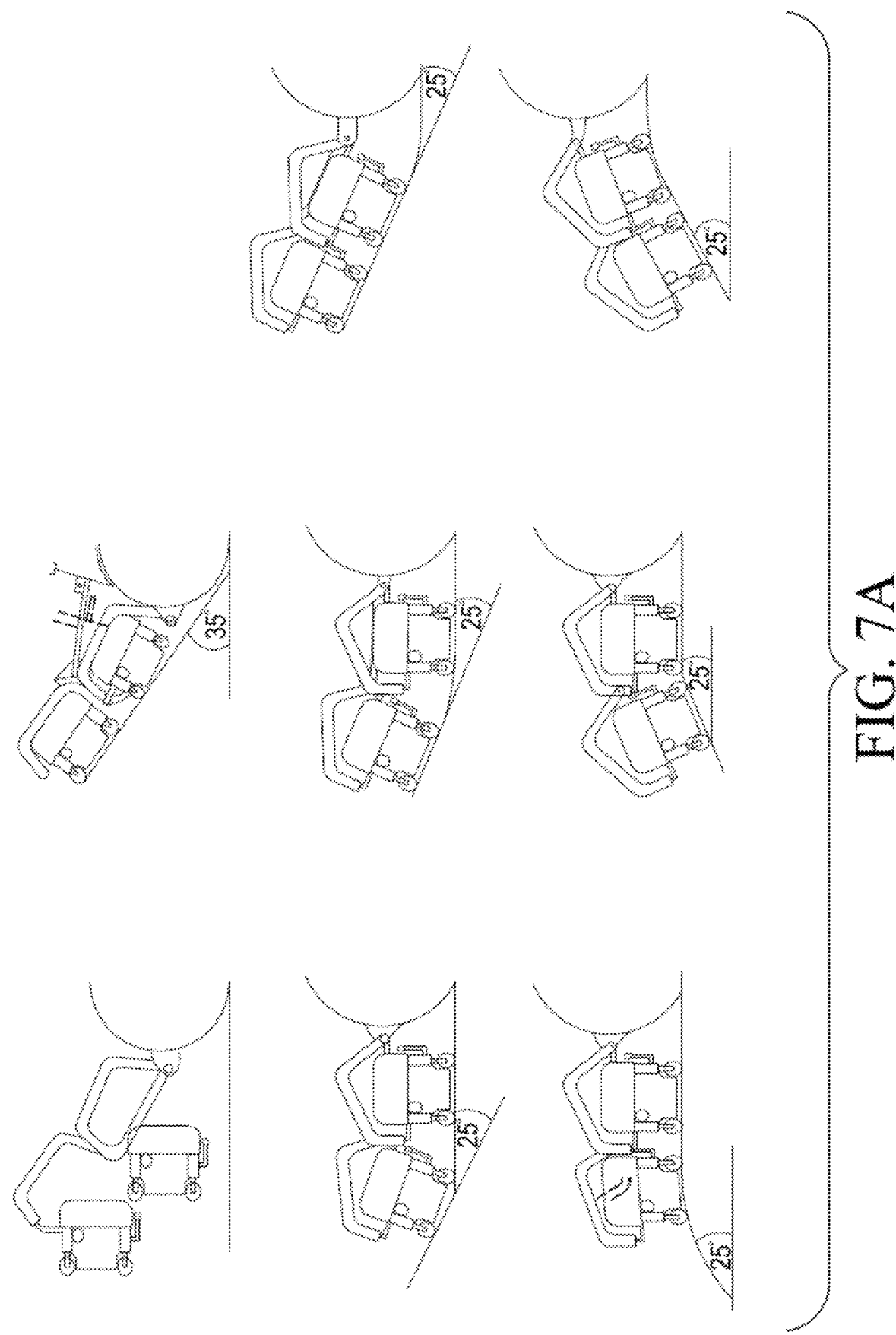
FIGS. 7A-7B show automatic implement ground tracing system with increased lifting for improved travelling capabilities on uneven ground.

FIG. 7A illustrates automation provided by an implement ground tracing and implement lifting and lowering system. In FIG. 7A, examples are shown on implement 301 or 302 and implement lifting system 411, wherein operator assistor 507 shows an outer line of an implement working area, as shown in FIG. 5A. The system further includes swivel joint 410, as well as polished and tempered shaft 408, and linear slide bearing or ball bushing 409. Electronic height position controls 711 and 712 can be mounted directly on a shaft, and which provide implement lifting and lowering motor 402 the impulse to lift an implement via lifting arm 407 to a median level of shaft 408.

FIG. 7A further shows lifting arm 407 at a lowest position and being lowered to a mid-position, and lifting arm 407 at a top position. The system allows for an automatic implement ground tracing system, and frees the operator to perform other actions or allows autonomous machines to work safely without harming the ground, turf, and the like. The lifting and lowering cables 705 and 706 are at rear ends of an implement. However, when wider range of lifting and lowering are employed, implement swinging during fast travel between jobs can be a problem, and steady down force of the mower unit can improve and maintain constant a mowing job.

Figure 7B:
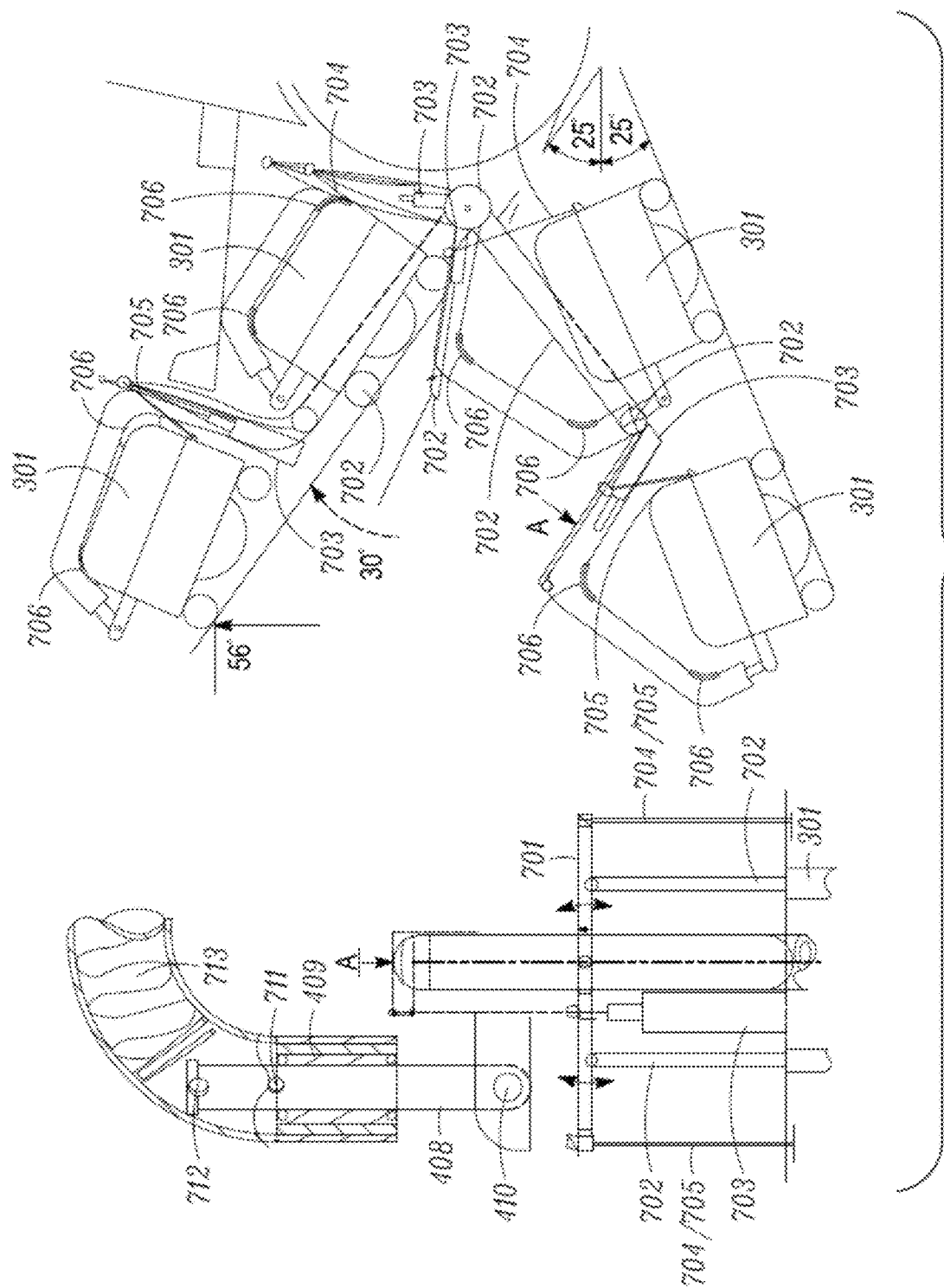
Figure 12A:
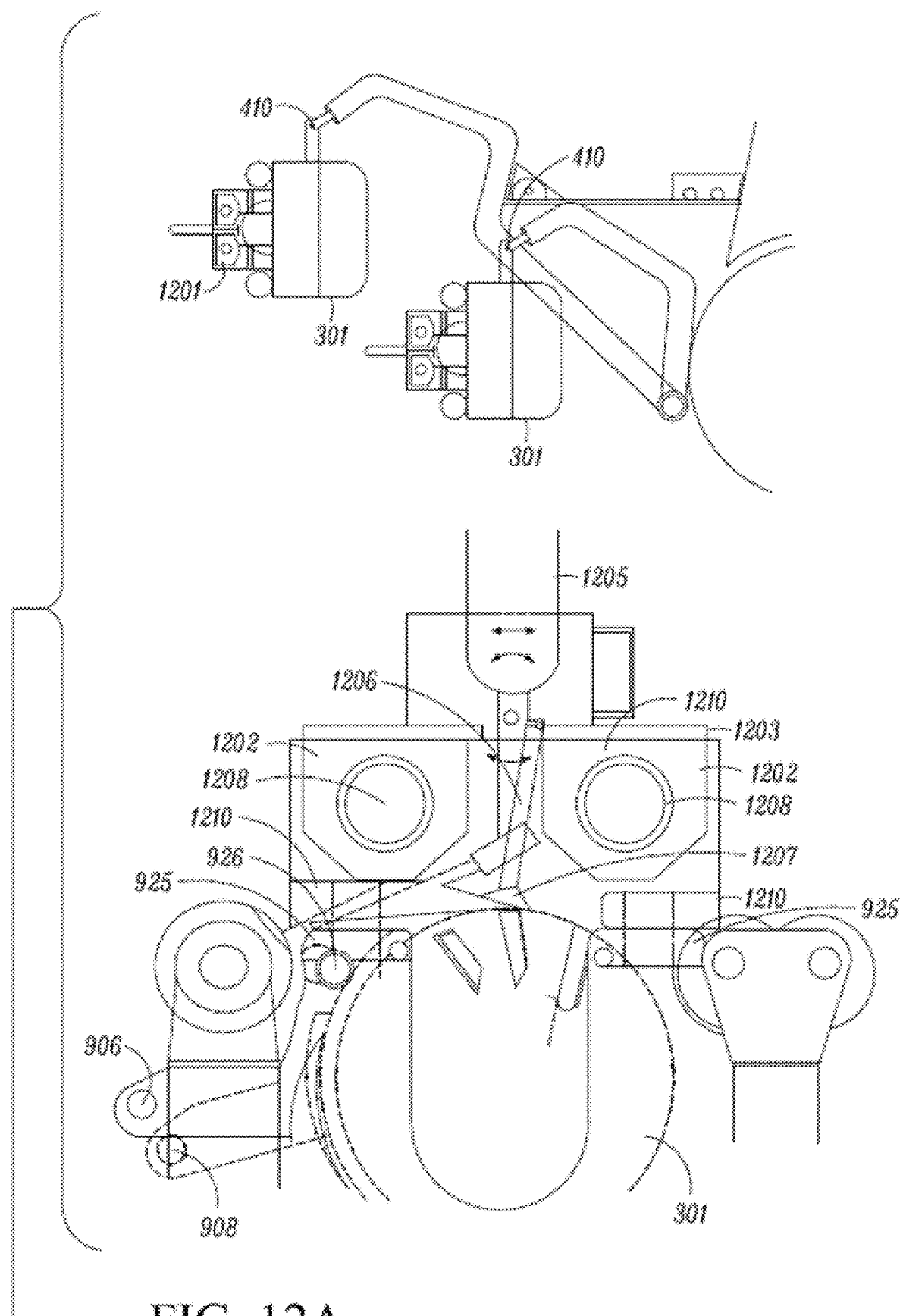
FIGS. 12A-12B show a reel mowing unit configured for sharpening of reel and bottom blade without dismounting the unit from the machine.
Figure 12B:
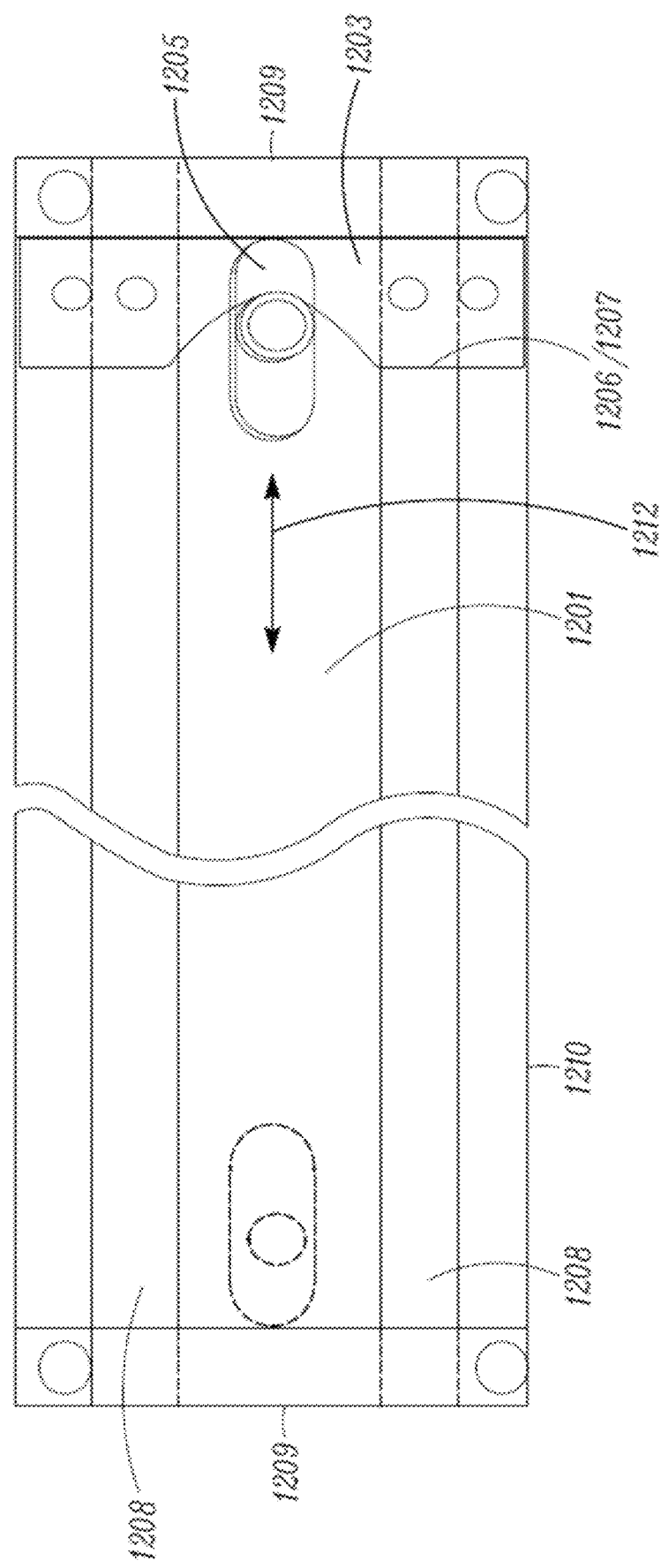

FIG. 7B provides a solution for above and other problems. For example, a spring 713 placed inside lifting arm 407 can provide a constant pre-calculated down force on a front part of the implement. At the rear is provided a system including a cross bar 701 that travels along the lifting arm 407 up and down and pushed by rods 704 and 705. The cross bar 701 is pulled down by constant force springs 702, which the force thereof pulls down on rods 704 and 705 and in turn an implement, such as mower unit 301, and the like, with via the constant force of the springs 702. As the lifting and lowering range is increased, a linear motor 703 can be provided to raise the cross bar 701, advantageously, allowing the implements to raise up against soft lined stops 706. Accordingly, the above and problems are resolved, and such a system can be used in assisting in the sharpening of a mower unit mounted on a machine, for example, as shown in FIGS. 12A and 12B, as the mower units 301 can be raised higher above the ground, and the like.

FIG. 8 shows the multi-purpose design and applications of the vehicles and machines 100, and the like, including interchangeable features and designs used to advantageously achieve multi-purpose applications, and the like. The interchangeable lifting gear design 401/3 used for implements 301 and 302 can include installation in the front of the machine 100. The frame design tube 106 of the machines 100 can include a hollow square or rectangular tube around the machine frame to provide for implement mounting therearound, advantageously, expanding the multi-purpose application potential of the machine 100, and increasing the rate of machine utilization.

Alternative locations of electronic green speed measuring units 803 are shown, which provide impulse to lifting gears 401 and 402 to increase or reduce the roller implement force subjected on ground, and controlled by the force measuring devices 804 to achieve a pre-planned or pre-programmed green speed. Above the machine 100 there is an area 805, where more optional implements can be placed or mounted on rectangular or square tube 106 around the machine 100. This area can also be place for storing containers of liquids, and wherein the associated spreading or dispersing units can be placed under the machine 100.

Weed detectors 806 and green detectors 807 are shown, whereby requirements for fertilizers and weed controls can be programmed and mapped (e.g., via VRS GPS or GLO-NASS or GALILEA, etc.) in the computer programs of the machine 100 via antenna 115 and receiver 116 and/or systems 808. An example of the location of an implement outer work area is shown by operator assistor 507. Implement guidance system antenna/receiver 808 is shown, and which can also be used for mapping working areas into ICT-systems, and the like.

In FIG. 8, three turf improvement roller implements 801 and 802 are shown and further detailed in FIG. 15. FIG. 8 also shows an automatic clippings collection and dispersion system, including alternative locations of clippings containers, and unloading capabilities, as further detailed in FIGS. 10A-10B.

FIGS. 9A-9B illustrate an innovative reel mowing unit with electronic programmable cutting height and reel rotation speed control and automatic clippings collection and dispersion system to allow mowing of greens, fore-greens, collars, Tees, and the like, in an operator driven manner or for unmanned autonomous operation. In FIG. 9A and FIG. 9B, the frame of the mowing unit 901 is shown, wherein tooth bars 902 and tempered and polished corner shafts 903 form the cutting height adjustment slides, which are guided, for example, by 2 pieces per corner, linear ball bushings or linear slide bearings 904.

An example of the innovative design of the mowing unit attachment to implement lifting gear swivel joint 410 is shown in FIGS. 4 and 7, and which allow the free turning of the mowing unit for service, inspection and maintenance work, and where FIGS. 12A-12B show an innovative example thereof. An innovative cutting clearance adjustment 905, between the reel and a bottom blade is shown, and which allows a wide clearance opening by removing pin 906, wherein lever 907 moves to a fixed point 908 or two eccentric bolts 926 can be used, whereby opening is allowed. For example, as shown on FIGS. 9A-9B, the bottom blade sharpening of the reels 918 and bottom blade 910 can be performed, as further shown in FIGS. 12A-12B with an innovative sharpening unit fixed to a mowing unit.

Bottom blade holder 909 is fixed by 2 tempered bolts on frame 901 (e.g., one on each end), and bottom blade 910 is bolted thereunder. The cutting units can travel on the ground on round rollers 911. The height adjusted groomer 912 can be used to vertically-cut turf and groom to a pre-adjusted depth. The clippings collection conveyor tube 913 is open at a quarter on the top-side toward a reel rotation direction thereof, as part of the automatic clippings collection and dispersing system of FIGS. 10A-10B. Further provided are reel 916 of the reel cutting unit, interchangeable mounting plates 914, and bearing blocks 915. The plates 914 are accurately produced and metal pin guided and fixed (e.g., by bolts, etc.) on the frame 901, and when the reels are sharpened, the outside diameter is reduced, whereby the reel and bottom blade cutting angle can change. The end plates 914 can be replaced with new set of accurate end plates with suitable configurations, so that the reel center line can accurately change to achieve an ideal bottom blade and reel cutting angle, advantageously without time consuming and difficult manual adjustments, and the like.

In FIG. 9A, the cutting motor 916 powers the cutting reel. Also provided are pulleys 917 and belts 918. The toothed wheels 919 with matching teeth of tooth bars 902 can be used to accurately adjust the cutting height. Planetary gear 920 and motor 921 with brake and absolute encoder are used to power the cutting height adjustment system. In operation, the motor is only powered for the time of adjustment, and otherwise the brake locks the height to an adjusted level, and the absolute encoder shows numerically on a touch screen, and the like, the programmed height reached.

An alarm buzzer and light warning can be triggered, for example, if the programmed height has not been reached on the cutting units. The brake keeps energy from being used between adjustments, and keeps a pre-programmed cutting height constant, resulting in energy savings, quality of work, and the like. The planetary gear 920 increases the holding force used to maintain the programmed height at all suitable times. The shafts 922 and 923 transfer the movement between wheels 919. Mounting pieces 925 show the mounting points, wherein guiding and threaded bolt holes are used to fix optional implements on the cutting unit, as shown in FIGS. 12 and 13. The leveling adjustment unit 924 is used for leveling adjustments for all suitable cutting height adjustment slides, and for backlash elimination, advantageously, improving cutting height accuracy.

FIG. 10A shows the silent automatic clippings collection and dispersing system, which can be built into the machines 100, and the multi-application machines of FIG. 14. In FIG. 10A, a clipping collection tube 1001 can be placed directly in front of the reel, as shown in FIG. 9A, element 913. Flexible housing 1002 is provided, and rim wheels 1003 are used for guiding the tube conveyer drag cable around sharp corners, and the like. Motorized sprocket wheel 1004 with planetary gear is shown, and which can move the drag cable inside the tube to move the clippings. Such a motorized system can be built to power 2 to 3 conveyor lines with a single electric motor and planetary gear unit, as shown at 1003, 1004 and 1005. The system further includes sprocket wheel 1005, and bent round tubes 1006 in the tube system and clippings emptying section 1007 of tube conveyor, wherein a bottom side thereof is open, and the section 1007 is built with a brushing and shaking section to empty clippings down to clipping collection container 117. The clipping collection container 117 is equipped with powered bottom conveyor and gate opening and closing to disperse clippings on indicated areas without needing to stop the machine 100.

The above systems and detailed components can be used with rotary mowing units 302, as shown on FIG. 10A, which can also work on leaf, needle, rubbish, and the like, collection.

FIG. 10A also shows the use of clippings collection and dispersing systems on other applications, such as the multiple purpose machines of FIG. 14 used on turf, and other landscaping care and improvement jobs, and the like. For example, FIGS. 9A, 9B and 10A show the innovative system, which allows 18 hole golf course mowing and clippings collection, clipping dispersion on one go, all without stopping the machine 100 operation. The system can be used for maintaining greens, fore-greens/collars, Tees, and the like, in an operator driven manner or in unmanned, autonomous manner, advantageously, providing battery powered, silent, electric and electronic, energy efficient, eco-friendly, sustainable machines.

The system described with respect to FIGS. 1, 4, 5A, 9A, 9B and 10A can be used for green clean-up and mowing, as shown in FIG. 10B, for example, wherein (1) on day 1 clean-up mowing is performed with 3 mowing units with cutting height and reel speed set-up for the job; (2) on day 2 are employed 2 inside mowing units with green cutting height and reel speed set-up, and selected for green mowing, and with the third outer mowing unit set up for fore-green/collar set-up; and (3) on day 3 are employed one of the inside mowing units with cutting height and reel speed set-up and selected for green mowing, and with the 2 outer mowing units set up for fore-green/collar set-up.

Advantageously, with this schedule and configuration, the wheels are not following the same wheel track day to day, avoiding trampling of the grounds on a same track. In addition, the inner side mowing head does not follow the same line every day, which leaves suitable marks on greens.

In addition, the automatic clippings collection system works along with the noted operations, and directly after a clean-up operation, the job can continue directly with a fore/collar mowing job with all mowing units set-up for the job. After fore/collar mowing, the operation can continue to the next Tee, with the clippings dispersed along the way with continuous operation, and with a Tee mowing height/reel rotation speed selected, resulting in operational savings, as all 18 holes can be mowed in one continuous operation, and the like.

Figure 11A:
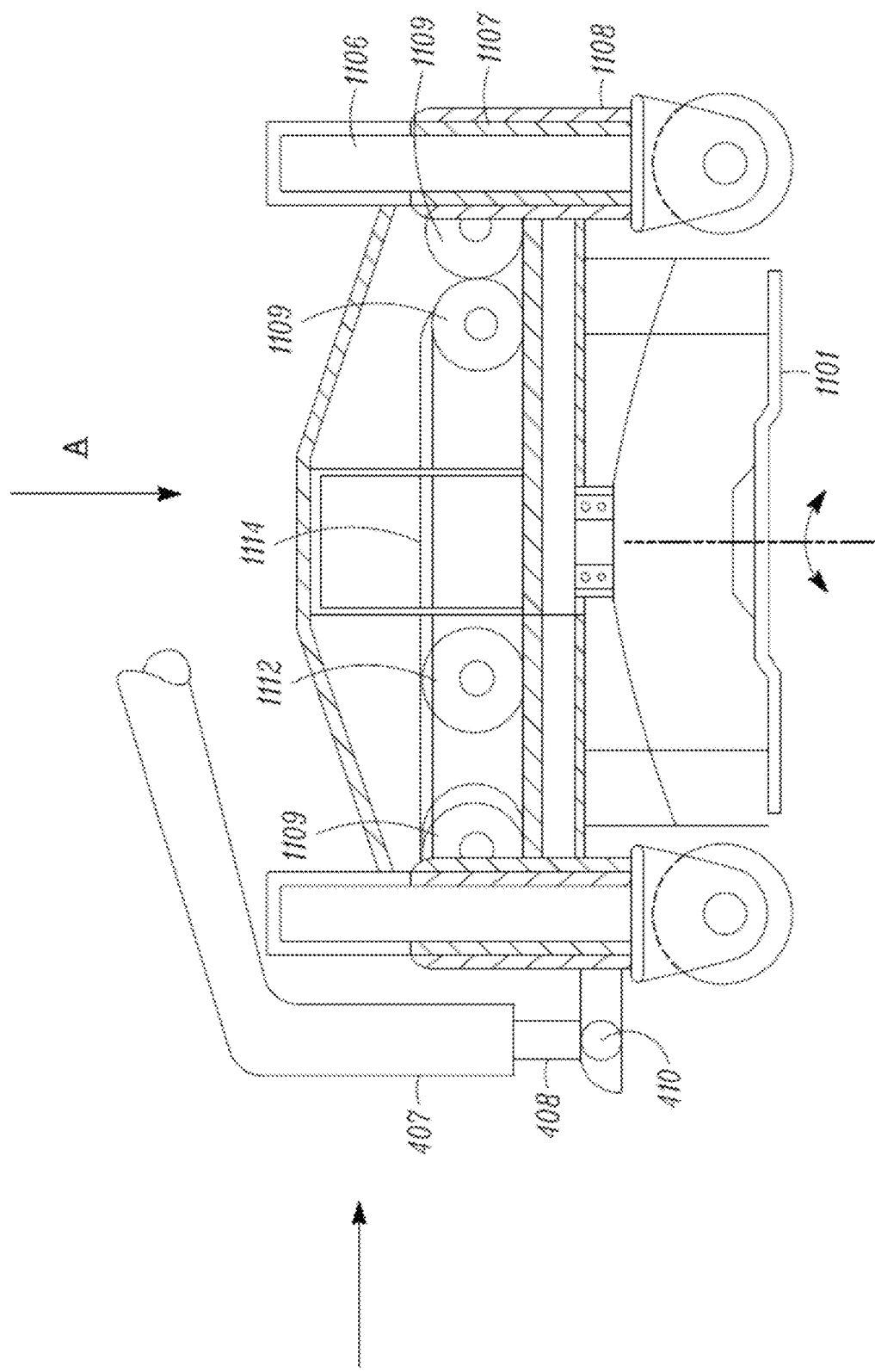
FIGS. 11A-11B show a double blade rotary mowing unit with programmable cutting height selection and alternative selection of clipping dispersion or bio-clipping and mulching.
Figure 11B:
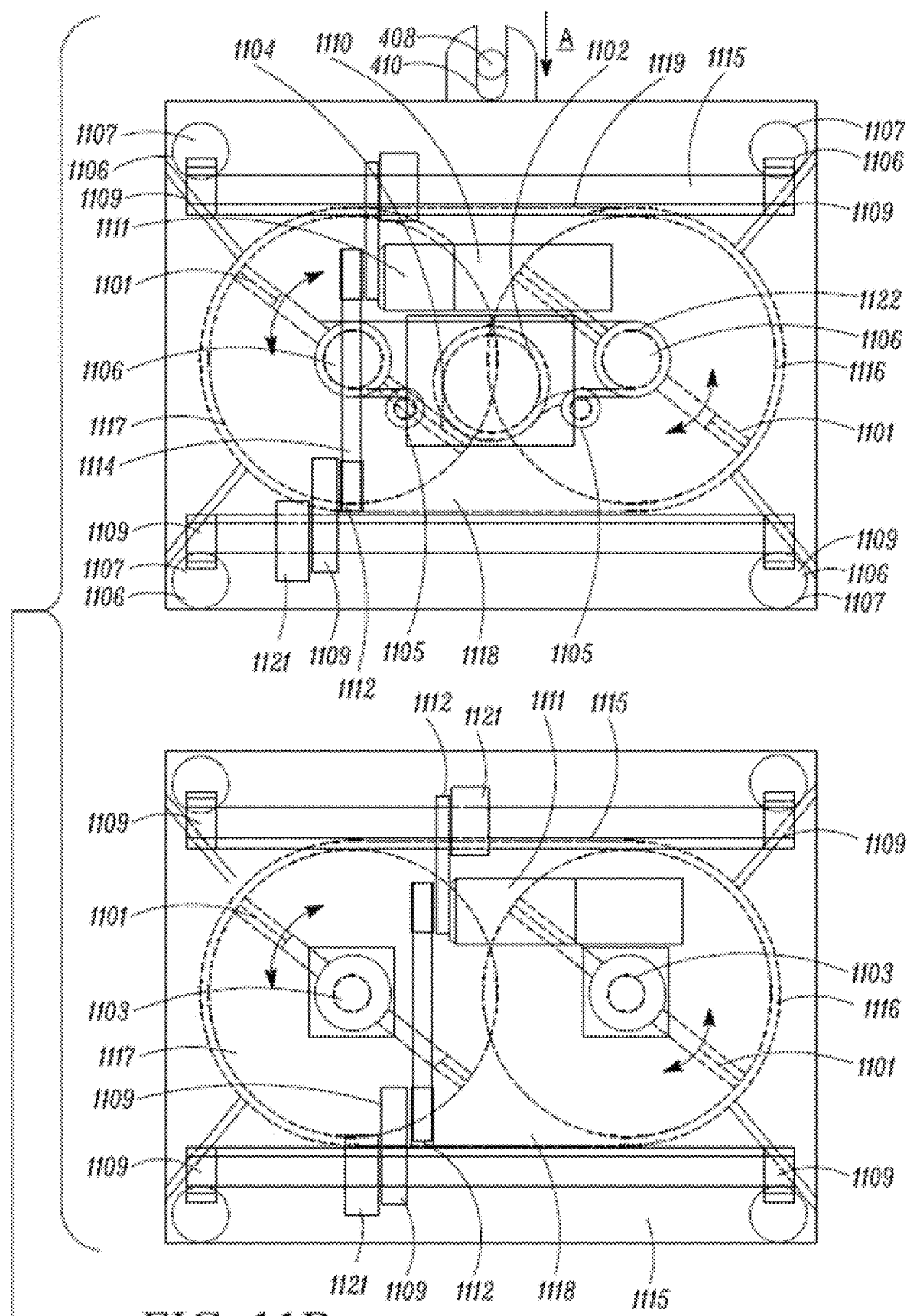

FIGS. 11A-11B show the rotary mowing unit 302, which can be used for mowing grass in parks, and turfs, semi-roughs, and roughs at the golf courses, and the like. The system uses a double blade 1101 design to reduce the overall weight and dimensions of the rotary mowing unit, which can be directly mounted and be directly easily exchangeable with the reel mowing unit, advantageously, increasing machine utilization time, and reducing investment costs.

In FIG. 11A, the rotary unit can have direct blade drive with two motors 1103 shown in FIG. 11B or with one centrally located double capacity motor 1102, as shown in FIG. 11A. The double capacity motor 1102 drives toothed, endless belt 1104, two piece tensioning rollers 1105, and two piece toothed pulleys 1106, to drive both blades, which are installed apart from each to prevent the blade tips from engaging each other. The blade rotation can be controlled by electronic drive control, and the rotation of one blade can be reversed by using a gear 1122 mounted on toothed pulley 1106.

In FIG. 11B, using the two piece motor system, the electronic drive control can be used to prevent the blade tips from catching each other during rotation, and a direction of rotation can be programmed, wherein one of blades can be programmed in a reverse rotation mode. Various types of motors can be employed, for example, with a maximum rotation speed from about 5000 to 6000 RPM and above, so that a suitable blade tip speed can be reached for improving cutting quality, and the like.

Frame 1108 can include the programmable, electronically controlled cutting system for pre-programmed and accurate selection from the machine 100 operating system and/or autonomous machine operation (e.g., with a VRS GPS/GLOSSNAS/GALILEA operating system). Also provided are fine toothed shafts 1106, linear slide bearing or ball bushing 1107, and with gear 1109 having fine teeth to work with the shaft 1106, so as to move up and down to the pre-programmed cutting height selected from operating system. Servo motor 1110 is built with a brake and absolute encoder to perform cutting height adjustments accurately and in a locked in manner via the motor brake. Advantageously, power consumption is minimized to only the adjustment time in seconds, wherein the absolute encoder provides an indication that all the units have reached the selected height, shows the height in operating system display, and if not, can generate warning and/or buzzer sound, and the like. A planetary gear 1111 is used to increase a positional holding force, wherein toothed timing wheels 1112 and timing belts 1113 and 1114 are used for turning shafts 1115, which turn gears 1109 to perform the height adjustment. A level adjustment unit 1121 is used to level adjust the cutting height adjustment shafts 1106 and to eliminate backlash, advantageously, improving cutting height accuracy.

Also shown are right side gate 1116, left side gates 1117 and front 1119, and back side gate 1118, which can be lifted up manually or in a motorized fashion to direct the blown clippings towards a desired direction. When all gates are closed, the rotary mowing unit can be configured to mulch, bio-clip, and the like. The mowing unit lifting system further includes the swivel joint mounting 410 for the rotary mowing head with the shaft 408, the implement mounting 410, and the lifting arm 407. A locking ring and gear 1122 is employed to allow rotary cutting blade rotation direction to be reversed, providing for numerous applications and uses for the rotary cutting unit.

FIG. 12A is used to illustrate sharpening of the reel mowing units 301 via the implement lifting swivel joint 410 and the implement lifting and lowering gear 401. In FIG. 12A, the swivel joint 410 allows the mowing unit 310 to hang down in a vertical position. A reel cutting unit sharpening device 1201 is mounted on the reel cutting unit 301. In FIG. 12B, the sharpening device 1201 can include 2 linear bearing units 1202 joined together by mounting plate 1203. These form a base to fix sharpening machine 1205, grinding wheel shaft 1206, and grinding wheel 1207. This system provides for an adjustable sharpening device travelling along linear bearing shafts 1208 and fixed with 2 piece twin shaft blocks 1209 on a sharpening machine frame 1210.

The sharpening machine frame 1210 is guided and bolted on the fixing lugs 925 of the reel mowing unit 301, as shown in FIG. 9B. Motorized linear grinding head transfer system 1212 moves the sharpening device at a programmed speed. The bottom blade adjustment 906 can be freed, and the arm can be locked into position 908, which allows sharpening and front facing of the bottom blade, rounding of the reel, sharpening of the reel blades to a specified angle, and the like. Alternatively, eccentric hardened pin bolts, and the like, can be used. The use of a locking ability or eccentric pin bolt, advantageously, allows the blade to be resting steady on the frame 1210.

The reel motor 916, as shown in FIG. 9A, turns the reel and transfer system 1212 not shown in detail, which operates the sharpening device to allow rounding of the reel, reel blade sharpening into a specified angle, bottom blade sharpening and front facing, and the like. Advantageously, the reel mowing units can be sharpened without removing them from the machine 100, resulting in more frequent sharpening, bottom blade facing, and the like, improving the quality of the cut.

FIGS. 13A and 13B show the reel mowing unit 301, and the rotary mowing unit 302 washing and drying system. In FIG. 13A, the system can include the motorized reel 916, a sealed water bucket 1301, a water inlet 1302, and compressed air inlet 1304, the clippings collection tube conveyor 913, and a motorized selection valve 1303, which form the water and air, automatic, washing and drying system. With this system, the mowing units are placed into water bucket and/or buckets 1301, and a washing program is selected from the machine 100 operating system, wherein reels 916A are turning, and the tube conveyor 913 is working, so that pressurized water sprays into the bucket 1301 from the nozzle 1302.

The washing cycle thus commences, including forward and reverse cycles, until the pre-programmed washing cycle is completed. At this point, the valve 1303 changes from providing water to providing pressurized air via air inlet 1304. This operation blows out water and dirt, while the drying cycle with reel 916, and the clippings collection tube conveyor 913 are operating, including the mower units, tubes, and clippings and/or furbish collection box, until the washing/drying cycle is completed. These operations can be performed automatically, whereby an operator is not needed to perform such wet work, and while keeping the working area tidy. The rotary cutting units/decks can be washed and dried using similar operations, as shown in FIG. 13B.

FIG. 14 shows the multi-purpose 9-wheel machine 1401, the 11-wheel machine 1402, and 15-wheel machine 1403, configured as multi-purpose machines. These machines are built using the various types of described implements and features and can be used as fully electric and electronic platforms for various existing and to be discovered applications. The 9 and 11-wheel feeder machine 1401 and 1402, and the 11 and 15-wheel carrier machine 1402 and 1403, are novel examples of the various system configurations available. FIG. 14 shows the FIG. 2 components, parts and designs, modified for the machines 1401, 1402 and 1402 applications, for example, using the steerable wheel unit designs 102 and 205, including servo drivers 207, other electronic designs, and provided with mechanical and/or air suspension, and the like. The wheel pattern design can include the wheels being configured for forward and reverse driving, and for on ground travel without leaving individual wheel tracks, as shown in FIG. 14.

A movable tube or bucket conveyor are used for loading of vertical-cuts, clipping, scarifies, aeration pieces, and the like, into container 1404, which then are loaded into container 1405 of the feeder 1401 or 1402 with a belt or a tube type conveyor of FIGS. 10A-10B, and so as to be transported away. The feeders 1401 or 1402 are used to bring back top-dressing sand, fertilizers, and the like, to containers 1405, 1406, and the like, and on the way returning with container 1404, and which materials can be spread as a top-dressing, for example, by the belt conveyor 1407 and the tube conveyors, and the like, on turf, ground, and the like.

Also provided are hollow or tine aerator 1408, seeder 1409, brusher 1410, finishing roller 1411, and suspension fertilizers and/or weed control tanks (not shown), which are indicative of the multi-purpose jobs that can performed by the combination of the feeder and carrier systems, and the like. The machines further include seat and steering column and safety cabin 1412 for manned machines, push type implement mounting, and the implement lifting and lowering system 401, such as for mowing, vertical-cutting, scarifiers, and the like.

Advantageously, multiple types of jobs can be performed in one pass, and fertilizers, pesticides, weed controllers, and the like, can be dispersed efficiently to a required depth, and the like, and without flushing into the environment, and the like. The machines 100 can be programmed to be used efficiently during rain and irrigation conditions, using information received by the various sub-systems, including the seekers or sensors shown in FIG. 8, and mapped by the antenna 115 and receiver 116 system (e.g., using VRS GPS/GLOSSNAS/GALILEA, etc.). A heavy tubular beam structure around the frame is employed and provides support and a mounting structure for use of various implements, resulting in multi-application machines providing numerous advantages.

The systems and components of FIGS. 1-15 can provide unmanned, smart machine systems, for turf care, landscaping jobs, and the like, resulting in increased quality of work, reduced investments and operating costs, sustainability of turf care, and the like, including accurate and reduced use of chemicals, and the like, whereby materials are placed under the grass surface, where needed, advantageously, reducing flushing into water tables, and the like, all while being performed in an emission free, and silent manner, and the like.

FIG. 15 shows a walk behind, single mower design, including quick exchange battery pack 1501 and electronics similar to those of FIG. 1. In FIG. 15, the system further includes split power drum 1502 for steering with servo motors 1507, planetary gear 1508, and mechanical parts and components 1509 and other suitable components to move and steer from the machine 100, the reel mower unit 301, as described in FIGS. 9A-9B, and/or the rotary mower unit 302, as described in FIGS. 11A-11B. Other optional implements of FIGS. 11A-11B are shown, including clippings collection and disperse system 1503, and clippings collection container 1504, as described in FIGS. 10A-10B.

Powered wheels 1505, when turned downward are driven by the drive drum 1502 and gear design to transport and steer the mower from work location to work location. Also provided are a turf improvement roller implement 1506, as described in FIG. 8, elements 801 and 802, and lifting and lowering gear 401 with down force capabilities. Finishing roller 1511 can be configures as either free rolling or as a powered roller 1511 with single motor and planetary gear drive, and with smart phone or other type of communication device capability and with touch screen 1512 housing including the operating system of the machine, and the internal and external communication and programs for wireless remote diagnoses and operating data collection for service provider purposes, as previously describe.

Thus, the basic machine design of FIGS. 1-15 can include:

An interchangeable, fully electric and electronic range of mobile, silent, multi-purpose machines and vehicles for golf course maintenance, turf care, landscaping, outdoor work, transportation, and the like, as well as overnight silent operation with novel features, for example, such as:

Interchangeable lithium-ion battery powered with a battery management system (BMS) and suitable ICT systems and programs for providing quick battery exchange, manual or automatic operation, and the like, for sustainable, eco-friendly operation, with energy savings, brake energy recovery, fluid free and silent operation, and the like.

An interchangeable worldwide wireless remote diagnoses system for after-sales-service purposes with preventative maintenance to reach 100% machine availability and performance and operating results, including data collection for service provider type of agreements with customers and with an aim to reduce administrative work, and reach one time invoicing per month. This can be coupled with long term leasing, a top efficiency power train with product lines employing similar or the same tire, wheel, planetary gear, servo motor, servo controller, drive sizes and designs, and the like, throughout the product line. The interchangeable system components can mounted on various interchangeable frame designs with suitable wheel pattern designs, and the like, for leaving an even wheel track surface without individual tire tracks, as well as improved weight distribution on a larger wheel print area and with less trampling of ground and need for aeration. The efficiency level from the battery pack to the wheels can reach up to about a 90% efficiency rating, and with zero emissions, as compared to a diesel engine vehicle, which from tank to wheels has a maximum efficiency of about 25%.

The mowing machines of FIGS. 1-15 can include:

Interchangeable machine frame designs, with only 3 frame sizes covering various mowing machine applications, including from 3 to 5 to 7 reel and rotary mowing configurations with a mowing width from about 51 to 138 inches.

Interchangeable implement mounting, lifting, lowering and down forcing design, with quick implement changing, and with a manual or motorized side-shifting capability.

Multi-purposes design of all the lines of machines, wherein various implement designs can be mounted in front, rear, both sides, under and above, as well as alternative operating and driving directions, according to job requirements, and with savings of investment costs, increase of machine utilization rates, and lower needs for storage space, servicing, and the like.

Interchangeable mowing unit designs, including reel and rotary designs with electronic programmable cutting height, reel/rotary rotation speed and travelling speed of machine or cuts per meter, and the like, to achieve uniform, improved mowing results, and highly valued green speed, and turf improvement. The result measurements of mowing operations and the automatic clippings collection and dispersing provide for bio dynamic growing substance, whereby greens, fore greens, collars, Tees, and the like, can be mowed with one pass, resulting in operating cost savings, and less trampling of the turfs, thereby reducing needed aeration operations. The mowing units can be sharpened and washed and dried without removing the unit from the machine.

The golf course maintenance and turf care machines of FIGS. 1-15 can include:

Performing about 30 or so additional and different jobs for golf course maintenance and turf care after the mowing and related jobs. Conventionally, each job requires a different, noisy combustion engine powered 3 to 4 wheel machine, carrying quite heavy loads and thus leaving wheel tracks on the turf. These machines can be replaced by the multi-purpose machine 100 having electric and battery powered operation, and which use interchangeable features from the mowing machine configurations, for example, including:

The 11 to 15 wheel, multipurpose machines 100, including the 11 wheel feeder and 15 wheel carrier machines having interchangeable drive systems and wheel patterns for leaving even turf marks and without wheel tracks due to reduced weight distribution, due to the large number of tires employed. This provides a vast tire print area, wherein the swiveling shaft designs keep all-wheels on ground during travel over uneven surfaces and with even wheel load distribution.

The machines are designed for multi-purpose applications with an extensive range of implements.

The seed, fertilizer, pesticide, and the like, requirement and irrigations needs can be analyzed with suitable seekers or sensors attached to the mowing units, and with the data being transferred wirelessly to the information (e.g., ICT) system, and mapped with GPS for precision turf care. Advantageously, seeds, fertilizers, pesticides, and irrigation can be used only where actually needed and in the depth needed, without having excess materials flushing into the environment. This results in operating, investment and material cost savings, providing green, eco-friendly golf course and turf care. The described machines can be configured for any other suitable applications, and provide the platform for other types of applications and machines, as can be appreciated by those of ordinary skill in the relevant art(s) based on the teachings of the present disclosure.

The machines of FIGS. 1-15 in autonomous, unmanned, smart machine applications can include:

Addressing the need for cost savings in view of ever increasing labor costs, and the lack of professional workers. Companies must also find solutions to increase profitability, wherein increased revenues are important source. Golf courses loose revenues on busy seasons, when all the rounds cannot be cashed in due to the machines that are working during Tee-times. Conventional combustion engine machines cannot work overnight, as there are nearby houses and communities, which do not tolerate night time noise from such machines. Even the paying customers are annoyed by the machine noise during their games. The unmanned autonomous, silent precision golf course maintenance and turf care machines of FIGS. 1-15 can be the solution:

The operator driven machines 100 are designed to be retrofitted at a later time to operate as autonomous working machines, for example, using:

The VRS GPS/Glonass/Galilea, ICT-based systems, and the like, can be built with automatic steering and other operating systems to achieve unmanned, overnight, silent operating machines 100, whereby data for seeding, fertilizing, pesticides spreading, weed control and irrigation needs, and the like, are collected by the ICT-systems and used for precision turf care, with minimal materials employed.

The wireless remote diagnoses and combined operating and material data collections systems can be used to provide, for example, one invoice per month service. Agreement with long term leasing can be provided, whereby golf course revenues per an 18-hole course can increase in the hundreds of thousands per year and operating cost can be minimized.

Figure 16A:
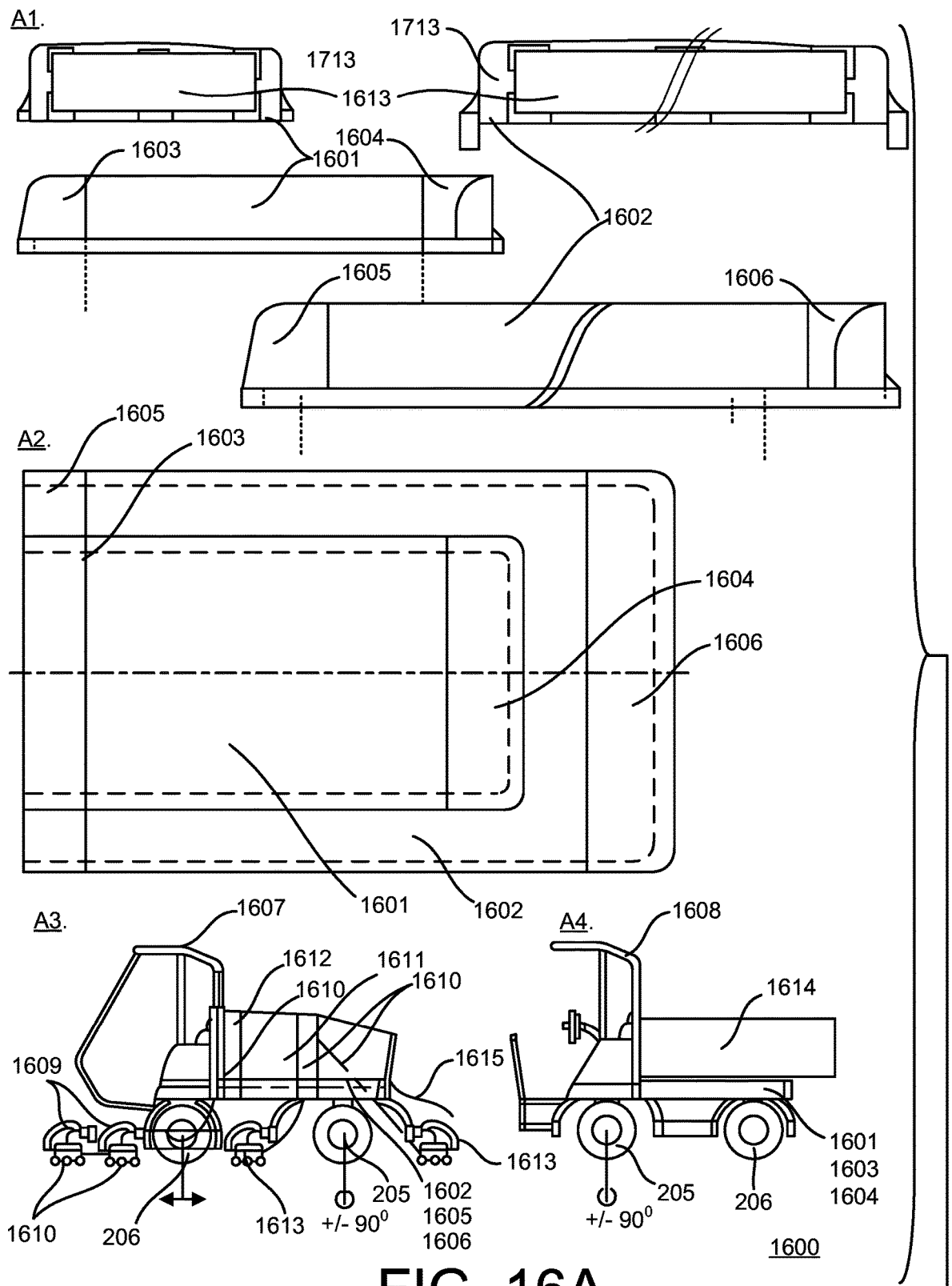

FIG. 16A show machines and subsystems that include advantages of 3-dimensional scalability and modularity, and that can be configured as needed with front wheel, rear wheel steerable, all wheel steerable, configurations that can be used, converted and changed seasonally for different applications to reach year-round application for of machines, equipment, vehicles, platforms, and the like. Deliveries built with 3D-design and digitalized manufacturing and worldwide distribution and services, and with implements and attachment designed to fit and work in all suitable applications, on scalable, modular design, systems, and the like.

FIG. 16A show examples various view of scalable frames, with examples of uniform design of frames 1601 and 1602. The frames can be incorporated with battery packs 1613 of box-type construction and with a battery pack, quick interchange system of FIG. 23B, and with capsular construction and partly honeycomb reinforced. Implemented insulating material and sheet metal structures 1713, and available with heating elements to keep up a high and longtime battery charge level. Advantageously, such features will increase time between charges during cold weather operation, with 365/24/7 operation and service. The frames can be built with aluminum, high tensile steel, carbon fiber, and the like. Such configuration results in a relatively stiff design with reduced weight on 3-7 AWD scalable, modular design frames used on 3 to 7 and above, all-wheel drive machines, vehicles, and platforms. The incorporated sections 1603, 1604, 1605 and 1606, advantageously, can house easily accessible electronics, and the like.

Also shown is an example of machine built with the elements 1602, 1605, 1606 and with uniform designed cabin 1607. The machine can be built with four non-steerable swiveling front wheels, as described with respect to FIG. 2, elements 205 and 206, and three +/−90 degree steerable, swiveling rear wheels, and equipped with interchangeable vertical-cut mowing units 1609 (not shown in detail) or with reel mowing units, as described with respect to FIGS. 3, 9A, 9B, and 22A. Such machines can include front and all around installed clippings collection tube conveyors of FIG. 10A on element 1610, collection container 1611 built with on top mounted crusher-shredder 1612, reel mowing units of FIGS. 9A, and 9B at the rear with clippings collection and dispersion system 1615. Alternatively, the machine can be configured, as shown in FIG. 8, with three turf improvement, roller implements 801 and 802, as further described with respect to the turf improvement roller implement 1506 of FIG. 15, and the like. The non-steerable, all-wheel drives (AWDs), as described with respect to FIGS. 16B, 16C, and 16D, can also be employed.

Also shown is an example of a transport vehicle with a uniform design, safety guard 1608, built with three non-steerable swiveling rear wheels, as described with respect to FIG. 2, elements 205 and 206, and two +/−90 degree, steerable, swiveling front wheels. The transport vehicle includes a load pallet 1614 on the top thereof, and built with elements 1601, 1603, 1604. The non-steerable, all-wheel drives (AWDs), as described with respect to FIGS. 16B, 16C, and 16D, can also be employed.

Figure 16B:
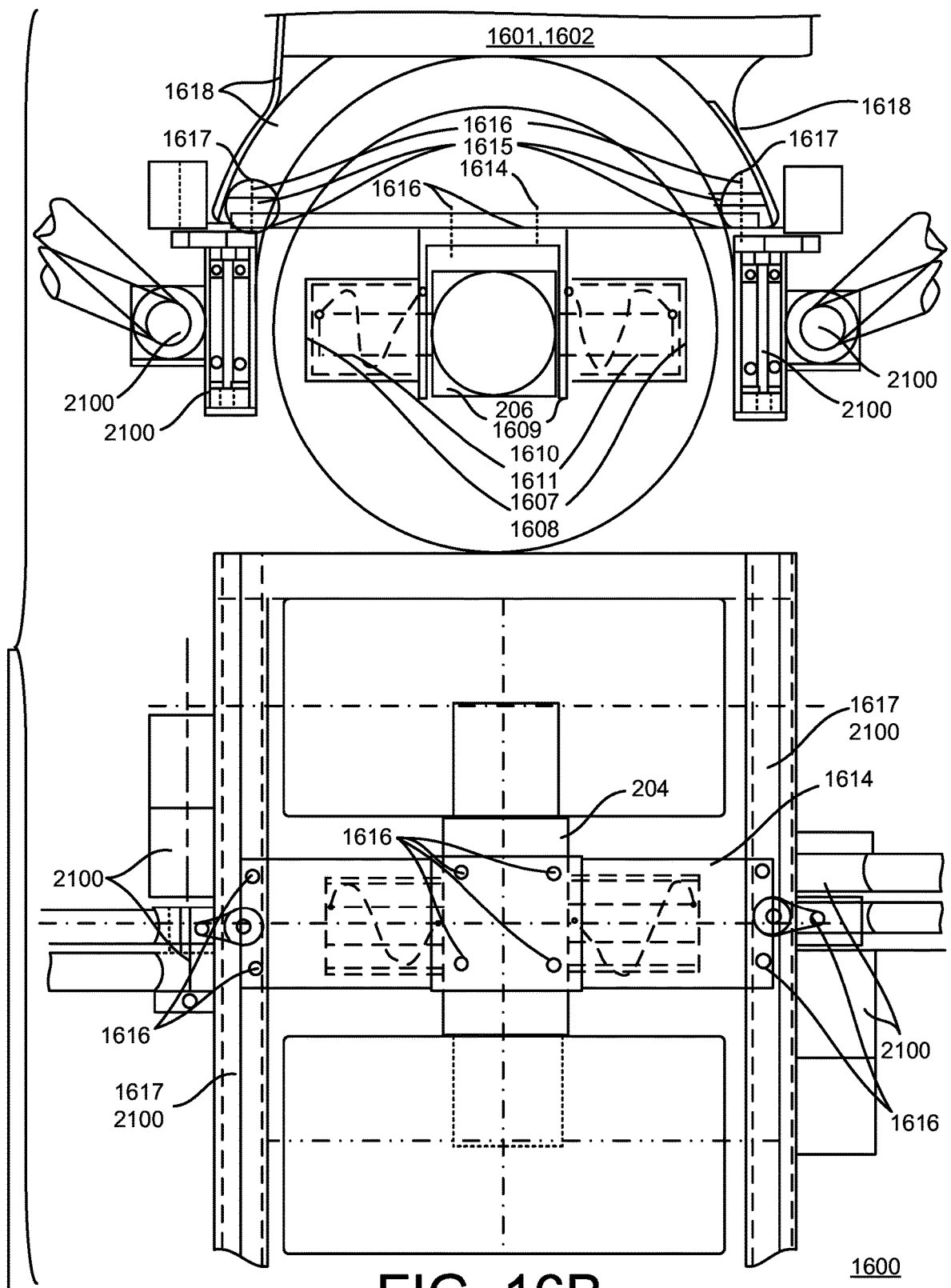
FIG. 16B shows an example of a double, non-steerable all-wheel drive, swiveling system built with added levelling coils or a torque rods system, to ensure even, continuous all-wheel pressure on ground, and to assist in quick interchange of two AWD and four AWD non-steerable drives, and front and rear mounted implements, built as a modular-design, with non-steerable wheel attachment to a modular-design frame shown in FIG. 16A.

FIG. 16B show side and top views of scalable, modular assemblies of non-steerable, double swiveling, electric wheel drive, upgraded with a stabilizing torque or coil spring system. Advantageously, such configuration results in easy interchange of the drive unit 206 of FIG. 2 with tires installed. The configurations can include implement mounting and side shifting and quick front and rear implement interchange, to be manufactured and assembled as a scalable, non-steerable drive module 1600, with bolts attached, for example, on 1601 and 1602 under the frames. Advantageously, such configuration results in ease of manufacturing and assembly, storage, and the like, lower costs, and efficient design and delivery of the machines, vehicles and platform, from the assembly plant and/or from local delivery or from technology and marketing centers overseas at lower shipping costs, and with non-critical parts and units being locally acquired.

Such machines can also include element 206 of FIG. 2, and built with a swiveling system on two to four AWD and above, with the added innovations of stabilizing torsion spring systems 1607 and 1608, built with coils springs coiled at opposite direction. Alternatively, torsion rods mounted to implement opposite direction torsion, and the like, and built inside welded, tube constructions 1607 and 1608, welded on U-shaped swivel part 1609 can be employed. Tubes 1610 and 1611 can be welded at one end on the drive unit 206 of FIG. 2, with coil and/or torsion rods 1610 and 1611 attached to the U-shapes part 1609 at one end thereof, and the tube construction stabilizing torsion spring systems 1607 and 1608 at another end thereof. Such configuration stabilizes and equalizes the swiveling action, to maintain equal wheel load on both wheels on ground during all suitable driving and operating conditions, and the like. Such features provide ease of changing of the drive gear assembly together with wheels. Such a configured double wheel drive unit 206, can be attached on a flat steel part 1614, above at the center and at both ends on steel guides 1617 by bolts 1616. The guides 1617 are part of wheel mounting system 1618, to attach the module 1600 underneath on the frames 1601 and 1602 above implement lifting device 2100B of FIG. 21A. FIG. 21B shows attachment side shifting system 2100A on the modular design of the wheel mounting system 1618.

Figure 16C:
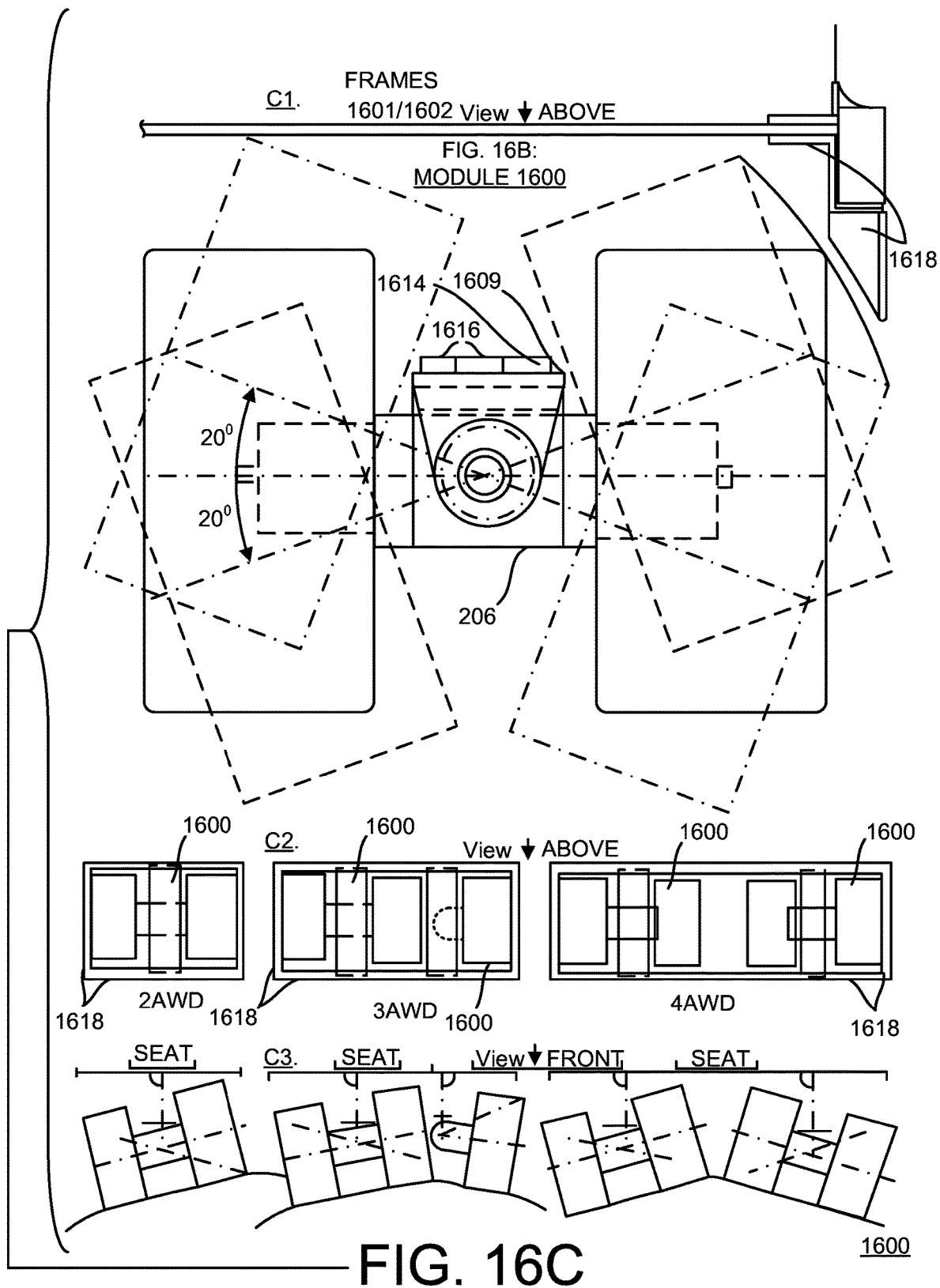
FIG. 16C shows a non-steerable, double wheel mounting, top views of two, three and four-wheel, non-steerable design attachments, front views of two, three and four-wheel non-steerable designs, as an example, at swivel positions.
Figure 16D:
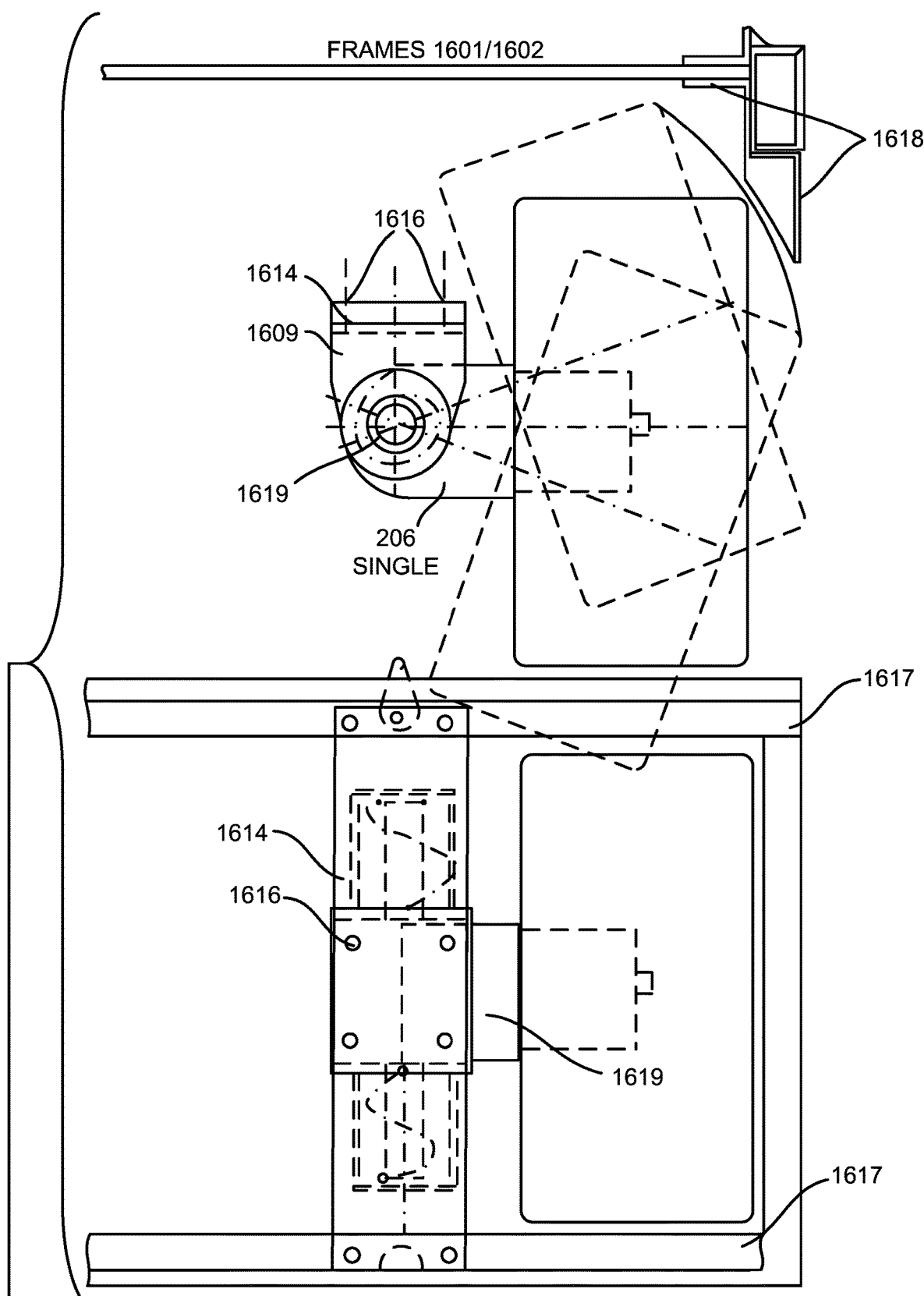
FIG. 16D shows a top view of mounting of a non-steerable, single wheel drive with torque springs or rods with respect to FIG. 16C.

FIG. 16C shows the double all-wheel drive mounting system 1608, and the swiveling action of the wheels of FIG. 2, element 206, from a front view. Also shown is the non-steerable drives, in two-AWD, three-AWD and four-AWD configurations, as described above with respect to the wheel mounting system 1618. Also shown is a front view of the non-steerable drives, in the two-AWD, the three-AWD and the four-AWD configurations with respect to up and down swiveling actions. Advantageously, the wheels are configured to pressing the ground at equal pressure. FIG. 16D shows the single, non-steerable wheel drive 1619, as part of an all-wheel, non-steerable drive system, built with similar and/or same elements as that of FIG. 16C.

Figure 17A:
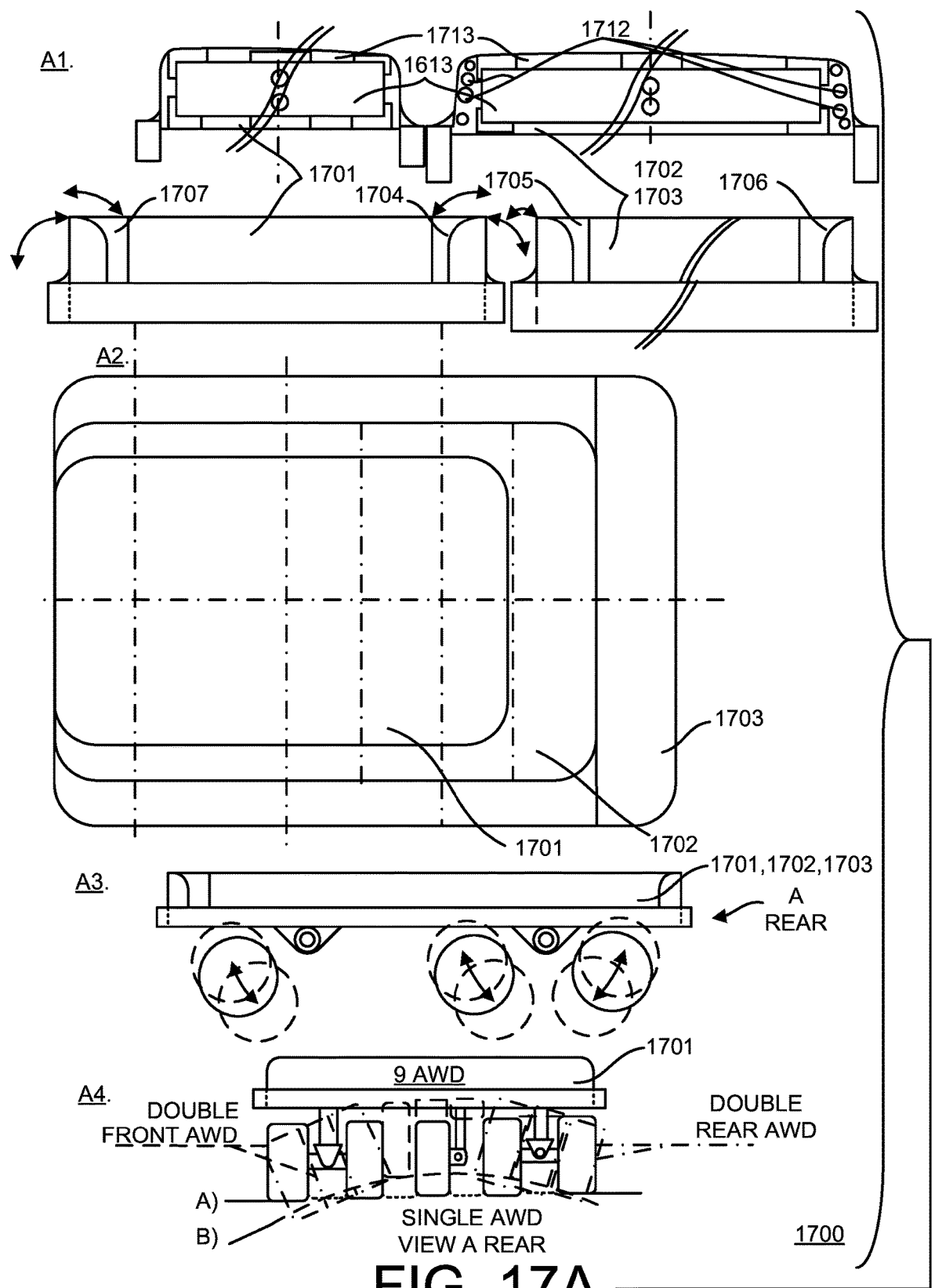
FIG. 17A shows examples and various views of modular-design frames, with built-in battery pack and electronics on nine to fifteen and above, all-wheel drive, all-wheel 360 degree steerable, and all-wheel suspension maintenance machines and/or transportation vehicles, including a rear view on even or flat or curved ground.
Figure 17B:
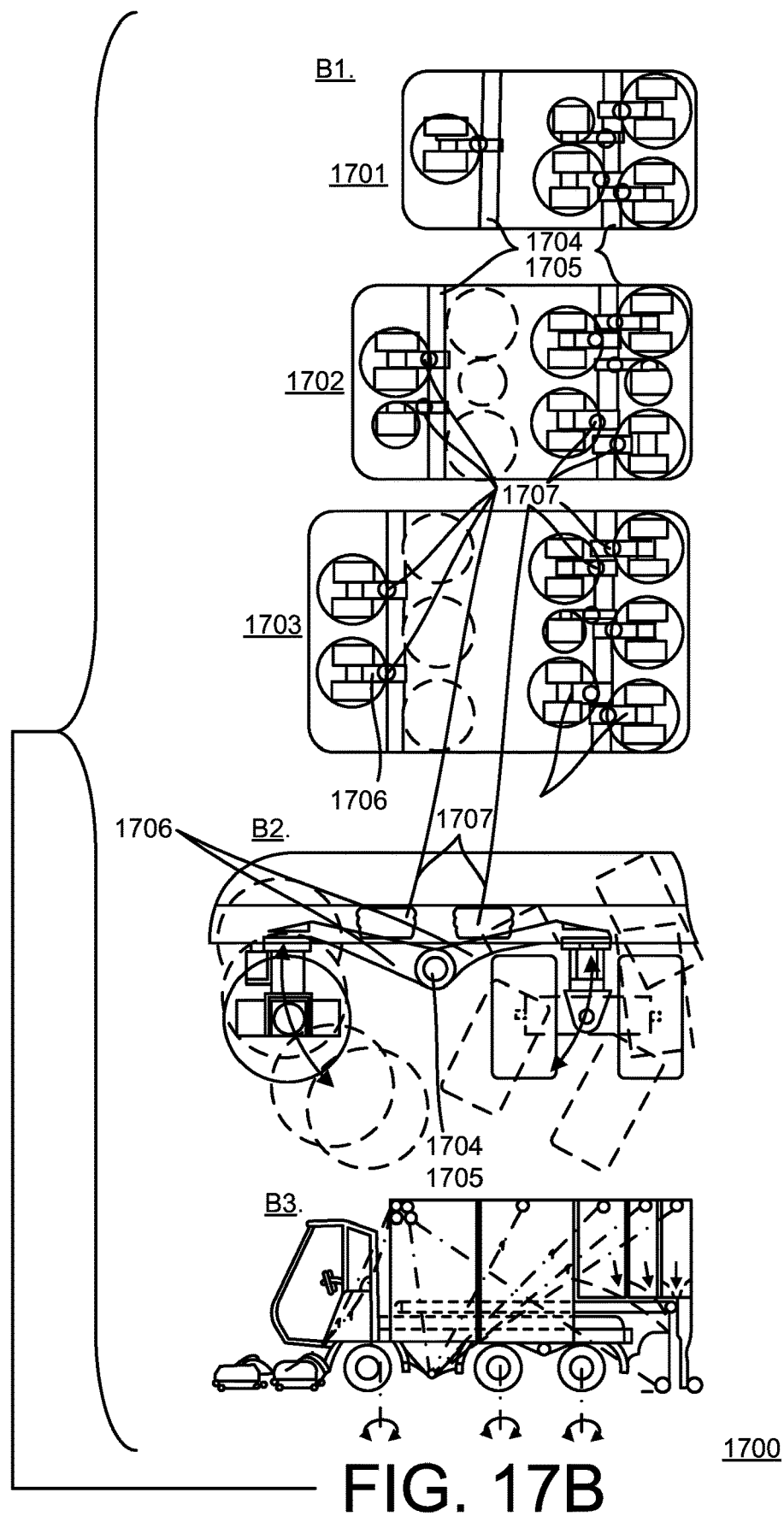
FIG. 17B shows examples of wheel arrangements, and a special multi-purpose machine configured to perform up to ten jobs in one pass, including attachment of modular-design all-wheel steerable units with +/−360 degrees, electric-electronic steering to a modular-designed frame.
Figure 19A:
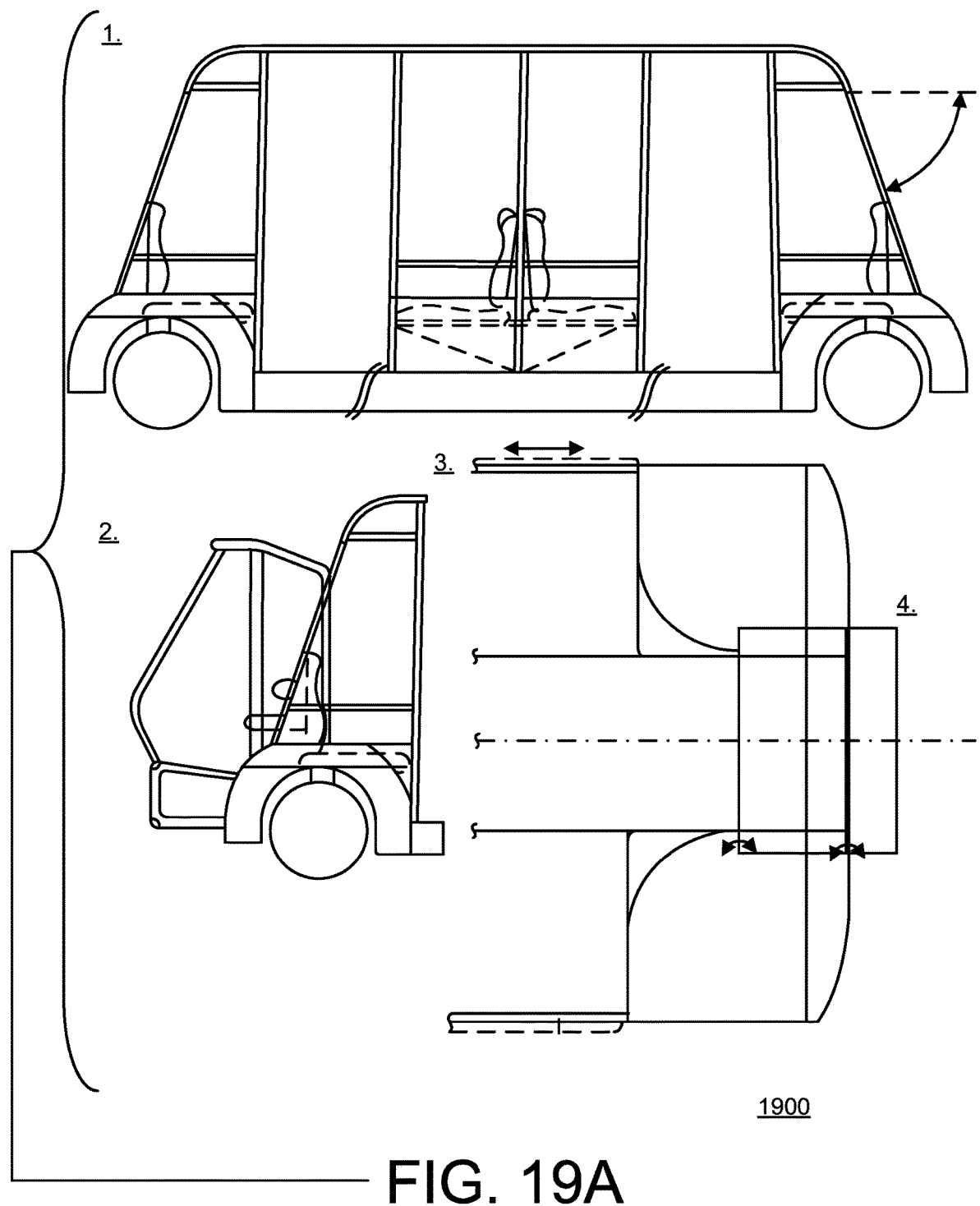

FIG. 17A show machines, vehicles and platforms designed and built using similar principles, parameters and advantages, as described above with respect to the up and down scalable, modular design systems of FIGS. 16A-D. FIG. 17A show various views of scalable frames 1701, 1702 and 1703 of uniform design. The frames can be incorporated with the battery packs 1613 of box construction and with the battery pack quick interchange system of FIG. 23B, as described above. Such scalable, modular design systems enable 365/24/7 operation and services. The machines, vehicles and platforms can be built with aluminum, high tensile steel, carbon fiber, and the like. Such configuration results in a relatively stiff design with reduced weight on three to fifteen, and above. The machines, vehicles and platforms can be configured with AWD scalable modular design frames, on three to fifteen and above, all-wheel drive (AWD). The machines, vehicles and platforms can be mostly built with all-wheel steering (AWSt), and optionally available all-wheel, air-fluid suspension (AWSu) systems of FIG. 20B. FIGS. 19C, and 19D, as described above, includes machines, vehicles and platforms that can incorporate sections 1704, 1704, 1705, and 1706 that also contain easily accessible electronics, and the like. FIGS. 17A-17B also include the advantages of the 3-dimensional scalability and modularity in machines and equipment with 3D-design and digitalized manufacturing, and worldwide distribution and services.

Figure 20A:
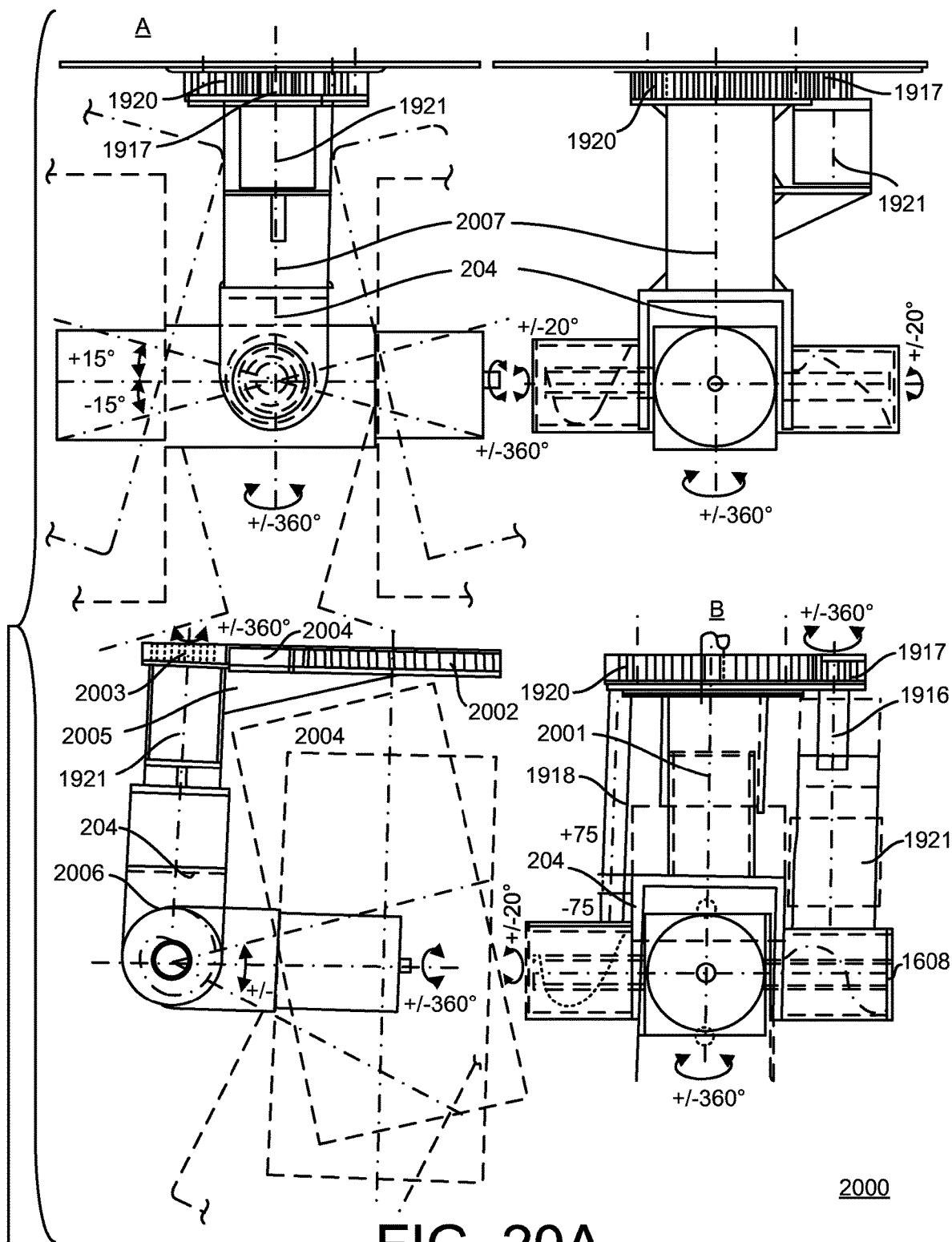
FIG. 20A shows alternative configuration for all-wheel drive and steering designs and suspension.

FIG. 17A shows a side view and describe the up and down movement of wheels, double swiveling wheel design, and the like, as described with respect to element 205 of FIG. 2. FIGS. 16B, and 20A show a +/−360 degree, steerable unit without suspension, and FIG. 20B shows +/−360 degree, steerable unit with air-fluid suspension 1707.

Also shown is the steerable wheels built with equal design, swiveling action, resulting in all-wheel, equal pressure on ground, on even or flat surfaces, on up and down curved ground. The steerable wheels are built with electronic and electric servo motor steering, and with ICT software that controls the drive servo motors so as to rotate each wheel at ideal speeds. Such configurations, advantageously, provide ideal constant drive torque on all wheels, efficient use of drive motor energy, electronic traction control on all wheels. Advantageable, such features result in no tire slip traces or wheel track marks being created on the ground.

FIG. 17B shows examples of wheel spacing on frames like those of FIG. 14, so that they travel on the ground without leaving individual wheel tracks, as shown in FIG. 14. The wheels can be mounted on various frames, and for example, a nine AWD configuration 1701, a twelve AWD configuration 1702, and a fifteen AWD configuration 1703 are shown. There are optional available free spaces for added wheels, as indicated on the configurations 1702 and 1703. The innovative wheel spacing, allows for free spaces between the front wheels to be travelled by the rear wheels forming a continuous track pattern, as described with respect to FIG. 2. Advantageously, this results in mark free, and smooth surface.

FIG. 17B also shows the assembly of the 360 degree, all-wheel steering, and lifting and lowering by air-fluid suspension 1707, as described above. Such assembly is built with unified battery pack and electronics, on four to fifteen and on all-wheel drive maintenance machines and/or transportation vehicles and platforms. FIG. 17B show a detailed side view of wheel mounting to the frames 1701, 1702 and 1703 by cross shafts 1704 with 1705 mounting brackets at both ends. If heavy load, large machines and/or vehicles are required, free space is available as shown on 1702 and 1703 for such configurations. Sideways adjustable moving arms 1706 with slide bearing turn individually on cross shaft 1704. Such configurations result in guided lift and lowering steerable wheels with examples shown in FIGS. 19C-D, 20A-C. An under-body system including adjustable moving arms 1706, cross shaft 1704, and brackets 1705, can be re-located and locked at a position employed.

The air springs system 1708 is interconnected, as a communicating vessel, with air-fluid by tubes (not fully shown), and with air spring-fluid system with air pressure vessel system 1709, with compressor, connecting tubes and hoses and pressure controller and regulator and with fluid pressure system 1710, with hydraulic fluid pump, control valves, regulators and inter-connected fluid piping, with air/fluid spheres 1711. The system can be built as a closed air-fluid system 1712, acting as a united air-fluid spring suspension and speed programmable lifting-lowering system 1713.

Figure 23B:
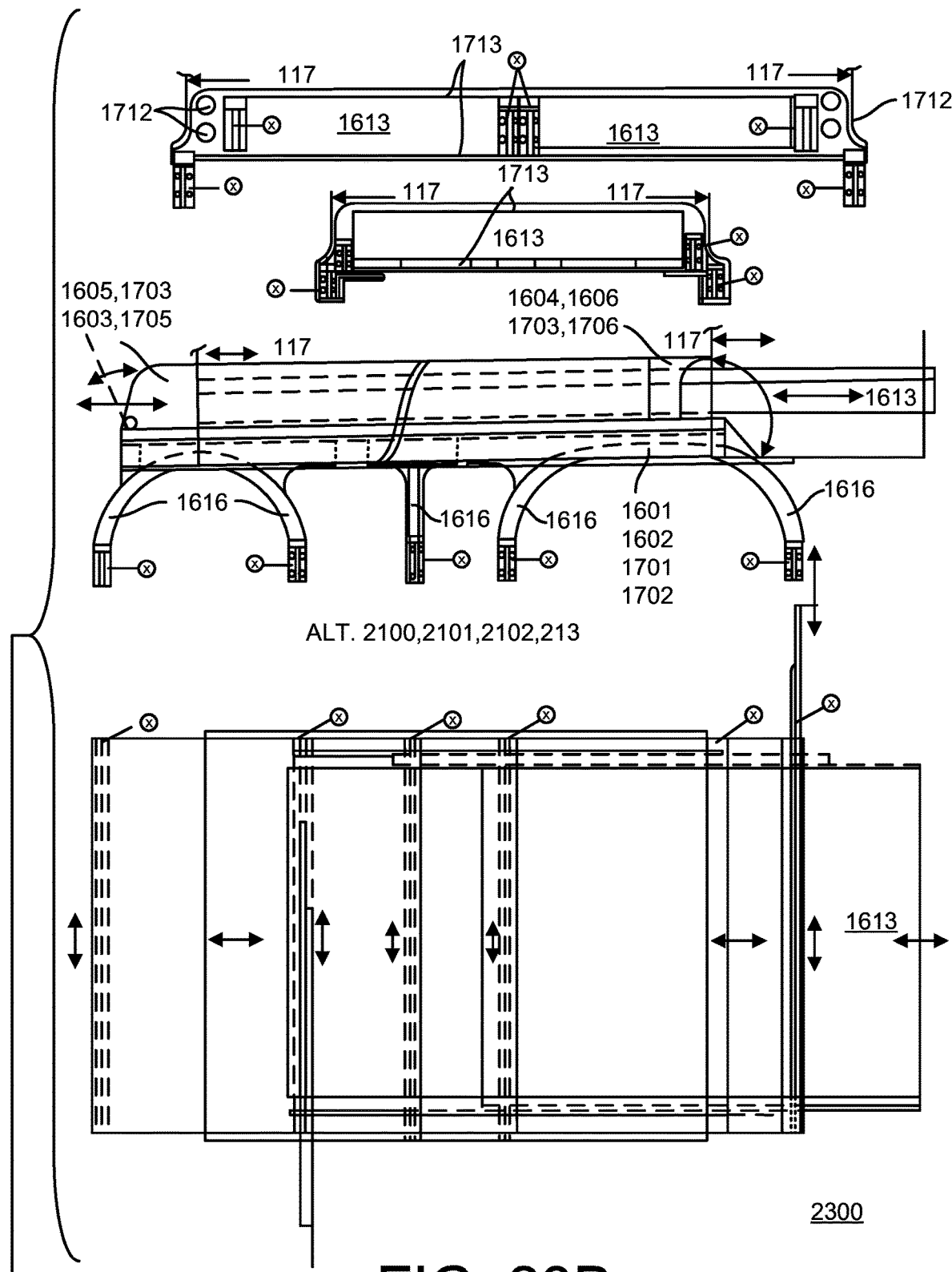
FIG. 23B shows a quick interchange of battery packs, implements and attachments from front, rear, above, under and from sides using an extended side shift design of FIG. 23A.

FIG. 17B shows an example of a fifteen all-wheel drive, all-wheel steering, and all-wheel suspension, multi-purpose machine performing multiple outdoor turf care, agricultural, and the like, jobs, and using front, rear, above, under, side, and above all around built, quick implements and battery pack interchange, as shown in FIG. 23A, and designed and built into the system described with respect to FIG. 23B.

Figure 17C:
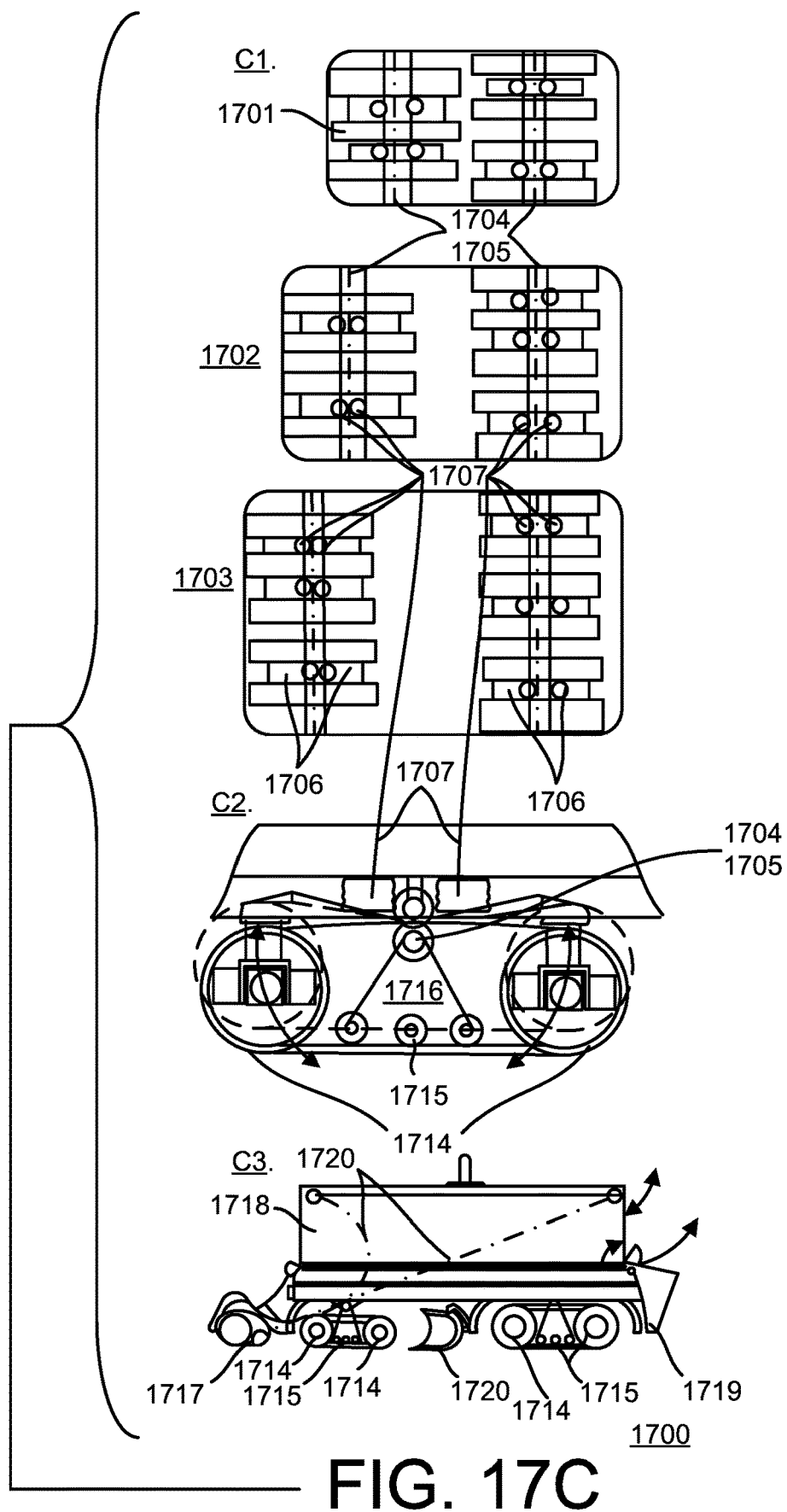
FIG. 17C shows examples of a crawler type drive system, including a multi-purpose, crawler type drive on automatic/autonomous machines equipped for winter jobs, configured for the machines of FIG. 17B for winter time and soft ground work, and attachment of a modular-design, glide body crawler steering on machines having a modular-designed frame.

FIG. 17C shows an examples of crawler spacing and mounting to the frames 1701 with seven crawler units, 1702 with nine crawler units, and 1703 with eleven crawler units. The crawler spacing results in leaving a flat smooth surface, as previously described.

Also shown is a detailed side view of the crawler wheels mounting to the frames 1701, 1702 and 1703 by cross shafts 1704 with mounting brackets 1705 at both ends and in the middle, if necessary, for heavy load, large machines and/or vehicles. A moving arm 1706 turns on cross shaft 1704 to move crawler mounting 1714 up and down. Air springs, are inter-connected as communicating vessels, air-fluid by tubes to implement 1707 (not fully shown), with air spring-fluid system with air pressure vessel system 1709, with compressor, connecting tubes and hoses and pressure controller and regulator and with fluid pressure system 1710, with hydraulic fluid pump, control valves, regulators and inter-connected fluid piping, with air/fluid spheres 1711. The system can be built as a closed air-fluid system 1712, acting as united, air-fluid spring suspension, and speed programmable, lifting and lowering system 1713.

Also shown is an example of a nine-crawler unit machine built with twenty-two piece, crawler drive wheels 1714, eleven-piece crawler chain belts 1715, and eleven-piece crawler chain belt roller units 1716. Such a machine is equipped for automatic and/or autonomous over wintertime, and outdoor jobs, and/or on other soft surface and ground operations, and the like. The machine can perform multiple jobs, including being configured as an autonomous vehicle with snow clearing and collection device 1717 that dumps into a drainable container 1718, and include spreading of slip resistant agents 1719, and a surface roughening blade 1720.

FIGS. 17B-C are examples of parts for up and down scalable, modular designed machines, vehicles, and platforms, having scalable frames with wheel and/or crawler type designs, and that can be dimensionally designed to the applications drive systems. The spacing of the moving arms 1706 can be changed by sliding and locking them on the cross shafts 1704. The designs can be equipped and/or converted from tires to the crawler chain system, and back, for year-round operation by changing of the wheels, wheel supports, mountings, tires, and the like.

FIG. 18A shows four and eight AWD, AWSt, AWSu scalable low bed, modular design vehicle frames for machines, vehicles and platforms designed and built using the same principles, parameters and advantages described above with respect to FIGS. 16A-D. The vehicle frames are up and down scalable, modular design systems. FIGS. 18A and 18B show length and width direction scalable frames, and the examples of uniform design of vehicle underbody frames 1801, 1802, and 1803. The scalable center frame section 1804 is dimensioned to attach between sections 1805, 1806, 1807, and 1808 front and rear elements. The frame sections 1804 can be incorporated with battery packs 1613 inside thereof, as shown in the cross section of 1804 of FIG. 18A, and which can include, additionally, electronics, and the like, all easily accessible by FIG. 21A installation of FIG. 23A, which performs transfer of the units outside of frame sections 1804.

Figure 18C:
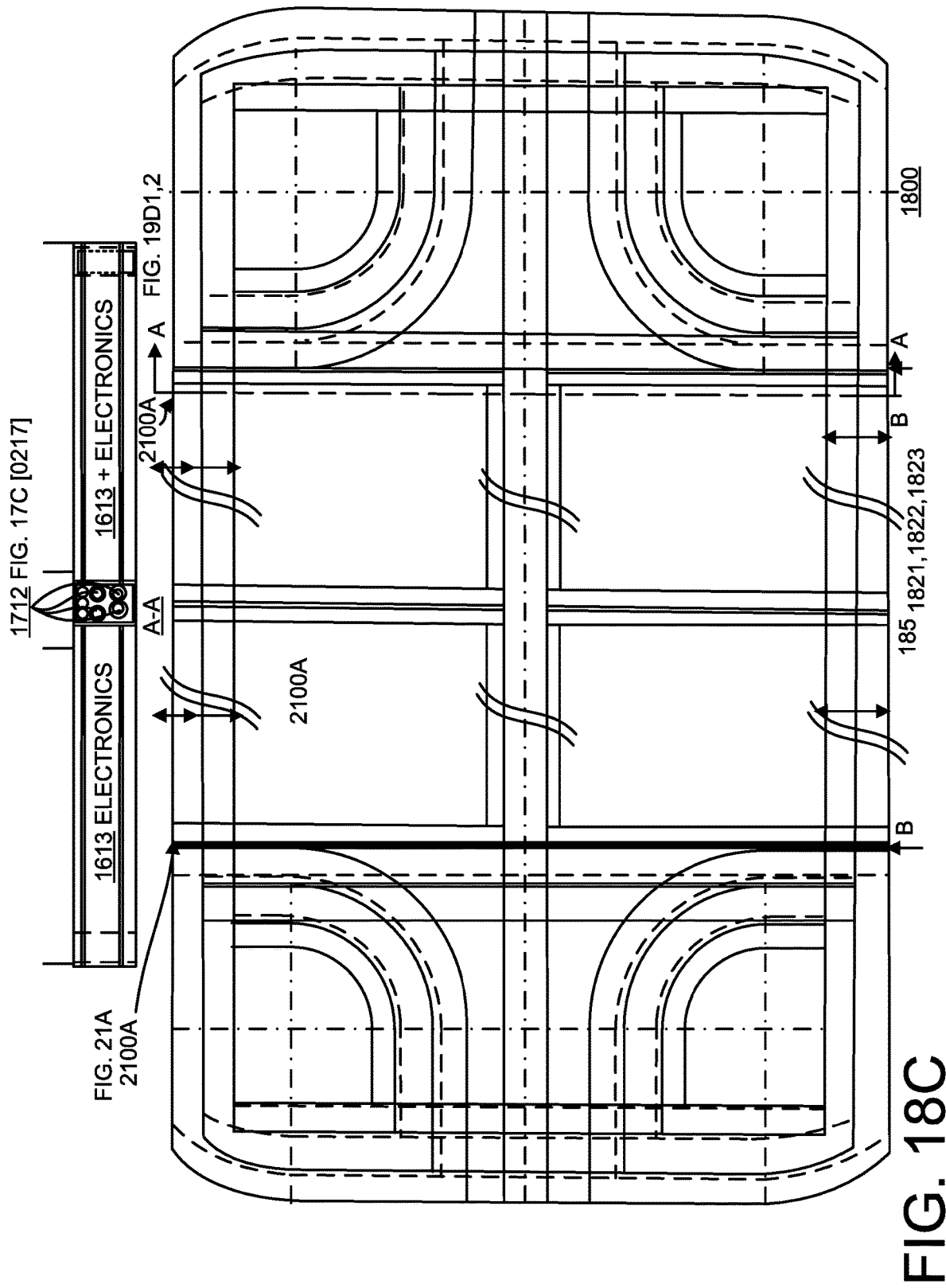
FIG. 18C shows a top view of the frames from FIGS. 18A and 18B placed on the top of each other, as an example of the scalability of the frames.
Figure 19B:
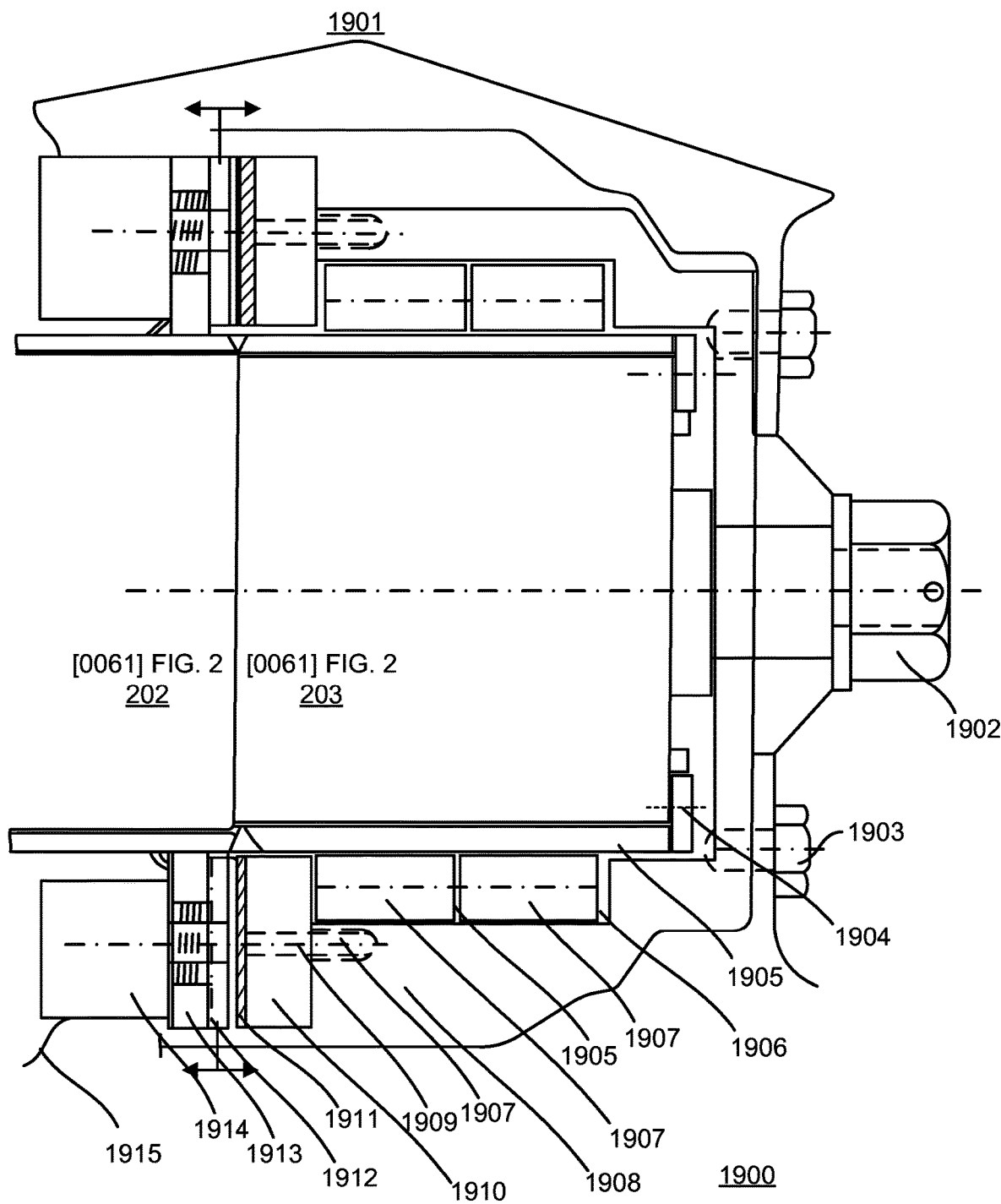
FIG. 19B shows a wheel design to meet traffic rules, when travelling on public roads, including a disc brake design, servo-motor planetary gear wheel motor braking to meet traffic laws during public travel with a resulting to wheel load capacity increase by 2 to 5 times.
Figure 19C:
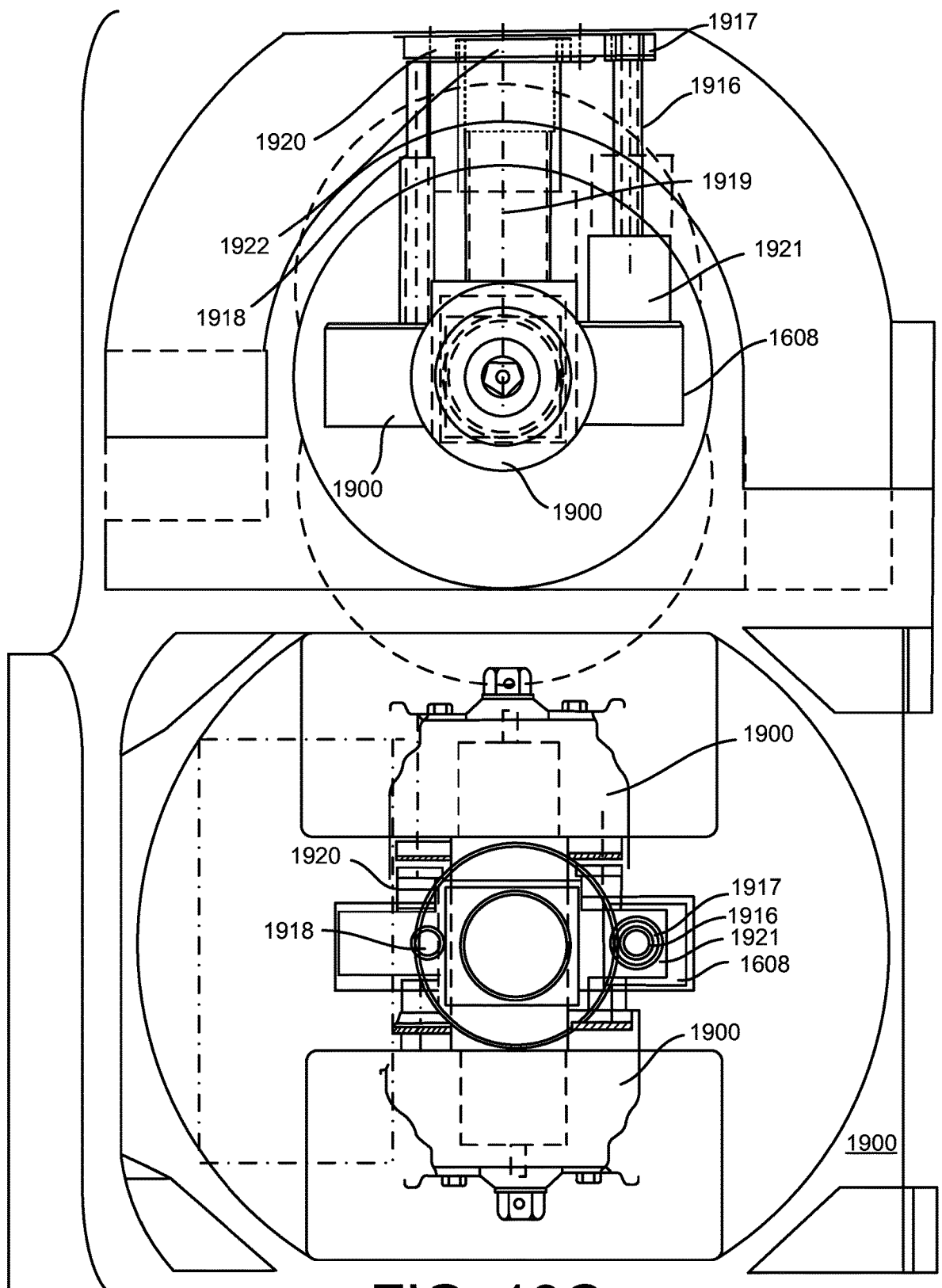
FIG. 19C shows a double wheel design built with the FIG. 19B assembly on an air-fluid suspension of FIG. 20A, and with telescopic guide rods for up/down guiding on the frames of FIGS. 18A, 18B, and the vehicles of FIG. 19A on eight to sixteen wheel vehicles or electric mini-buses.
Figure 19D:
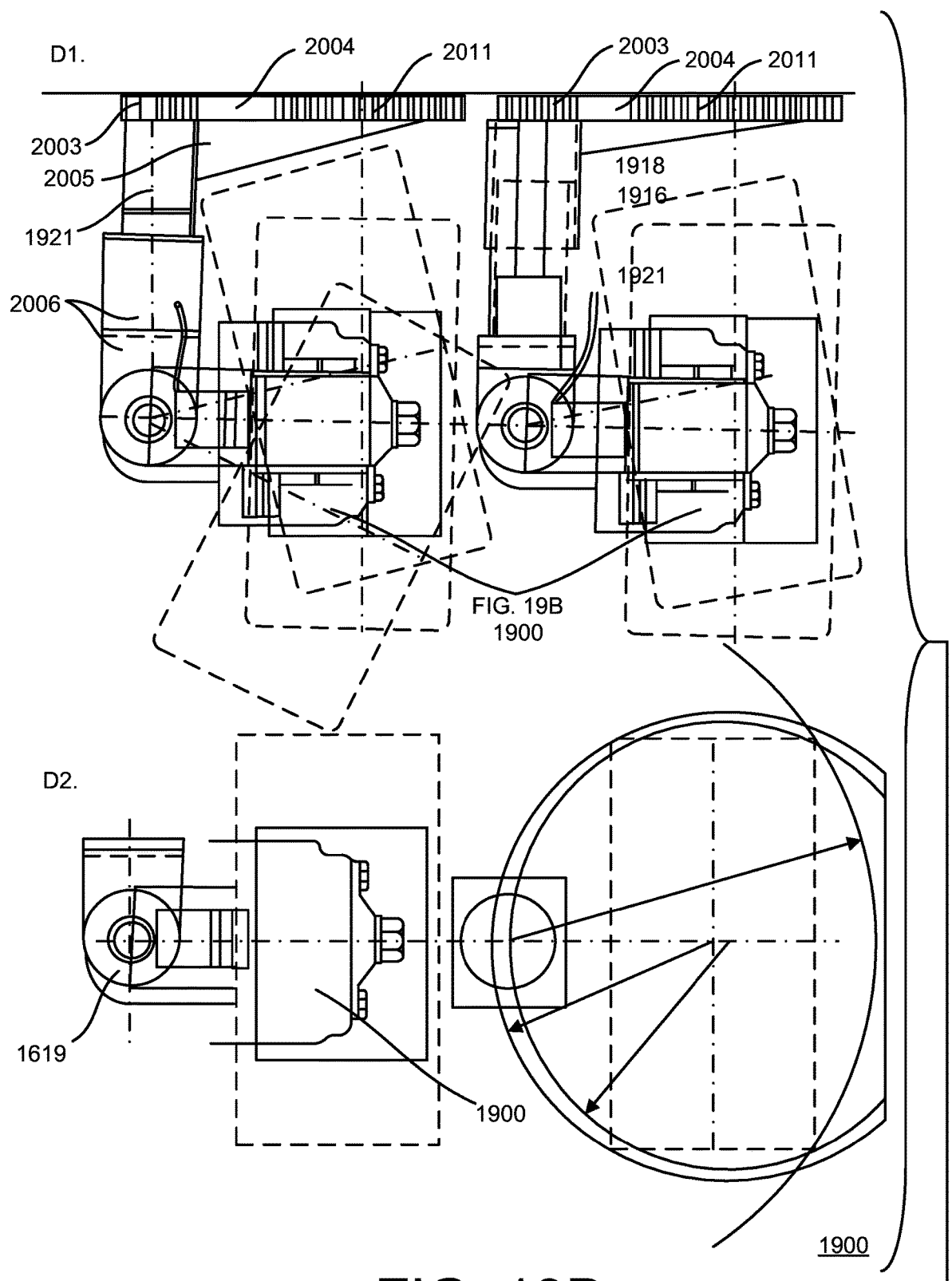
FIG. 19D shows a single wheel design built with the FIG. 19B wheel assembly and with disc brakes built on the frames of FIGS. 18A and 18B, and the single wheel units of FIG. 19A, and a single non-steerable wheel design built with optional disc brakes, and available on the machines of FIGS. 16D, 19D, and 20A.

FIG. 18 A section 1804 box construction is designed and built using the same principles and parameters described earlier with respect to FIGS. 16A-D, as scalable, modular design systems with 365/24/7 operation and services, and built with aluminum, high tensile steel, carbon fiber, and the like, resulting in a stiff design with reduced weight on four to eight AWD scalable modular design frames on four to eight, all-wheel drive (AWD) with disc brakes, and needle bearing system (AWDdb+nb) of FIG. 19B, on all wheel steering (AWSt) with optional +/−360 degrees omni-directional steering (AWSt+od) of FIG. 19C, and built with all-wheel suspension (AWSu). The frames are available with optional lifting-lowering function (AWSurll) to lower element 1804 down on the ground or the street at curb level for easy loading and unloading of goods and/or easy passenger entry, and passenger and/or goods delivery vehicles and platforms, and incorporated in center frame sections.

FIG. 18A section 1805 is for a four AWD machine, built with a single wheel design of FIG. 19D, and FIG. 20C. Sections 1806 are for an eight AWD machine built with double wheel design with larger size wheels, tires, servo motors and planetary gears to transport heavier loads and more passengers. Alternatively, FIG. 18A section 1808 shows an eight AWD machine of FIG. 19A (AWD). Sections 1807 show a four AWD machine built with medium size wheels, tires, servo motors and planetary gears to transport medium size loads. The machines are equipped with all wheel steering (AWSt) of FIG. 20A, and without air-fluid suspension or with air-fluid suspension (AWSu), or alternatively with all-wheel, omni-directional steering (AWSt+od), and with air-fluid, all wheel suspension with fast lifting and lowering function (AWSurll) of FIG. 17C.

FIG. 18B shows special machine, transportation vehicle, and platform deliveries with easy customizing for a variety of applications and industries, including up and down four and eight, and above AWD, AWSt, AWSu scalable high bed, modular design, vehicle frames, machines, vehicles and platforms designed and built using the same principles, parameters and advantages described with respect to FIGS. 16A-D, as up and down scalable, modular design systems. FIGS. 18A-B show 3-direction scalable frames, with uniform design of vehicle underbody frames 1821-1823 built with center frame section 1809 dimensioned to attach between section 1805-1808 front and rear elements. The frame sections 1809 can be incorporated with battery packs 1613 inside, as shown in cross section of 1804, and can include additionally electronics, and the like, all easily accessible by FIG. 21A installation of FIG. 23A, which performs transfer of the units outside of frame sections 1804.

FIGs. 18A-B can be configured for customer application, and flexible design, where center frames sections 1804 and/or 1809 can be re-dimensioned to attach between section 1805-1808 front and rear elements. The attachment between center sections and front-rear elements provide for flexible design, where the center frame section can be attached to the front and rear frame sections at a suitable height for a given customer application. The center sections can elevate up and down via an elevator mechanism to make operation flexible between jobs, and for picking up transported loads, and the like.

The FIG. 17C, air-fluid all wheel suspension machine with fast lifting and lowering function (AWSurll) can be configured for heavier lifting capacity and larger lifting travel, so that the transport vehicle can pick-up loads staying on trestles by driving under, lifting load from trestles, and transporting the load to a destination, and the like. By having a longer wheelbase, with more wheels across and in the longitudinal direction, bigger wheels, servo motors planet gears can be employed, for example, in autonomous/automatic/robotic sea and air container handler machines.

FIG. 18C shows the vehicle frames structures 1801, 1802, 1803 and 1821, 1822, 1823 from above, showing the relationship of frames together, with front and rear sections in place, and location of battery packs and electronics, and providing standardization and unification of structurers to improve and standardize manufacturing, so as to speed up platform deliveries for new applications. Easy access of battery packs 1613 and electronics is provided by pulling them sideways out of the center frame sections 1804 and 1809 by the side shifting systems 2100A of FIG. 21A.

FIG. 19A show examples of four and eight AWD, AWSt, AWSu up-down scalable, low bed, modular design, vehicle frames and platforms implemented for easy entrance, including electric bus, elderly and handicapped wheel chairs, sick people and patients on beds and stretchers, as well as goods and packets delivery transport vehicle underbody, and the like. Such configurations make it easy to design and build upper frame structurers, exteriors and interiors on the underbody for the delivery of complete products or platform.

Also shown is the side view of and electric automatic and/or autonomous passenger transportation vehicle that seats 4 to 20 passengers. The vehicle is a fully electric and electronic mini-bus with four and eight AWD built with AWSuspension, AWSteering, and optional four to eight AWSt, all-directional/omni-steering by a AWSt 360 degree steering for omni-directional driving.

Also shown is the installation a cabin in front of the vehicle so as to be driver operated, to carry out testing, to be built as test unit, to implement automatic and/or autonomous driving software development for automatic and/or autonomous driving in public, to enter to streets and roads, which have no automatic and/or autonomous driving software being developed. The cabin can be removed after conclusion of tests and/or left on the place.

Also shown is the vehicle with sliding side doors, with the double wheel design with electronic/electrical steering of FIG. 20A, and air-fluid suspension of FIGS. 17B and 17C. The vehicle can include air springs, inter-connected as communicating vessels, with air-fluid by tubes to implement 1708 (not fully shown), with air spring-fluid system with air pressure vessel system 1709, with compressor, connecting tubes and hoses and pressure controller and regulator and with fluid pressure system 1710, with hydraulic fluid pump, control valves, regulators and inter-connected fluid piping, with air/fluid spheres 1711. The vehicle can be built as with a closed air-fluid system 1712, acting as a united air-fluid spring suspension and speed programmable lifting-lowering system 1713.

The air-fluid suspension can lower the module floor down on street and/or on ground level, so that the floor top of the elements 1804 of FIG. 18A are at curb level for easy access in and out by passengers and without steps, for the handicapped with wheelchairs, for the elderly with rollators, and so that goods and packages can be loaded and unloaded easily.

FIG. 19A shows the optional access door at the rear for easy access for transportation of handicapped, sick and elderly people with wheelchairs and/or rollators and/or on hospital beds, as well as long packages, and the like. A Smart phone booking application can be employed. Such machines can also be scaled down to smaller wheel designs, based on the scalable module design, as described.

FIG. 19B shows the air, fluid, electric/electronic disc brake system that can be installed on drive unit 204 of FIG. 2 to meet public traffic laws regarding brakes and for over double radial wheel loads, and to increase transport load capacities.

The brake system design is built with following elements: 1901 wheel, 1902 wheel mounting, 1903 wheel mounting bolts, 1904 attaching bolts of the drive unit 204 to the planetary gear 203 of FIG. 2, 1905 precisely machined tube construction over the planetary gear 203 of FIG. 2 welded as part of element 203, 1906 discs, 1907 needle bearing units, 1908 precision machined steel structure, 1909 disc brake disc mounting bolts, 1910 mounting structure of disc brake disc, 1911 disc brake disc, 1912 disc brake pressure plate, 1913 disc brake structure with return spring structure mounted on drive unit 204 of FIG. 2, 1914 disc brake, air, fluid or electric braking cylinder, and 1915 brake cylinder energy source connection.

FIG. 19C shows the brake and bearing installation for FIG. 19B, including the assembly of FIG. 20A, double wheel, steerable unit built with air-fluid suspension system with following elements: brake and bearing of FIG. 19B, stabilizing torsion spring systems 1607 and 1608 torsion, 1916 telescopic steering drive axel, 1917 drive gear wheel, 1918 telescopic guide axel, 1919 air-fluid suspension cylinder, 1920 gear ring, 1921 steering servo motor (not shown servo driver/controller), and 1922 main center bearing facilitating 360 degree wheel unit turning and +/−360 degrees steering.

FIG. 19D shows the brake and bearing installations of FIG. 19B, including the assembly of single wheel steerable unit of FIG. 20C, built with air-fluid suspension of FIG. 19C, and built with toothed belt turning drive instead of gear wheel and gear ring drive.

FIG. 20A shows the double wheel design with electronic/electrical steering without suspension. Also shown is the double wheel design with electronic/electrical steering and FIGS. 17B and 17C air-fluid suspension. Air springs are inter-connected as communicating vessels, and with air-fluid by tubes to implement 1708 (not fully shown), with an air spring-fluid system with air pressure vessel system 1709, with compressor, connecting tubes and hoses and pressure controller and regulator and with fluid pressure system 1710, with hydraulic fluid pump, control valves, regulators and inter-connected fluid piping with air/fluid spheres 1711, and built as closed air-fluid system 1712, and acting as united air-fluid spring suspension and speed programmable lifting-lowering system 1713.

Also shown is the installation of steering systems on element 205 of FIG. 2 in double wheel drive steerable power pack 205, and FIG. 19D single wheel and FIG. 20A units. Element 1921 shows the electric servo motor built with absolute encoder installation and servo driver/controller (not shown) installation, and the small gear wheel 1917 directly driven by servo motor 1917. The large gear ring built with bearing 1920 is attached on the bottom plate of elements 1601-1602 of FIG. 16A, elements 1701-1703 of FIG. 17A, elements 1805-1808 of FIG. 18A. Such configuration result in quick installation of double wheel drive systems, like FIG. 20A, and single wheel drive system of FIG. 19C.

Also shown is the innovative 360 degrees steering installation of FIG. 19D. FIGS. 19D and 20A show the innovative 360 degrees steering system installation, on single wheel steerable power packs of FIG. 2, three wheel, seven wheel machines of FIGS. 19D and 20A. A small tooth pulley 2003 is fix mounted on the top of the vertical tube frame of the unit, with horizontal arm 2005 connecting and attaching the vertical frame to the center of gear 2002 inside of outside toothed pully ring 2011. Element 1921 servo motor turns the small toothed pulley 2003, the toothed belt 2004 installed around pulley 2003 and toothed pulley ring 2011. The turning of pulley 2007 by servo motor 1921 activates and causes the turning of the 360 degrees steering system, resulting in a single wheel steering system.

FIGS. 19C, 19D and 20A show the air-fluid suspension system element on single and double wheel steerable all wheel drives. Servo motor element 204 is mounted on element 1608 of FIG. 16B. Telescopic drive axle 1916 drives the small gear wheel 1917, together with accurate telescopic guide 1918, and up and down movement of single and/or double drive unit, and the telescopic up and down movement of air-fluid sealed suspension cylinder results.

Figure 21A:
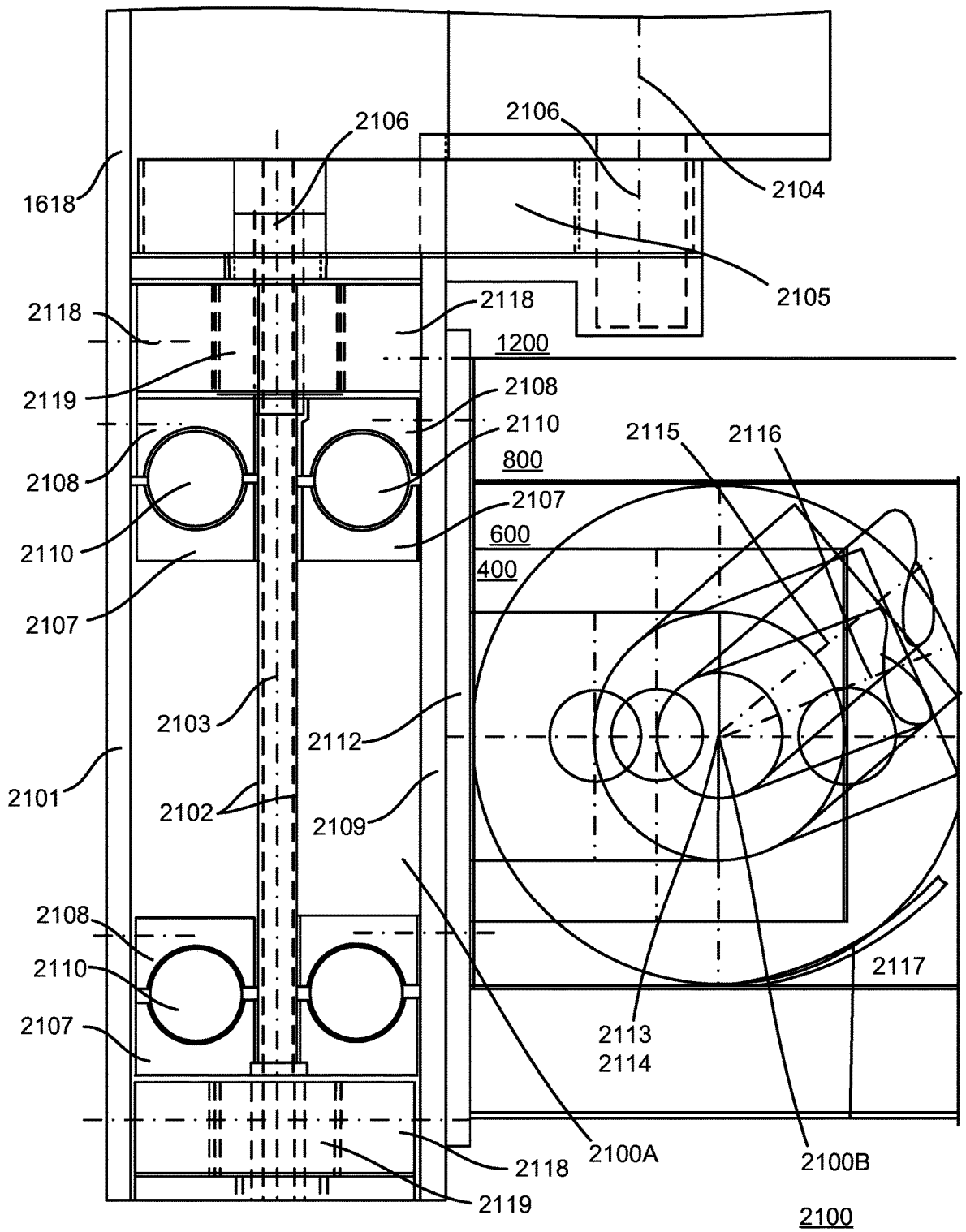
FIG. 21A shows a quick interchange of implements and attachments at front, rear, above, under and sides of machines and a battery pack interchange, including an implement lifting and lowering, and side shifting unit as a complete assembly.
Figure 21B:
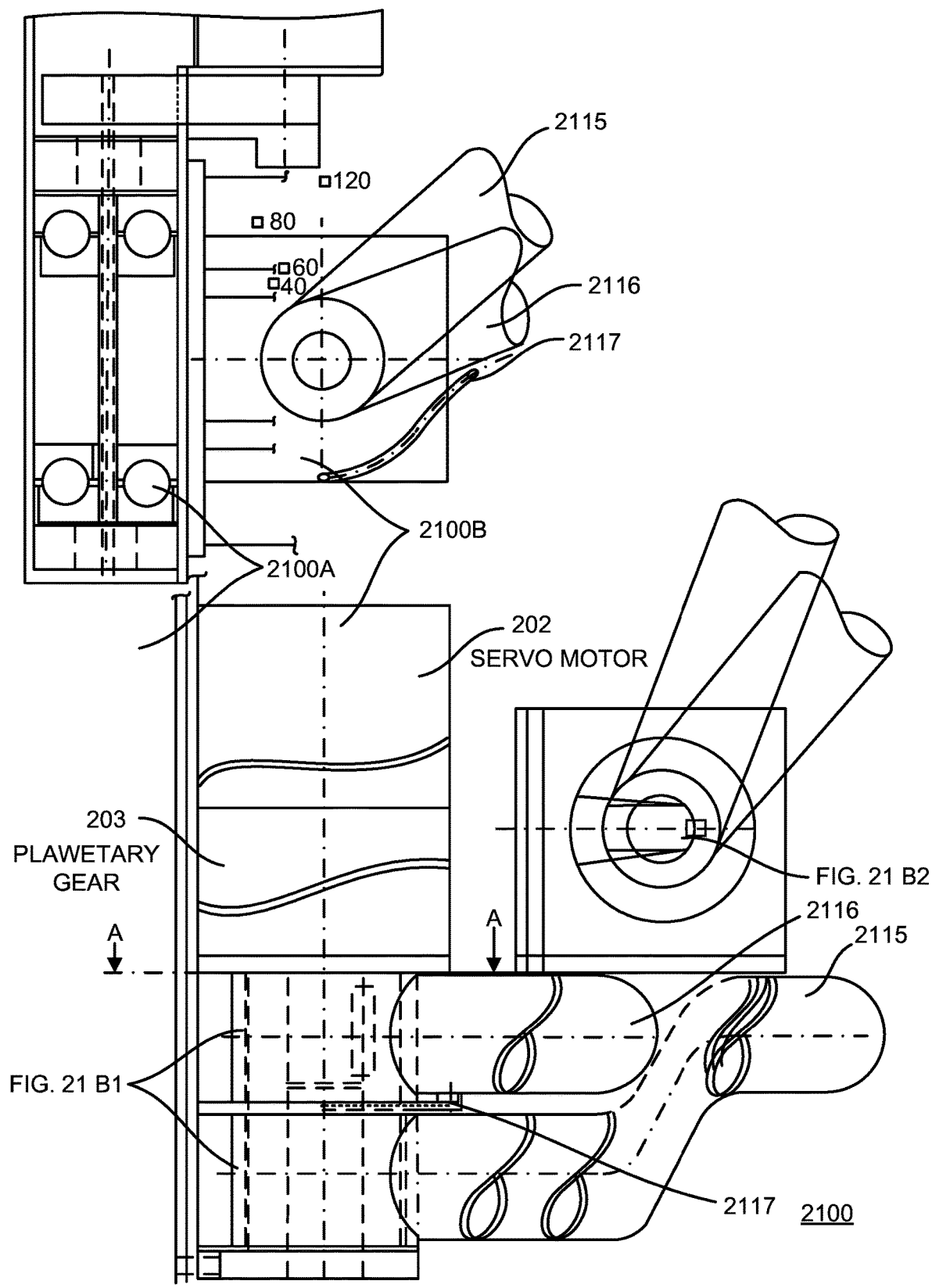
FIG. 21B shows in addition to FIG. 21A a servo motor and servo driver/controller with planetary gear implement lifting, lowering, down forcing, and implement lifting and guiding arm system, and mounting thereof, including manual exchange, and alternatively automatic/autonomous interchange.

FIGS. 21A-B show implement and attachment sideways moving device 2100A, and lifting, lowering, down forcing, handling, manual and/or automatic, autonomous quick interchange 2100B.

FIGS. 16B, 17B-C, 22A-B show the 1618 mounting structures 2100A and 2100B to attach implements and attachments to machines and vehicles at front, rear, under, on sides and above, and battery and electronic pack. Such a configuration facilitates and allows for quick interchange and for multiple jobs to be performed simultaneously. The structure can include welded U-shape base plate structure 2101; welded, attached to 1618, moving center plate 2102, rotating shaft 2103, powered by 2104 servo motor, toothed belt and wheels design 2105, to turn gear wheels 2106. This causes turning of the gear wheels 2119 at top and bottom. The racks 2118 are attached to element 2101 on one side and on element 2109 on the other side. The turning of wheels 2106 facilitate the moving of rotating shaft 2103 and moving center plate 2102. This in turn moves the ball tracks 2107, welded, attached on 2102 moving center plate, ball tracks 2108 welded on U-shape plate structure 2101, racks 2110 attached, welded on U-shape base structure 2101 and moving plate 2109 at front, steel balls 2111 on ball tracks 2107.

FIG. 21A describes the sideways moving, the operation of servo motor 2104 and toothed belt and wheel structure design 2105 that rotates the shaft 2103, the system of racks 2110, ball tracks 2107 and 2108 facilitates at first moving of 2102 and in turn moving of plate 2109 at font, which results in 3-section telescopic sideways moving to right and left of moving plate 2109 at front and the implements and attachment mounted thereon.

FIGS. 21A-B show the mounting plate 2112 attached to moving plate 2109 and in turn mounting of lifting, lowering and down forcing servo motors 2113, arms 2115 and 2116, including the wire/chain 2117 to keep and maintain implement back end at the right height.

FIG. 21B shows implement lifting system 2100B view from above with elements 2113 servo motor and controller (not shown), 2114 planetary gear (with or without brakes), 2115 implement front end guiding arm, 2116 implement lifting and down force arm, 2117 implement back end height maintenance wire/chain. The arms 2115, 2116 and wire 2117 can be interchanged manually.

Also shown is the innovative arms and chain automatic and/or autonomous quick interchange on automatic and/or autonomous operation.

Figure 22A:
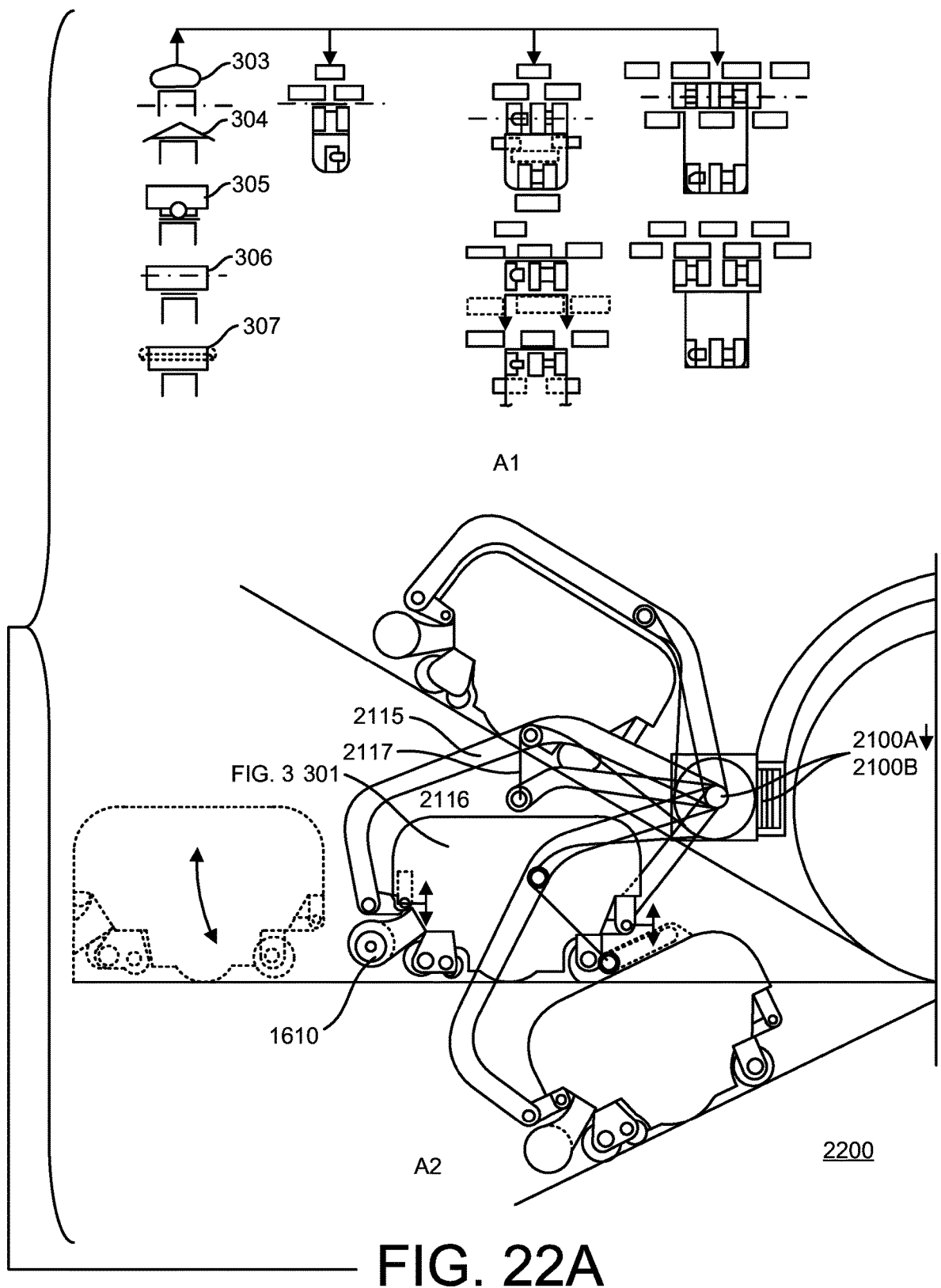
FIG. 22A shows examples of front-mounted implements selected from an extensive range of all-around mountable implements, and an alternative configuration of the reel mowing unit 301 of FIGS. 3 and 9A-B, installed on the lifting-lowering and side shifting system of FIGS. 21A-21B.

FIG. 22A describe some examples of implements short listed from ever increasing selection of implements to follow on maintenance of golf courses, turfs, sport stadiums, streets and parks of cities and communities, and the like, for upkeep and outdoor jobs, including agriculture in the future.

Also shown is the mounting and work of reel mowing unit of FIGS. 9A-9B shown as element 301 of FIG. 3, and updated for FIGS. 21A-21B installation of elements 2100A and 2100B. Such innovation includes a balancing system inside thereof, resulting in continuous, equal front and rear rolls down force on ground and updated for FIGS. 21A-B installation of lifting and telescopic side shifting 2100A and 2100B elements. The balancing system, implements guiding and lifting, lowering and down forcing 2115, resulting in continuous equal front and rear rolls down force on ground, and element 913 of FIG. 9A mounted in front of the unit, as FIG. 10A shows several different types of tube conveyor installations.

Figure 22B:
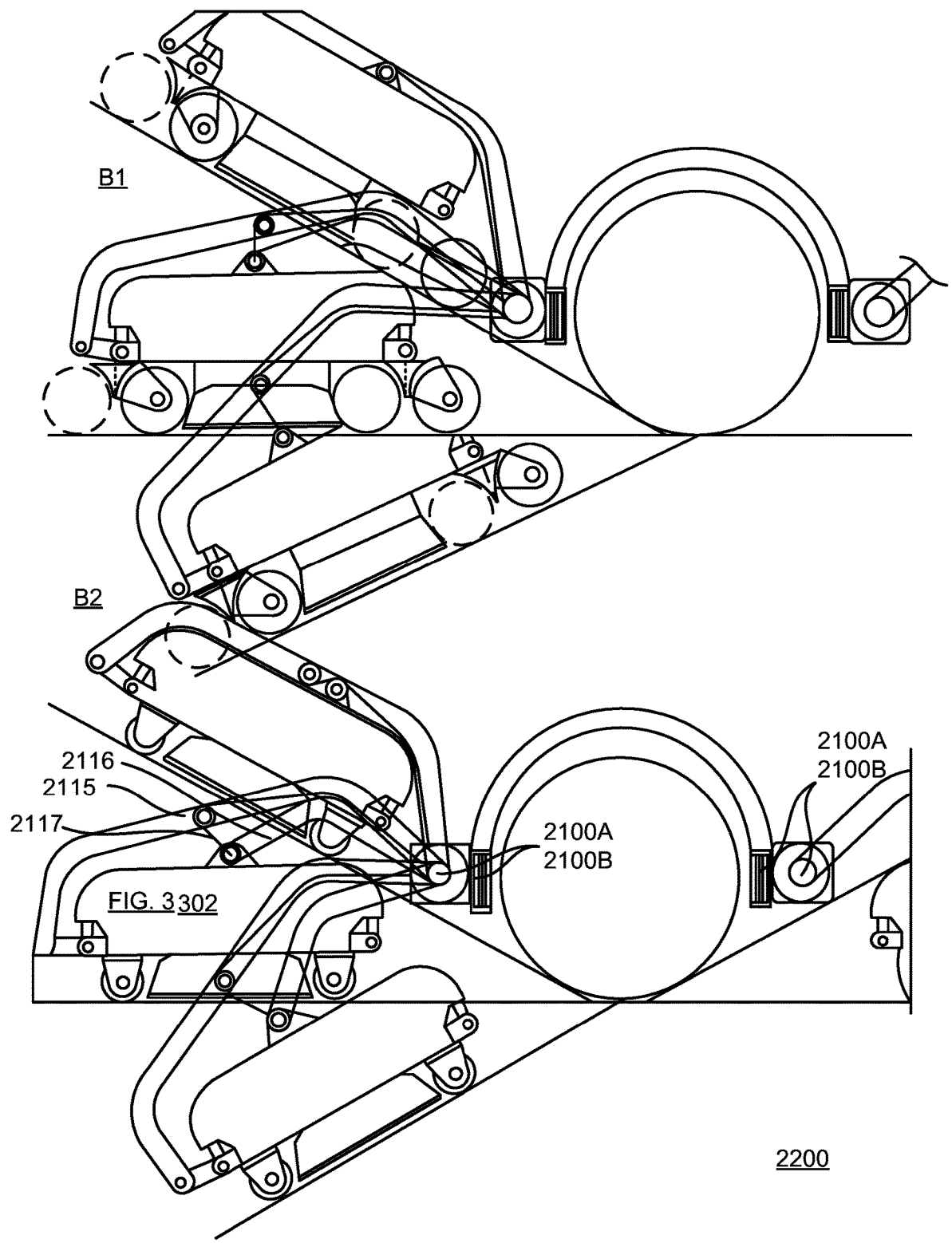
FIG. 22B shows alternative configurations for the rotary mowing units of FIGS. 11A-11B, mounted on the units of FIGS. 21A-21B.

FIG. 22B shows two alternative rotary mowing units 302 of FIG. 3, and FIGS. 11A-B, using alternative wheels and wheels mounting, updated for FIG. 21A, 21B installation of lifting and telescopic side shifting 2100A and 2100B elements, include balancing system inside, as previously described, implements guiding 2115 and lifting, lowering and down forcing, resulting in continuous, equal front and rear rolls down force on ground.

FIG. 23A shows the mounting plate 2112 attached directly on U-shape structure 2101 and servo motor 2113, and 2114 planetary gear with arms 2115 and 2116, as an example of implement lifting system 2100B, resulting in non-side shifting or moving implements and attachments system.

Also shown is an example of implement lifting system 2100B mounted directly on the plate 2102, and the outer section of 2100A as shown. This results in half distance side shifting (as shown FIG. 23A element 2102) of original length of 2101 at both directions, and for example, so implement stays partly under machine frame, which require additional work.

FIG. 23A show the elements 2100A, 2100B as complete system has +/−side shifting/moving of implements at original width distance on both directions. The configurations result is easy and in some cases, automatic and/or autonomous implement interchange.

Also shown is the servo motor 2104 at one end of the original unit length, toothed belt and wheels design 2105 extended to shift the servo motor 2104 at the end for facilitating operations and installations. The configurations result in moving implement(s) outside of frame and/or structures, implement release, moving over to other side of frame, implement(s) locking, moving to operating center position, and autonomous operating and system starts.

FIG. 23B shows as an example the front, side and top views of multi-possibilities of implement mounting and quick interchange at front, rear, under, on sides, and above, including quick interchange of battery packs, electronics, and the like, facilitating quick, automatic and up to autonomous interchange to increase machine and vehicle utility up to 365/24/7 operation and service provider system, all motors are servo motors with servo driver/controller electronics resulting to worldwide Industrial Internet (lot) service provider system and long operating life time.

FIG. 24 shows a walking, single mower design of FIG. 15, equipped for automatic, autonomous operation with clippings collection tubes 1610, with large size collection container 1611, crusher and shredded 1612, and interchangeable implements at the front, with elements 2115 and 2116 of FIG. 21B, reel mowing unit of FIG. 22A, and element 301 of FIG. 3, and disperse unit 2402.

Innovations described above construct combined innovative system in use of implements, attachments and software of FIGS. 21A-B, 22A-B, 23A-B, and 24.

Innovations described above construct combined innovative system in drive, steering, suspension, up and down movement of FIGS. 16A-D, 17B-C, 19B-D, and 20A.

Innovations described above construct combined innovative system in automatic, autonomous and robotic unmanned work and transport FIG. 1B antenna/receiver 115 and 116 position tracking, when number of satellites need be in clear vision contact. FIGS. 16A-D, 17A-C, 19C-D, and 20A-C are built with electronic servo motor traction control, all wheel servo drives and servo drives/controls, all wheel equal pressure on ground prevents the wheels from slipping. The combination of the above systems and software allow for accurate travel tracking on roads, streets and working areas and can be implemented with suitable software. Such a configuration facilitates the VRS-type tracking, and can be used in areas with a clear connection to number of satellites that are available. When connection is lost the rotation of wheels and unit travel will take over to drive and steer electronically along travel path to the point, when the clear satellite connection is reached, travel continues with VRS-tracking, and the like.

The disclosure also solves the problem of automatic, autonomous car navigation over snow covered roads and streets, where street and road markings, and the like, are not visible. Such features, advantageously, overcomes the noted problem, which allows autonomous and driverless cars and vehicles to safely travelling in a driverless manner on snow-covered streets and roads, and outside of paved roads, for example, such as farmland, and the like.

The system also serves the remote diagnoses, Industrial Internet (lot) service provider system worldwide, and with one-invoice-monthly service. Such features result in the IoT/remote diagnoses system collecting accurate data for different work and travel performed. The data collection can be cut off, for example, on the last day of the month, at midnight, and with software that wired or wirelessly sends, in seconds, the detailed data per a prevailing agreement, as an monthly invoice to a customer.

Thus, the present invention is directed to a line of eco-friendly, cleantech and sustainable lawn maintenance machines and systems with aim to develop green golf courses, which is not reality today with current combustion engine and hydraulic machines, which use an excess of fertilizers and other vast variety of chemicals. The mowing and the increase of green speed can be performed on one go with the mower machines 100 using reel mowing units, a turf improvement roller system, and green speed measuring via the machine 100. The system allows collecting of the speed data (e.g., by GPS) for quality control and player VEB information purposes, and wherein speeds can be programmed to be the same on all greens or with different speeds to increase the difficulty of the game.

The present invention also is directed to methods, systems, and apparatuses for smart cities, communities, and the like, including machines and vehicles used for servicing for lawns, turfs, parks, streets, urban care and maintenance, vehicle and platform deliveries, including fully electric, electronic operation, multi-purpose operation, and the like, with pre-programmable software for changing and selection of operating parameters, and the like, including overnight, silent, manual, automatic, autonomous, robotized, and the like, operations, transport, service provider systems with 365/24/7 operations worldwide, and the like. The machines and vehicles can be configured for golf course maintenance, turf care, landscaping, cities and communities urban outdoor work and services, and the like, transportation of goods, materials, and people, and the like.

The above described devices and subsystems of the illustrative embodiments can include, for example, any suitable servers, workstations, PCs, laptop computers, PDAs, Internet appliances, handheld devices, cellular telephones, wireless devices, other devices, and the like, capable of performing the processes of the illustrative embodiments. The devices and subsystems of the illustrative embodiments can communicate with each other using any suitable protocol and can be implemented using one or more programmed computer systems or devices.

One or more interface mechanisms can be used with the illustrative embodiments, including, for example, Internet access, telecommunications in any suitable form (e.g., voice, modem, and the like), wireless communications media, and the like. For example, employed communications networks or links can include one or more wireless communications networks, cellular communications networks, G3 communications networks, Public Switched Telephone Network (PSTNs), Packet Data Networks (PDNs), the Internet, intranets, cloud computing networks, a combination thereof, and the like.

It is to be understood that the described devices and subsystems are for illustrative purposes, as many variations of the specific hardware used to implement the illustrative embodiments are possible, as can be appreciated by those skilled in the relevant art(s). For example, the functionality of one or more of the devices and subsystems of the illustrative embodiments can be implemented via one or more programmed computer systems or devices.

To implement such variations as well as other variations, a single computer system can be programmed to perform the special purpose functions of one or more of the devices and subsystems of the illustrative embodiments. On the other hand, two or more programmed computer systems or devices can be substituted for any one of the devices and subsystems of the illustrative embodiments. Accordingly, principles and advantages of distributed processing, such as redundancy, replication, and the like, also can be implemented, as desired, to increase the robustness and performance of the devices and subsystems of the illustrative embodiments.

The devices and subsystems of the illustrative embodiments can store information relating to various processes described herein. This information can be stored in one or more memories, such as a hard disk, optical disk, magneto-optical disk, RAM, and the like, of the devices and subsystems of the illustrative embodiments. One or more databases of the devices and subsystems of the illustrative embodiments can store the information used to implement the illustrative embodiments of the present inventions. The databases can be organized using data structures (e.g., records, tables, arrays, fields, graphs, pigeons, trees, lists, and the like) included in one or more memories or storage devices listed herein. The processes described with respect to the illustrative embodiments can include appropriate data structures for storing data collected and/or generated by the processes of the devices and subsystems of the illustrative embodiments in one or more databases thereof.

All or a portion of the devices and subsystems of the illustrative embodiments can be conveniently implemented using one or more general purpose computer systems, microprocessors, digital signal processors, micro-controllers, and the like, programmed according to the teachings of the illustrative embodiments of the present inventions, as can be appreciated by those skilled in the computer and software arts. Appropriate software can be readily prepared by programmers of ordinary skill based on the teachings of the illustrative embodiments, as can be appreciated by those skilled in the software art. Further, the devices and subsystems of the illustrative embodiments can be implemented on the World Wide Web. In addition, the devices and subsystems of the illustrative embodiments can be implemented by the preparation of application-specific integrated circuits or by interconnecting an appropriate network of conventional component circuits, as can be appreciated by those skilled in the electrical art(s). Thus, the illustrative embodiments are not limited to any specific combination of hardware circuitry and/or software.

Stored on any one or on a combination of computer readable media, the illustrative embodiments of the present inventions can include software for controlling the devices and subsystems of the illustrative embodiments, for driving the devices and subsystems of the illustrative embodiments, for enabling the devices and subsystems of the illustrative embodiments to interact with a human user, and the like. Such software can include, but is not limited to, device drivers, firmware, operating systems, development tools, applications software, and the like. Such computer readable media further can include the computer program product of an embodiment of the present inventions for performing all or a portion (if processing is distributed) of the processing performed in implementing the inventions. Computer code devices of the illustrative embodiments of the present inventions can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the illustrative embodiments of the present inventions can be distributed for better performance, reliability, cost, and the like.

As stated above, the devices and subsystems of the illustrative embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of illustrative embodiments, and implementations, the present inventions are not so limited, but rather cover various modifications, and equivalent arrangements, which fall within the purview of the appended claims.

The invention claimed is:

1. A modular multipurpose machine or vehicle, comprising:
a modular scalable frame with battery incorporated on the scalable frame;
a modular electric drive system; and
modular attachments or components for configuring the machine or vehicle for a plurality of maintenance or transportation functions;
wherein the modular electric drive system includes a power train with respective drive units for front and rear wheels,
each drive unit includes a planetary gear, and servo motor for each of the front and rear wheels,
the power train includes steerable or non-steerable wheel power units, housing the respective drive units, and including respective servo controllers for each of the front and rear wheels,
the wheel power units are configured for single, double or triple wheel configurations,
the modular electric drive system includes the power train with interchangeable tires, and with the wheels, the planetary gears, the servo motors, the servo controllers, and the drives also being interchangeable across a plurality of multipurpose machine or vehicle platforms.

2. The machine or vehicle of claim 1, further comprising:
a positioning system;
a computer controller coupled to the modular electric drive system, the modular attachments, and the positioning system; and
a server coupled to the computer controller and which provides for unmanned, location based operation of the machine or vehicle, and the modular attachments.

3. The machine or vehicle of claim 2, wherein the positioning system is one of a global positioning system, a Galileo positioning system, and a Glonass positioning system and which provides automatic steering.

4. The machine or vehicle of claim 1, further comprising:
a worldwide service provider system for collecting operating data from the machine or vehicle for remote diagnoses.

5. The machine or vehicle of claim 1, further comprising:
a system for digitally 3D-designing, testing and manufacturing the machine or vehicle with scalable shared uniform components and modules.

6. The machine or vehicle of claim 1, wherein the machine or vehicle includes multi-purposes and multi-job machines or vehicles with electronic traction control and all-wheel steering.

7. The machine or vehicle of claim 1, wherein the machine or vehicle includes multi-purpose transport machines, vehicles and city-center E-busses with shared and uniform scalable and modular components and modules with underbody lifting and lowering and up to +/−360 degree electronic all-wheel steering.

8. The machine or vehicle of claim 1, wherein the machine or vehicle includes underbody frame mounted modules locations with digitally marked mounting points with laser cut fastening and mounting devices employed at final assembly.

9. The machine or vehicle of claim 1, wherein machine or vehicle are configured for increasing expansion to applications, businesses and industries with ever increasing number of scalable and modular digital design implements and attachments, pre-designed, tested and mated on a digital twin of the machine or vehicle and employing AI development.

* * * * *